United States Patent
Walden et al.

(10) Patent No.: US 11,138,637 B2
(45) Date of Patent: Oct. 5, 2021

(54) WIRELESS BEACON BASED SYSTEMS UTILIZING PRINTABLE CIRCUITS

(71) Applicant: ABL IP HOLDING, LLC, Atlanta, GA (US)

(72) Inventors: Charles Walden, Austin, TX (US); Gary Overhultz, Oak Park, IL (US)

(73) Assignee: ABL IP HOLDING, LLC, Atlanta, GA (US)

( * ) Notice: Subject to any disclaimer, the term of this patent is extended or adjusted under 35 U.S.C. 154(b) by 337 days.

(21) Appl. No.: 15/980,345

(22) Filed: May 15, 2018

(65) Prior Publication Data
US 2018/0374127 A1    Dec. 27, 2018

Related U.S. Application Data

(60) Provisional application No. 62/508,567, filed on May 19, 2017, provisional application No. 62/539,795, filed on Aug. 1, 2017.

(51) Int. Cl.
*G06Q 30/02*     (2012.01)
*H04W 4/02*     (2018.01)
(Continued)

(52) U.S. Cl.
CPC ......... *G06Q 30/0267* (2013.01); *A47F 9/048* (2013.01); *B65D 25/205* (2013.01);
(Continued)

(58) Field of Classification Search
CPC .............. G06Q 30/02; G06Q 30/0267; G06Q 10/0833; G06Q 10/0875; G06Q 20/023;
(Continued)

(56) References Cited

U.S. PATENT DOCUMENTS 6,539,280 B1   3/2003   Valiulis
6,571,279 B1   5/2003   Herz et al.
(Continued)

FOREIGN PATENT DOCUMENTS

AU   2002362010 A1   6/2003
AU   2004222924 A1   10/2004
(Continued)

OTHER PUBLICATIONS

Non-final Office Action, U.S. Appl. No. 15/248,063 dated Oct. 5, 2018, 18 pages.
(Continued)

*Primary Examiner* — Thuy N Nguyen
(74) *Attorney, Agent, or Firm* — RatnerPrestia

(57) ABSTRACT

Printable circuits may be used in combination with a point of purchase (POP) display (e.g., a consumer product display). The POP display may be configured to be deployed at a retail location. A printable circuit may be attached to the POP display with the printable circuit having printed data for a selected retail campaign associated with the POP display. The printed data may include one or more parameters for the selected retail campaign. A wireless beacon may be attached to the printable circuit on the POP display. The printable circuit may provide the parameters for the selected retail campaign to the wireless beacon when the wireless beacon is attached to the printable circuit. The wireless beacon may be assigned a unique identifier in at least one parameter provided to the wireless beacon by the printable circuit.

20 Claims, 23 Drawing Sheets

(51) Int. Cl.

| | | |
|---|---|---|
| *H04L 12/26* | (2006.01) | |
| *G06F 16/24* | (2019.01) | |
| *H04W 4/35* | (2018.01) | |
| *A47F 9/04* | (2006.01) | |
| *G01G 19/414* | (2006.01) | |
| *G06Q 10/08* | (2012.01) | |
| *G06Q 20/20* | (2012.01) | |
| *B65D 25/20* | (2006.01) | |
| *A47F 10/02* | (2006.01) | |

(52) U.S. Cl.
CPC ......... *G01G 19/4144* (2013.01); *G06F 16/24* (2019.01); *G06Q 10/087* (2013.01); *G06Q 10/0833* (2013.01); *G06Q 10/0875* (2013.01); *G06Q 20/203* (2013.01); *G06Q 30/0242* (2013.01); *H04L 43/067* (2013.01); *H04W 4/02* (2013.01); *H04W 4/35* (2018.02); *A47F 2010/025* (2013.01); *B65D 2203/10* (2013.01)

(58) Field of Classification Search
CPC ..... G06Q 30/0242; G06F 16/24; A47F 9/048; A47F 2010/025; G01G 19/4144; H04L 43/067; H04W 4/02; B65D 25/205; B65D 2203/10
See application file for complete search history.

(56) References Cited

U.S. PATENT DOCUMENTS

| | | | |
|---|---|---|---|
| 6,837,427 B2 * | 1/2005 | Overhultz | G06Q 10/02 235/375 |
| 6,951,305 B2 | 10/2005 | Overhultz et al. | |
| 7,021,535 B2 | 4/2006 | Overhultz et al. | |
| 7,233,241 B2 | 6/2007 | Overhultz et al. | |
| 7,310,070 B1 | 12/2007 | Hardman et al. | |
| 7,374,096 B2 | 5/2008 | Overhultz et al. | |
| 7,413,121 B2 | 8/2008 | Goel et al. | |
| 7,415,426 B2 | 8/2008 | Williams et al. | |
| 7,423,516 B2 | 9/2008 | Overhultz | |
| 7,510,123 B2 | 3/2009 | Overhultz et al. | |
| 7,535,337 B2 | 5/2009 | Overhultz et al. | |
| 7,549,579 B2 | 6/2009 | Overhultz et al. | |
| 7,614,556 B2 | 11/2009 | Overhultz et al. | |
| 7,870,019 B2 | 1/2011 | Williams et al. | |
| 7,921,036 B1 * | 4/2011 | Sharma | G06Q 20/3674 705/14.49 |
| 8,010,067 B2 | 8/2011 | Pyne | |
| 8,070,065 B2 | 12/2011 | Overhultz et al. | |
| 8,082,177 B2 | 12/2011 | Williams et al. | |
| 8,408,457 B2 | 4/2013 | Overhultz et al. | |
| 8,531,273 B2 | 9/2013 | Overhultz et al. | |
| 8,598,988 B2 | 12/2013 | Overhultz et al. | |
| 8,700,453 B2 | 4/2014 | Scroggie et al. | |
| 8,798,541 B1 | 8/2014 | Scott | |
| 8,823,521 B2 | 9/2014 | Overhultz et al. | |
| 8,837,954 B2 | 9/2014 | Primm et al. | |
| 8,847,754 B2 | 9/2014 | Buchheim | |
| 9,107,152 B1 | 8/2015 | Wurster | |
| 9,202,245 B2 | 12/2015 | Kostka et al. | |
| 9,298,677 B2 | 3/2016 | Tollinger et al. | |
| 9,363,784 B1 | 6/2016 | Friday et al. | |
| 9,426,627 B1 | 8/2016 | Logan et al. | |
| 9,544,744 B2 | 1/2017 | Postrel | |
| 9,619,803 B2 | 4/2017 | Chandrasekaran et al. | |
| 9,629,113 B2 * | 4/2017 | Ren | H04W 56/002 |
| 9,646,328 B1 | 5/2017 | Skifstrom et al. | |
| 9,679,310 B1 | 6/2017 | Saltzstein et al. | |
| 9,898,749 B2 | 2/2018 | Argue et al. | |
| 9,928,536 B2 | 3/2018 | Fernandez | |
| 9,929,876 B2 | 3/2018 | Davis et al. | |
| 9,953,493 B1 | 4/2018 | Davis | |
| 10,222,279 B1 | 3/2019 | Legrand, III et al. | |
| 10,262,331 B1 | 4/2019 | Sharma et al. | |
| 10,719,806 B1 * | 7/2020 | Riemenschneider | G06Q 10/087 |
| 2002/0082921 A1 | 6/2002 | Rankin | |
| 2002/0176388 A1 | 11/2002 | Rankin et al. | |
| 2002/0183004 A1 | 12/2002 | Fulton et al. | |
| 2003/0167347 A1 | 9/2003 | Combs et al. | |
| 2004/0056091 A1 * | 3/2004 | Overhultz | G06Q 30/02 235/382 |
| 2006/0080460 A1 | 4/2006 | Kobayashi et al. | |
| 2006/0087474 A1 | 4/2006 | Do et al. | |
| 2006/0109125 A1 | 5/2006 | Overhultz et al. | |
| 2006/0114832 A1 | 6/2006 | Hamilton et al. | |
| 2006/0208070 A1 | 9/2006 | Kato et al. | |
| 2006/0290519 A1 | 12/2006 | Boate et al. | |
| 2007/0067203 A1 | 3/2007 | Gil et al. | |
| 2007/0069867 A1 | 3/2007 | Fleisch et al. | |
| 2007/0114291 A1 | 5/2007 | Pouchak | |
| 2007/0254670 A1 | 11/2007 | Kawaguchi et al. | |
| 2007/0285385 A1 * | 12/2007 | Albert | G09G 3/38 345/107 |
| 2008/0021766 A1 | 1/2008 | McElwaine et al. | |
| 2008/0045172 A1 | 2/2008 | Narayanaswami et al. | |
| 2008/0243626 A1 | 10/2008 | Stawar et al. | |
| 2008/0256510 A1 | 10/2008 | Auerbach | |
| 2008/0284566 A1 | 11/2008 | Zai et al. | |
| 2009/0030787 A1 | 1/2009 | Pon et al. | |
| 2009/0288132 A1 | 11/2009 | Hegde | |
| 2010/0109864 A1 | 5/2010 | Haartsen et al. | |
| 2010/0121567 A1 | 5/2010 | Mendelson | |
| 2010/0131352 A1 | 5/2010 | Malhotra et al. | |
| 2010/0156606 A1 * | 6/2010 | Gold | H04Q 9/00 340/10.4 |
| 2010/0201488 A1 * | 8/2010 | Stern | G06K 7/0008 340/10.1 |
| 2010/0201891 A1 | 8/2010 | Laroia et al. | |
| 2010/0235373 A1 | 9/2010 | Holden et al. | |
| 2011/0026506 A1 | 2/2011 | Macnaughtan et al. | |
| 2011/0145063 A1 | 6/2011 | Qureshi et al. | |
| 2011/0178862 A1 | 7/2011 | Daigle | |
| 2011/0178863 A1 | 7/2011 | Daigle | |
| 2012/0142271 A1 | 6/2012 | Zhodzishsky et al. | |
| 2012/0166241 A1 | 6/2012 | Livingston et al. | |
| 2012/0171958 A1 | 7/2012 | Cornett et al. | |
| 2012/0191530 A1 | 7/2012 | Williams et al. | |
| 2012/0228240 A1 | 9/2012 | Gentile et al. | |
| 2012/0239504 A1 | 9/2012 | Curlander et al. | |
| 2012/0306617 A1 | 12/2012 | Tung | |
| 2012/0310570 A1 | 12/2012 | Pyne et al. | |
| 2012/0315839 A1 | 12/2012 | Mumcuoglu et al. | |
| 2012/0322459 A1 | 12/2012 | Jaffri et al. | |
| 2013/0013407 A1 | 1/2013 | Scroggie et al. | |
| 2013/0073431 A1 | 3/2013 | Suro et al. | |
| 2013/0210461 A1 | 8/2013 | Moldavsky et al. | |
| 2013/0217332 A1 | 8/2013 | Altman et al. | |
| 2013/0268316 A1 | 10/2013 | Moock et al. | |
| 2014/0090489 A1 | 4/2014 | Taylor | |
| 2014/0206346 A1 | 7/2014 | Kiukkonen et al. | |
| 2014/0236728 A1 | 8/2014 | Wright | |
| 2014/0244341 A1 | 8/2014 | Purcell et al. | |
| 2014/0249918 A1 | 9/2014 | Scroggie et al. | |
| 2014/0249928 A1 | 9/2014 | McMillan et al. | |
| 2014/0254466 A1 * | 9/2014 | Wurster | H04L 51/18 370/312 |
| 2014/0269508 A1 | 9/2014 | Donaldson | |
| 2014/0278742 A1 | 9/2014 | MacMillan et al. | |
| 2014/0282620 A1 | 9/2014 | Nuovo et al. | |
| 2014/0316896 A1 | 10/2014 | McMillan | |
| 2014/0324615 A1 | 10/2014 | Kulkarni et al. | |
| 2014/0324638 A1 | 10/2014 | Khalid | |
| 2014/0337151 A1 | 11/2014 | Crutchfield | |
| 2014/0358666 A1 | 12/2014 | Baghaie et al. | |
| 2014/0359565 A1 | 12/2014 | Frankel et al. | |
| 2015/0019391 A1 | 1/2015 | Kumar et al. | |
| 2015/0025936 A1 | 1/2015 | Garel et al. | |
| 2015/0026020 A1 | 1/2015 | Overhultz et al. | |
| 2015/0079942 A1 | 3/2015 | Kostka et al. | |
| 2015/0081474 A1 | 3/2015 | Kostka et al. | |
| 2015/0082382 A1 | 3/2015 | Maguire et al. | |
| 2015/0100403 A1 | 4/2015 | Roberts et al. | |

(56) References Cited

U.S. PATENT DOCUMENTS

| | | |
|---|---|---|
| 2015/0120463 A1 | 4/2015 | Cannon et al. |
| 2015/0140982 A1 | 5/2015 | Postrel |
| 2015/0142387 A1* | 5/2015 | Alarcon ............... G16H 40/63 702/187 |
| 2015/0142552 A1 | 5/2015 | Schmehl et al. |
| 2015/0161665 A1 | 6/2015 | Grimes et al. |
| 2015/0215781 A1 | 7/2015 | Reed et al. |
| 2015/0228004 A1* | 8/2015 | Bednarek ......... G06Q 10/08355 705/26.8 |
| 2015/0237463 A1 | 8/2015 | Stuttle et al. |
| 2015/0248663 A1 | 9/2015 | Meere et al. |
| 2015/0249058 A1 | 9/2015 | Cowley et al. |
| 2015/0262117 A1 | 9/2015 | Li |
| 2015/0278867 A1 | 10/2015 | Lerman et al. |
| 2015/0278888 A1 | 10/2015 | Lu et al. |
| 2015/0281877 A1 | 10/2015 | Walden et al. |
| 2015/0287045 A1* | 10/2015 | Brown ................. H04L 43/067 705/14.4 |
| 2015/0317661 A9 | 11/2015 | Roberts et al. |
| 2015/0350974 A1 | 12/2015 | Patil et al. |
| 2015/0356610 A1 | 12/2015 | Ponoth |
| 2015/0363764 A1 | 12/2015 | Grigg et al. |
| 2015/0371321 A1 | 12/2015 | Chapuis et al. |
| 2016/0026032 A1 | 1/2016 | Moore |
| 2016/0034954 A1 | 2/2016 | Tollinger et al. |
| 2016/0042251 A1 | 2/2016 | Cordova-Diba et al. |
| 2016/0050645 A1 | 2/2016 | Wurster et al. |
| 2016/0092943 A1 | 3/2016 | Vigier et al. |
| 2016/0092966 A1 | 3/2016 | Vigier et al. |
| 2016/0094940 A1 | 3/2016 | Vigier et al. |
| 2016/0095063 A1 | 3/2016 | Vigier et al. |
| 2016/0110622 A1 | 4/2016 | Herring et al. |
| 2016/0110757 A1* | 4/2016 | Vermolen ........ H04N 21/42201 705/14.45 |
| 2016/0134930 A1 | 5/2016 | Swafford |
| 2016/0148270 A1 | 5/2016 | Vigier et al. |
| 2016/0171486 A1 | 6/2016 | Wagner et al. |
| 2016/0171512 A1 | 6/2016 | Buck et al. |
| 2016/0178379 A1 | 6/2016 | Moraru et al. |
| 2016/0217519 A1 | 7/2016 | Kozat et al. |
| 2016/0225029 A1 | 8/2016 | VanDeVelde et al. |
| 2016/0227359 A1 | 8/2016 | Hurewitz et al. |
| 2016/0227368 A1 | 8/2016 | Sanderovich et al. |
| 2016/0232560 A1 | 8/2016 | VanDeVelde |
| 2016/0253735 A1 | 9/2016 | Seudillo et al. |
| 2016/0260301 A1 | 9/2016 | Miller et al. |
| 2016/0316361 A1 | 10/2016 | Bhargave et al. |
| 2016/0371735 A1 | 12/2016 | Walden |
| 2017/0026788 A1* | 1/2017 | Kostka ............... G06Q 30/0641 |
| 2017/0032354 A1 | 2/2017 | Tilahun et al. |
| 2017/0053317 A1* | 2/2017 | Dione ................ G06Q 30/0269 |
| 2017/0124603 A1 | 5/2017 | Olson et al. |
| 2017/0148077 A1 | 5/2017 | Phillips et al. |
| 2017/0148991 A1* | 5/2017 | Duggeli ............. H01L 51/0035 |
| 2017/0169444 A1 | 6/2017 | Housholder |
| 2017/0186068 A1 | 6/2017 | Dumouchel et al. |
| 2017/0228776 A1 | 8/2017 | Walden et al. |
| 2017/0242427 A9 | 8/2017 | High et al. |
| 2017/0245284 A1 | 8/2017 | Hassan et al. |
| 2018/0012259 A1 | 1/2018 | Lazo |
| 2018/0027386 A1 | 1/2018 | Zampini |
| 2018/0047059 A1 | 2/2018 | Lazo et al. |
| 2018/0096566 A1 | 4/2018 | Blair, II et al. |
| 2018/0108043 A1 | 4/2018 | Walden et al. |
| 2018/0158382 A1 | 6/2018 | Yoshie et al. |
| 2018/0165711 A1 | 6/2018 | Montemayor et al. |
| 2018/0189819 A1 | 7/2018 | Levi |
| 2018/0322376 A1 | 11/2018 | Henry et al. |
| 2018/0335781 A1* | 11/2018 | Chase ............... G08G 1/096758 |
| 2019/0108474 A1 | 4/2019 | Tripathi |
| 2019/0328159 A1 | 10/2019 | Marivoet et al. |
| 2020/0150213 A1 | 5/2020 | Oh et al. |

FOREIGN PATENT DOCUMENTS

| | | |
|---|---|---|
| CA | 2519621 A1 | 10/2004 |
| CA | 2586576 A1 | 5/2006 |
| CA | 2587925 A1 | 5/2006 |
| CA | 2709651 A1 | 12/2010 |
| CN | 100447811 C | 12/2008 |
| EP | 2372627 | 10/2011 |
| WO | 2013054144 A1 | 4/2013 |
| WO | 2014207646 | 12/2014 |

OTHER PUBLICATIONS

Non-final Office Action, U.S. Appl. No. 15/248,057 dated Oct. 5, 2018, 16 pages.
Non-final Office Action, U.S. Appl. No. 14/238,613, dated Nov. 12, 2015, 36 pages.
Non-final Office Action, U.S. Appl. No. 14/171,544, dated Apr. 2, 2015, 9 pages.
International Preliminary Report on Patentability, Application No. PCT/US2012/030403, dated Feb. 18, 2014, 10 pages.
International Search Report, Application No. PCT/US2012/030403, dated Jul. 6, 2012, 2 pages.
Final Office Action, U.S. Appl. No. 14/238,613, dated May 19, 2016, 39 pages.
Non-final Office Action, U.S. Appl. No. 14/668,289, dated Dec. 31, 2015, 11 pages.
Final Office Action, U.S. Appl. No. 14/668,289, dated Jun. 22, 2016, 17 pages.
Non-final Office Action, U.S. Appl. No. 14/183,116, dated Sep. 9, 2016, 36 pages.
Final Office Action, U.S. Appl. No. 14/183,116 dated May 2, 2017, 53 pages.
Non-Final Office Action, U.S. Appl. No. 15/153,213 dated Mar. 24, 2017, 55 pages.
Non-Final Office Action, U.S. Appl. No. 14/238,613 dated Feb. 1, 2017, 47 pages.
Non-Final Office Action, U.S. Appl. No. 14/668,289 dated Jan. 20, 2017, 16 pages.
Interview Summary, U.S. Appl. No. 15/153,213 dated Aug. 21, 2017, 4 pages.
Final Office Action, U.S. Appl. No. 15/153,213 dated Oct. 19, 2017, 38 pages.
Final Office Action, U.S. Appl. No. 14/238,613 dated Oct. 13, 2017, 46 pages.
Final Office Action, U.S. Appl. No. 14/668,289 dated Sep. 29, 2017, 19 pages.
Notice of Allowance, U.S. Appl. No. 15/153,213 dated Jan. 30, 2018, 7 pages.
Non-final Office Action, U.S. Appl. No. 15/153,135 dated Jul. 13, 2018, 38 pages.
Non-final Office Action, U.S. Appl. No. 15/153,142 dated Jun. 14, 2018, 49 pages.
Non-final Office Action, U.S. Appl. No. 15/153,155 dated Jun. 22, 2018, 42 pages.
Non-final Office Action, U.S. Appl. No. 15/153,163 dated Jun. 13, 2018, 53 pages.
Non-final Office Action, U.S. Appl. No. 15/153,163 dated Jun. 13, 2018, 49 pages.
Non-final Office Action, U.S. Appl. No. 15/153,180 dated Jul. 26, 2018, 52 pages.
Non-final Office Action, U.S. Appl. No. 15/153,200 dated Aug. 10, 2018, 56 pages.
Non-final Office Action, U.S. Appl. No. 15/153,220 dated Aug. 27, 2018, 51 pages.
Non-final Office Action, U.S. Appl. No. 14/183,116 dated Mar. 5, 2018, 40 pages.
Algorithms+Data Structures=Programs, 1976, pp. xii-55.
Streetlights and Shadows, MIT Press, 2009, pp. 33-47.
The future of the internet—and how to stop it, Yale University Press, 2008, Chapter(s) 1-9, (emphasis pp. 11-18).
Inside Bluetooth Low Energy, Gupta, Artech House, pp. xxv-14, 131-143.

(56) References Cited

OTHER PUBLICATIONS

Embedded Systems, Krzystof, John Wiley, 2013, pp. 259-265.
Building the internet of Things with IPv6 and MIPv6, 2013, pp. 55-57, 105-107.
Internet of Things—From Research and Innovation to Market Deployment, Vermesan, River Publishers, 2014, pp. 92-97.
Anderson, "The Wi-Fi Revolution", https://www.wired.com/2003/05/wifirevolution/, May 1, 2003, 20 pages.
Final Office Action for U.S. Appl. No. 15/153,155, dated Apr. 24, 2019, 14 pages.
Final Office Action for U.S. Appl. No. 15/153,142, dated Apr. 24, 2019, 14 pages.
Final Office Action for U.S. Appl. No. 15/248,057, dated Apr. 25, 2019, 12 pages.
Final Office Action ofr U.S. Appl. No. 15/153,173, dated Apr. 24, 2019, 15 pages.
Final Office Action ofr U.S. Appl. No. 15/248,063, dated Apr. 25, 2019, 14 pages.
Non Final Office Action for U.S. Appl. No. 15/153,135, dated Apr. 29, 2020, 15 pages.
Non Final Office Action for U.S. Appl. No. 15/153,173, dated Jun. 13, 2018, 49 pages.
Non Final Office Action for U.S. Appl. No. 15/153,186, dated Feb. 19, 2019, 13 pages.
Non Final Office Action for U.S. Appl. No. 15/433,334, dated Apr. 29, 2019, 18 pages.
Non Final Office Action for U.S. Appl. No. 15/997,213, dated Dec. 21, 2018, 41 pages.
Notice of Allowance for U.S. Appl. No. 15/153,200, dated Apr. 17, 2019, 20 pages.
Smiley, "Active RFID vs. Passive RFID: What's the Difference?", https://blog.atlasrfidstore.com/active-rfid-vs-passive-rfid, Mar. 4, 2016, 23 pages.
Swedberg, "ShelfX Unviels Store Shelves for Automating Purchases," RFID Journal, "The system, slated for supermarket pilots, will weigh products, determine what has been removed, and automatically charge a customer based on that person's RFID-enabled loyalty card or wristband," Nov. 2, 2011, 2 pages.
Trademark Electronic Search System (TESS), Bluetooth, Nov. 26, 2019, United States Patent and Trademark Office, 3 pages.
Non Final Office Action for U.S. Appl. No. 15/153,135, dated Oct. 8, 2020, 25 pages.
Final Office Action for U.S. Appl. No. 15/153,142, dated Aug. 24, 2020, 17 pages.
Final Office Action for U.S. Appl. No. 15/153,155, dated Aug. 24, 2020, 16 pages.
Final Office Action for U.S. Appl. No. 15/153,173, dated Aug. 24, 2020, 13 pages.
Final Office Action for U.S. Appl. No. 15/248,057, dated Jul. 13, 2020, 22 pages.
Non Final Office Action for U.S. Appl. No. 15/248,057, dated Nov. 13, 2020, 23 pages.
Final Office Action for U.S. Appl. No. 15/433,334, dated Oct. 21, 2020, 37 pages.
Non Final Office Action for U.S. Appl. No. 15/433,334, dated Jul. 1, 2020, 39 pages.
Final Office Action for U.S. Appl. No. 15/726,108, dated Aug. 10, 2020, 62 pages.
Final Office Action for U.S. Appl. No. 15/726,128, dated Jul. 20, 2020, 17 pages.
Notice of Allowance for U.S. Appl. No. 15/726,138, dated Jul. 27, 2020, 35 pages.
Non Final Office Action for U.S. Appl. No. 15/726,146, dated Aug. 10, 2020, 15 pages.
Final Office Action for U.S. Appl. No. 15/726,146, dated Feb. 4, 2021, 34 pages.
Notice of Allowance for U.S. Appl. No. 15/153,142, dated Feb. 26, 2021, 32 pages.
Dahlgren et al., "Evaluation of Indoor Positioning Based on Bluetooth® Smart Technology", Master of Science Thesis in the Programme Computer Systems and Networks, Chalmers University of Technology, Department of Computer Science and Engineering, 2014, 94 pages.
Melià-Seguí et al., "Human-Object Interaction Reasoning Using RFID-Enabled Smart Shelf", 2014 International Conference on the Internet of Things, Feb. 2021, IEEE Xplore, pp. 37-42.
Notice of Allowance for U.S. Appl. No. 15/153,155, dated Mar. 10, 2021, 36 pages.
Notice of Allowance for U.S. Appl. No. 15/153,173, dated Mar. 5, 2021, 25 pages.
Non-final Office Action for U.S. Appl. No. 15/726,128, dated Apr. 28, 2021, 42 pages.
Walkbase, Wi-Fi Analytics for Retail Stores: Buyer's Guide, Jul. 27, 2016, https://s3.amazonaws.com/wlkbase/Whitepapers/whitepaper-walkbase-wifi-analytics-buyers-guide.pdf, pp. 1-23 (Year: 2016).
Notice of Allowance for U.S. Appl. No. 15/248,057, dated Mar. 22, 2021, 25 pages.
Notice of Allowance for U.S. Appl. No. 15/153,135, dated Mar. 25, 2021, 30 pages.
Notice of Allowance for U.S. Appl. No. 15/726,146, dated Jun. 29, 2021, 15 pages.

* cited by examiner

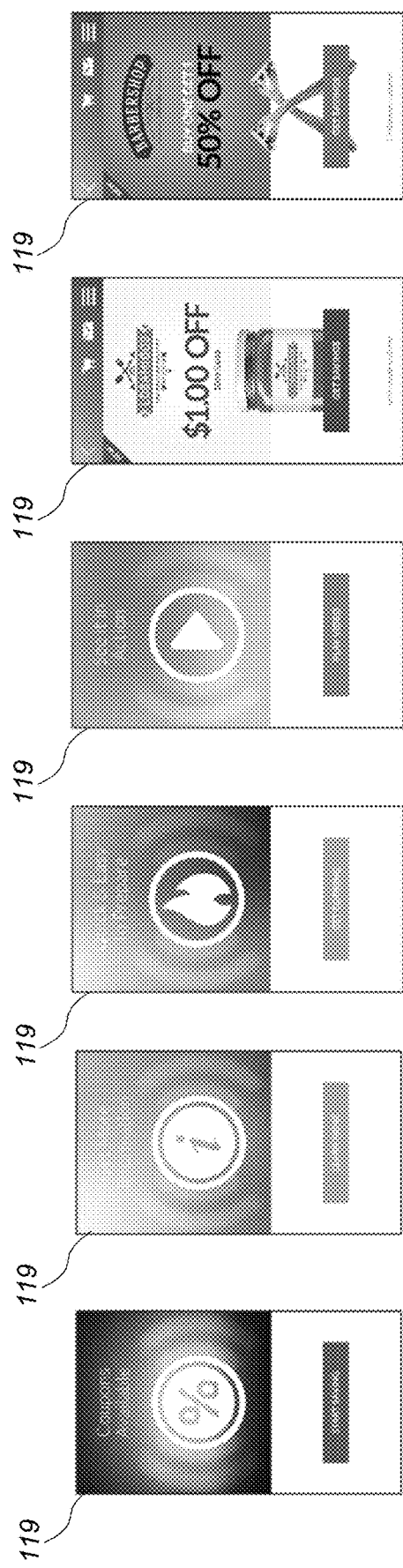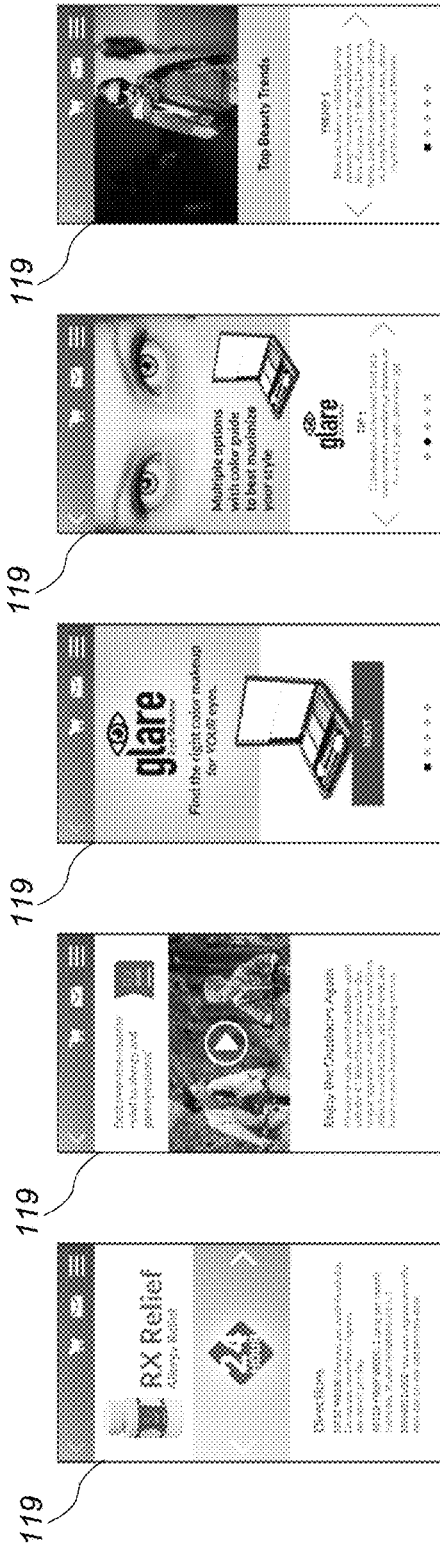

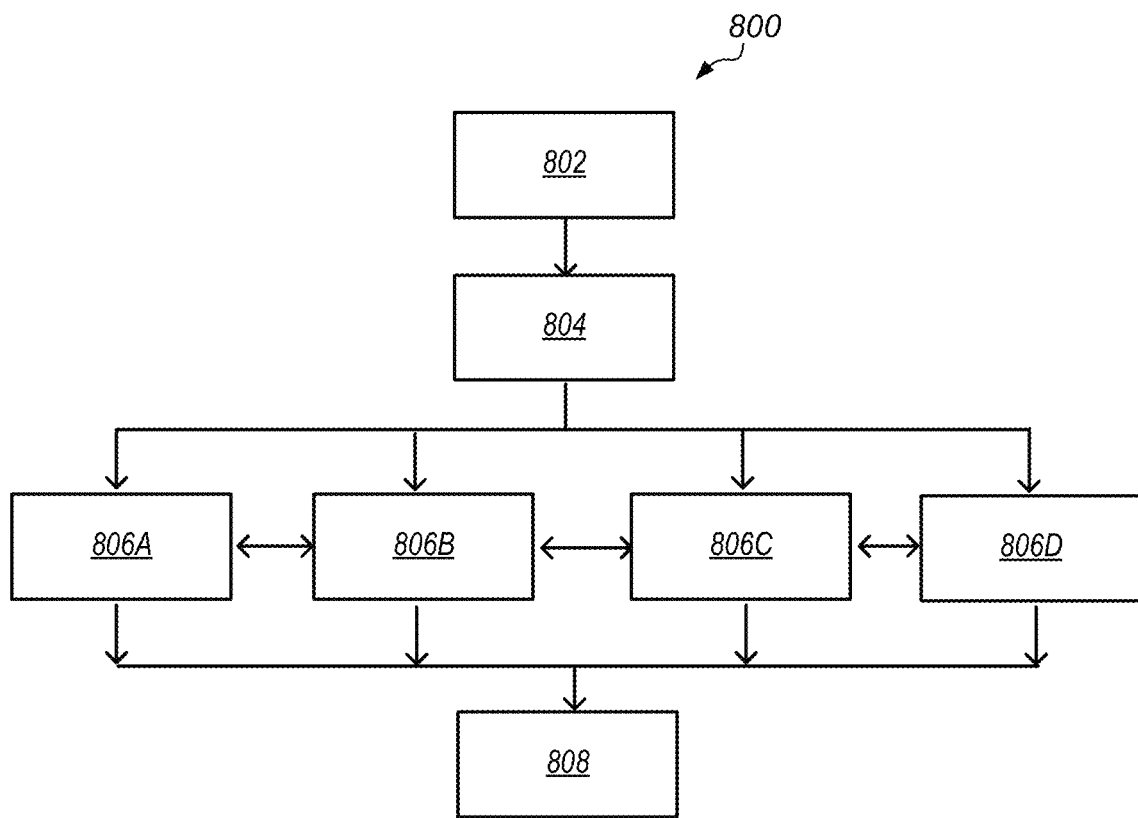
FIG. 5
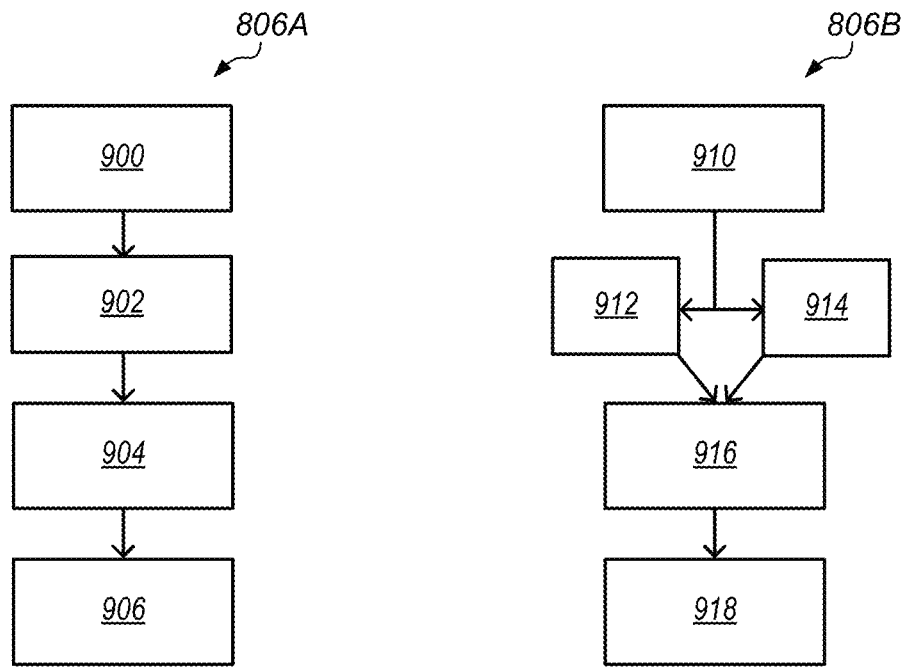
FIG. 6
FIG. 7

WIRELESS BEACON BASED SYSTEMS UTILIZING PRINTABLE CIRCUITS

PRIORITY CLAIM

This patent claims priority to U.S. Provisional Patent Application No. 62/508,567 to Walden et al., entitled "WIRELESS BEACON BASED SYSTEMS AND METHODS FOR CONSUMER PRODUCT TRACKING AND MARKETING", filed May 19, 2017; and U.S. Provisional Patent Application No. 62/539,795 to Walden et al., entitled "WIRELESS BEACON BASED SYSTEMS AND METHODS FOR CONSUMER PRODUCT TRACKING AND MARKETING", filed Aug. 1, 2017, each of which is incorporated by reference in its entirety as if fully set forth herein.

RELATED PATENTS

This patent application incorporates by reference in their entirety U.S. patent application Ser. No. 15/153,135 to Walden and U.S. patent application Ser. No. 15/433,334 to Walden et al.

BACKGROUND OF THE INVENTION

1. Field of the Invention

Embodiments disclosed herein relate to the use of wireless beacons in point of purchase ("POP") displays to facilitate the delivery of consumer oriented content to mobile devices. Certain embodiments relate to systems and methods for coupling wireless beacons and the POP displays and configuration of the wireless beacons for use with the POP displays.

2. Description of the Relevant Art

POP ("point of purchase") displays are often used in retail environments to display content for particular products associated with the POP displays. POP displays typically include signs, graphics, or other marketing materials that communicate information about associated products and are intended to draw a shopper's (e.g., customer's) attention to the products associated with the displays. POP displays may be used as integral components for marketing or promotional campaigns. POP displays often contribute to the success of these campaigns.

Traditional POP display signage, which runs the gamut from a simple plastic holder for a card with product information to illuminated translucent graphic films in an atmospheric light box, are static in nature and are unable to customize the information conveyed to a potential customer based upon the customer's interest level. Other conventional POP display signage may include video displays that offer limited interactive options. Thus, there is a need for POP displays that are capable of dynamically interacting with potential customers. The manufacture, distribution, and/or deployment in retail settings of multiple POP displays, however, poses unique challenges, especially when the ability to dynamically interact with potential customers is included with the POP displays. Developments in mobile device technology and mobile communication technology allows for dynamic interaction with potential customers in retail environment.

Beyond POP display material, it is also common for manufacturers and retailers to be interested in tracking and insuring the presence of high-value products. Such instances include, but are not limited to new or experimental products, very high value items such as designer purses, or test market concepts. In such cases, these individual items may be worth tracking in a manner similar to POP display materials.

Beacons are among the most important new mobile technologies helping merchants engage with consumers via mobile communication while the consumers are in brick and mortar stores. For many years, near field communication (NFC) was considered to be the technology that would deliver such data to retailers and help them track how customers behave in-store. NFC, however, has reached certain limits and beacons (and beacon technology) provides increased potential for providing customer engagement to shoppers in store environments.

Beacons may be low-cost devices that communicate with mobile device (e.g., smartphone) apps through a Bluetooth signal. Beacons are expected to directly influence over $4 billion worth of US retail sales this year at top retailers (0.1% of the total), and that number may climb tenfold in 2016. Current beacon implementations are relatively crude and typically broadcast the same, static content (e.g., a coupon, regardless of circumstances or a potential customer's demonstrated intent). Beacon technology has enormous potential to enhance the shopping experience. For example, beacon technology may make it quicker and easier for customers to access the information and products they are looking for or provide special offers or discounts to loyal shoppers. Beacon technology can also provide retailers with invaluable data about their customers' shopping habits as well as the activity of their staff. Thus, retailers may make improvements to the store layout by identifying store flow, maintaining service standards, and maintaining operations that will benefit both customer and retailer. Current implementations of beacon technology, however, have failed to develop a more dynamic set of interactions with potential customers, particularly those which are based on and distinguish between various location-based actions.

There has been some development in the use of beacon technology in store (customer) environments, however, the implementation of beacon technology remains limited.

United States Patent Application Publication No. 2015/0287045, filed Apr. 6, 2015 by Brown et al., which is incorporated by reference as if fully set forth herein, describes a "system for monitoring compliance with a retail display program includes a beacon coupled to a promotional display structure." The system includes a "computing device [that] is configured to compare the location-specific data and time stamp to the specified retail facility and time period to determine whether the promotional display structure is displayed in the specified retail facility during the specified time period." The system in Brown, however, requires that "Each promotional display structure 20 is intended to be displayed at a specified retail facility 50. Moreover, in the example embodiment, each promotional display structure 20 is intended to be displayed at a specified location 60 within specified retail facility 50." Thus, the system of Brown requires that the intended location of each "promotional display structure" be known before the display structures are sent to their locations so that compliance of the structure (e.g., is it displayed in the correct location) may be determined. However, as is known in the art of promotional displays, it can often be very difficult and cumbersome to ensure and know the intended locations of promotional displays. For example, a large set of identical promotional displays are often sent to a warehouse for storage before being randomly sent out to retail locations without any thought being given as to the intended location for each specific promotional display. Further, multiple locations within a retail location may be intended for a given display once it reaches the retail location.

United States Patent Application Publication No. 2014/0282620, filed Mar. 15, 2013 by Nuovo et al., which is incorporated by reference as if fully set forth herein, states: "detecting an advertised device identifier and comparing the detected device identifier with device identifiers stored on the mobile device. If there is a match, the match can trigger an event. The event can be requesting content associated with the matched device identifier, receiving the requested content, and rendering the received content. The requested content can be selected to have additional, corresponding content downloaded and rendered." This identification is done by "an application that operates on a mobile device. When executed, the application can cause the mobile device to search for device identifiers, e.g., media access controller addresses and/or broadcast identifiers (IDs), which are advertised by wireless beacon units, such as WiFi beacon units and Bluetooth beacon units."

United States Patent Application Publication No. 2002/0176388 filed Mar. 19, 2002, by Rankin and Simons, which is incorporated by reference as if fully set forth herein, describes a centralized system for updating beacons. The system includes "a modification to the Bluetooth system to enable the connectionless broadcast of short messages from Bluetooth beacons. This can be achieved by exploiting the Bluetooth Inquiry phase by extending the very short ID packet sent out during this mode and using the extra space thus gained to carry a small amount of information. This information can be Bluetooth system related data or one-way application data. This scheme has the potentially useful feature of being backwards-compatible with legacy Bluetooth devices that are not able to understand this extra field."

United States Patent Application Publication No. 2002/0183004 filed Mar. 15, 2002, by Fulton et al., which is incorporated by reference as if fully set forth herein, describes specialized beacons that are dedicated to either inquiries or transmitting information to a client.

United States Patent Application Publication No. 2007/0254670, filed May 1, 2006, "System and method for optimizing throughput in a wireless network," by Kawaguchi and Le, which is incorporated by reference as if fully set forth herein, discusses throttling bandwidth within a mesh network. For example, "When the switch 10 determines that a selected mesh node is utilizing a portion of the bandwidth outside of the predetermined threshold range, the switch 10 executes a predetermined action (e.g., throttling) on transmissions from the selected node to provide increased bandwidth to mesh nodes further from the switch 10 than the selected node."

WIPO Patent Application WO/2013/054144, "Method of Estimating the Position of a User Device Using Radio Beacons and Radio Beacons Adapted to Facilitate the Methods of the Invention" by Usman, et al., which is incorporated by reference as if fully set forth herein, discloses methods for "calculating an estimate of the position of the user device taking into account transmit power data concerning the transmit power level of the one or more said radio beacons . . . " Page 2, lines 16-18.

U.S. Pat. No. 6,571,279, issued to Herz et al., which is incorporated by reference as if fully set forth herein, discloses location based services, but more from the perspective of a cellular network. It states, "The operation of the location enhanced information delivery system as described herein makes use of the fact that each user has a 'beacon', which generally serves as a user identification instrumentality. The beacons emit identifiers which can be used to associate users with the detected devices. The beacon can be correlated with location, such as by use of a wireless subscriber station or other systems with known technology."

United States Patent Application Publication No. 2014/0358666, "Cross-Channel Personalized Promotion Platform," by Baghaie and Dempski, which is incorporated by reference as if fully set forth herein, describes a platform for allowing advertisers to purchase promotional opportunities on user's mobile devices.

United States Patent Application Publication No. 2012/0315839, "Analyzing Audiences at Public Venues," by Mumcuoglu and Engel, which is incorporated by reference as if fully set forth herein, discusses the use of wireless signals to physically locate a user but does not discuss the utilization of that information in real time to transmit pertinent information to that user.

Despite the previous disclosures described above, there remains many needs related to the concepts of adjusting or "throttling" a connection (or a transmission), determination of bumping, or the notions of pushing or pulling content beyond generic downloading of specific content from a centralized server as discussed herein. In addition, there is still a need for monitoring surrounding activity and assessing user locations and/or display locations. In certain applications, transmissions (or connections) may need to be throttled with respect to a specific location (e.g., a point of sale). In some applications, there is a need for the content transmitted over that connection to be varied in relation to either the throttling or determined range. Thus, there are still improvements needed in the application of beacon technology to engage with customers during their in-store shopping experience and for supporting customers' in-store shopping experiences.

SUMMARY OF THE INVENTION

In certain embodiments, context aware solutions are provided for delivering content to potential customers in an efficient manner in association with POP ("point of purchase") displays that are used in retail environments. Embodiments disclosed herein include wireless beacon technology associated with the POP displays that can vary the content delivered based upon the relative distance of the potential customer and whether the potential customer has indicated any product interest. This allows for content to be "throttled" to potential customers based on a software configuration that exempts customers who have not signaled interest from being included in messages that might overload and/or annoy the customers and/or trigger privacy concerns due to unrequested content. Potential customers that have signaled interest, however, may receive content without any throttling. Furthermore, embodiments disclosed herein may distinguish between "push"—use cases where content is provided without an intentional request by the customer—and "pull"—use cases where content has been intentionally requested by the customer through a physical interaction between the POP display and a customer device (e.g., the customer device being "bumped", i.e., intentionally placed in close proximity to an area on the POP display). The exact information that is pushed or pulled may be located on a remote server that may be configured for each potential use case. Embodiments disclosed herein may provide implementations that conserve power by allowing devices (e.g., wireless beacons) to be configured to activate at a later date, namely after they have arrived at a certain destination (e.g., a display location). Embodiments disclosed herein may provide for utilizing context awareness to reduce power consumption when it is unlikely for a potential customer to be around (e.g., when a retail area is dark or no activity is detected). Furthermore, this context awareness may enable manufacturing and distributions methods to be suited to large-scale production and distribution of POP displays across many locations. Improved logistical schemes for manufacturing and distributing the embodiments disclosed herein may also be provided since one need not determine beforehand the exact final location of the POP display and its beacon before distribution to individual retail or advertising venues.

In certain embodiments, the disclosed systems and methods include a variety of sensors to aid in assessing a proximity of potential customers to the POP display and measuring the surrounding environment. This information may be recorded and analyzed to gain additional insights about consumer behavior and to gauge the device's performance. Additionally, information may be inferred from the signal strength of user devices (e.g., mobile devices) carried by potential customers. This information may also be retained and analyzed. In some embodiments, the system may transmit data to a server through various means. For example, a traditional permanent gateway may be utilized, or user devices with network connectivity that are carried by employees or potential customers may be utilized to relay the stored information to the server.

Embodiments disclosed herein may provide efficient means for communicating with individuals, either to inform or to advertise, and to record information about the disclosed embodiments' performance and its environment. In some embodiments, the recorded information is harnessed to enable improved logistical schemes to be provided for manufacturing and distributing the disclosed embodiments even when it is unknown where and/or when the disclosed device will be delivered and/or begin operation.

In certain embodiments, an apparatus includes a point of purchase (POP) display having a consumer product display. The POP display may be configured to be deployed at a retail location. At least one printable circuit may be attached to the POP display. The at least one printable circuit may include printed data for a selected retail campaign associated with the POP display. The printed data may include one or more parameters for the selected retail campaign. The at least one printable circuit may be configured to provide the parameters for the selected retail campaign to a wireless beacon when the wireless beacon is attached to the at least one printable circuit on the POP display. The wireless beacon may be assigned a unique identifier in at least one parameter provided to the wireless beacon.

In certain embodiments, a system includes a point of purchase (POP) display having a consumer product display. The POP display may be configured to be deployed at a retail location. At least one printable circuit may be attached to the POP display. The at least one printable circuit may include printed data for a selected retail campaign associated with the POP display. The printed data may include one or more parameters for the selected retail campaign. A wireless beacon may be configured to be attached to the at least one printable circuit on the POP display. The wireless beacon may include an integrated circuit device having a processor and a memory. The memory may include instructions for receiving the printed data on the at least one printable circuit when the wireless beacon is attached to the at least one printable circuit. At least one of the parameters for the selected campaign in the printed data may include a unique identifier for the wireless beacon. The wireless beacon may be configured to receive the unique identifier from the printed data when the wireless beacon is attached to the at least one printable circuit.

In certain embodiments, a method includes placing a plurality of wireless beacons into one or more trays associated with a tape and reel system. Each wireless beacon may include an integrated circuit device having a processor and a memory. The memory may include instructions for receiving printed data on at least one printable circuit. Printable circuits may be attached to a plurality of point of purchase (POP) displays. The POP displays may be consumer product displays configured to be deployed at a retail location. The printable circuits may include printed data for a selected retail campaign associated with the POP displays. The printed data may include one or more parameters for the selected retail campaign. The trays with the plurality of wireless beacons may be placed in a machine configured to attached the wireless beacons to the plurality of POP displays. At least one wireless beacon may be attached to a printable circuit on each of the POP displays. The at least one wireless beacon may receive the printed data on the printable circuit on the POP display when the wireless beacon is attached to the printable circuit. At least one of the parameters for the selected campaign in the printed data may include a unique identifier for the wireless beacon. The wireless beacon may receive the unique identifier from the printed data when the wireless beacon is attached to the printable circuit.

BRIEF DESCRIPTION OF THE DRAWINGS

Features and advantages of the methods and apparatus described herein will be more fully appreciated by reference to the following detailed description of presently preferred but nonetheless illustrative embodiments when taken in conjunction with the accompanying drawings in which:

FIGS. 4A-4K depict examples of content being displayed on a display of a mobile device.

FIG. 5 depicts a flowchart of an embodiment of a method to assess a location of a wireless beacon and its POP display.

FIG. 6 depicts a flowchart of an embodiment of a method used to assess a location of a POP display.

FIG. 7 depicts a flowchart of a second embodiment of a method used to assess a location of a POP display.

Figure 1:
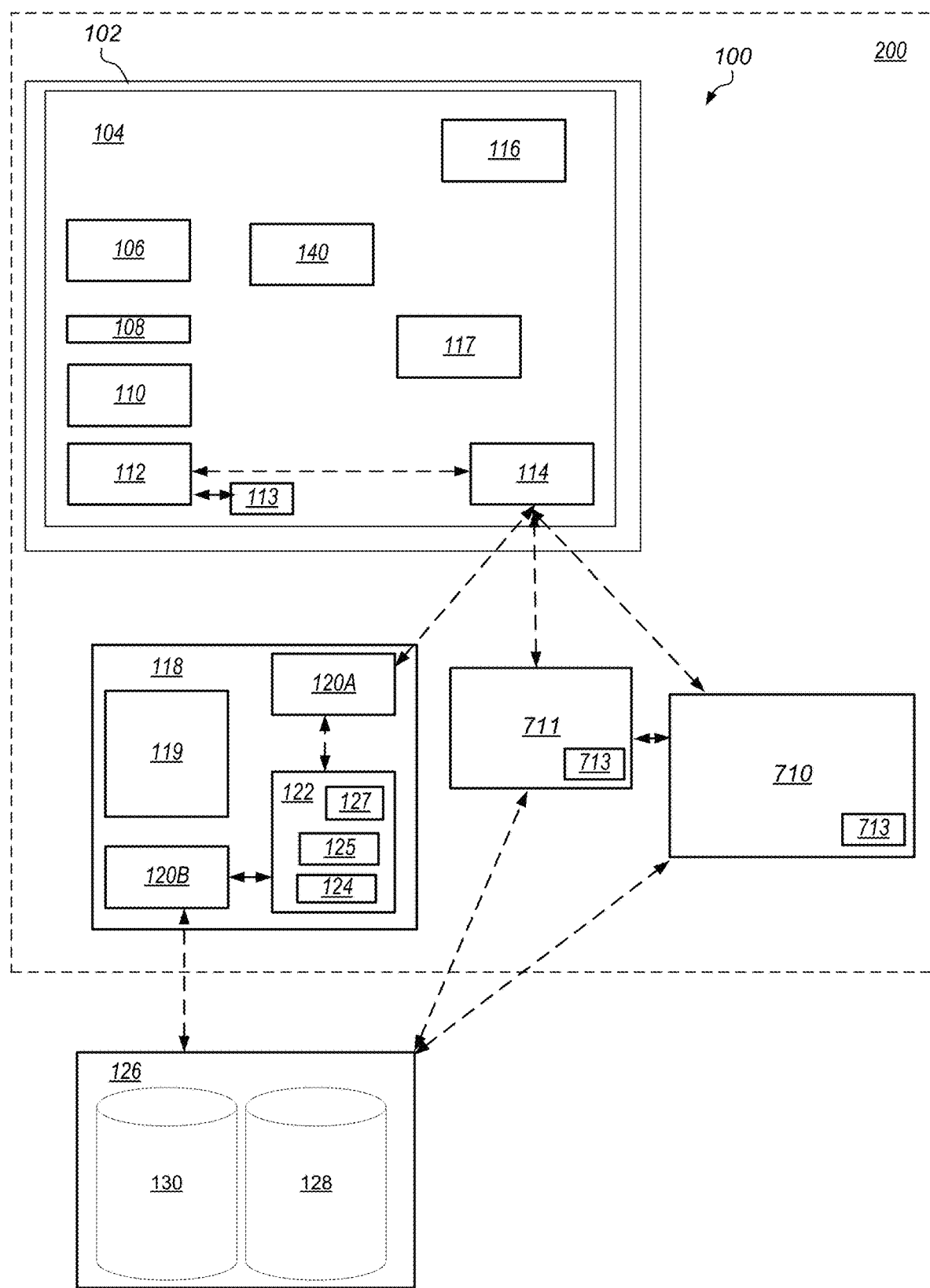
FIG. 1 depicts a block diagram of an embodiment of a point of purchase display system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The term "automatically" refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

The following examples are included to demonstrate preferred embodiments. It should be appreciated by those of skill in the art that the techniques disclosed in the examples which follow represent techniques discovered by the inventor to function well in the practice of the disclosed embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosed embodiments.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the disclosed embodiments will be apparent to those skilled in the art in view of this description. Accordingly, this description is to be construed as illustrative only and is for the purpose of teaching those skilled in the art the general manner of carrying out the disclosed embodiments. It is to be understood that the forms of the disclosed embodiments shown and described herein are to be taken as examples of embodiments. Elements and materials may be substituted for those illustrated and described herein, parts and processes may be reversed, and certain features of the disclosed embodiments may be utilized independently, all as would be apparent to one skilled in the art after having the benefit of this description of the disclosed embodiments. Changes may be made in the elements described herein without departing from the spirit and scope of the disclosed embodiments as described in the following claims.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

As used herein, the word "display" is intended to include an array of merchandising materials and store-based assets such as, but not limited to, signs, test product or samples, high-value or high-interest products, permanent or semi-permanent fixtures, coupon dispensers, aisle-based video screens, mobile coolers, or other movable assets within a retail outlet.

FIG. 1 depicts a block diagram of an embodiment of point of purchase ("POP") display system 100. In certain embodiments, system 100 includes POP display 102. In certain embodiments, circuit board 104 is located on POP display 102. Circuit board 104 may be, for example, a printed circuit board or any other suitable circuit board for connecting and operating multiple electronic components including, but not limited to, integrated circuits. Circuit board 104 may be placed (installed) on, or coupled to, POP display 102 during or after manufacturing of the POP display.

In certain embodiments, circuit board 104 includes battery 106, switch 108, memory 110, controller 112, wireless beacon 114, and sensors 116. In certain embodiments, controller 112 includes circuitry, an integrated circuit, or a processor operable to control operation of wireless beacon 114 and/or other components of circuit board 104 and/or POP display 102. Memory 110 may include many different types of memory known in the art for use on a circuit board. For example, memory 110 may be flash memory, RAM, EEROM, EEPROM, and/or one-time programmable memory.

In some embodiments, controller 112 is coupled to clock 113. Clock 113 may be capable of tracking both date and time. Clock 113 may be associated with wireless beacon 114 to provide time information (e.g., date and time) to the wireless beacon. In some embodiments, clock 113 is located in a chip on circuit board 104. In some embodiments, clock 113 is located in a microprocessor in wireless beacon 114.

In some embodiments, circuit board 104 includes unique label 117. Unique label 117 may be added during or after manufacturing of circuit board 104. Unique label 117 may be, for example, a printed label, such as a QR label or barcode, that can be viewed or electronically scanned for identifying information. Unique label 117 may include a unique identification for circuit board 104 that differentiates the circuit board from other circuit boards that may be used on other POP displays. For example, each circuit board 104 may have its own identification number that specifically identifies the circuit board.

Figure 1A:
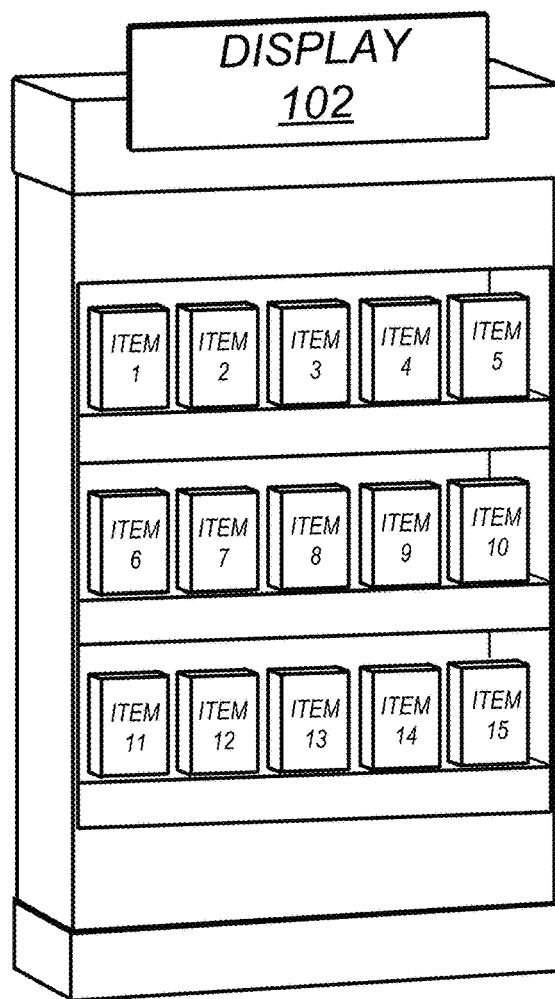
FIG. 1A depicts an example of an embodiment of a POP display.

POP display 102, as described herein, may be any display that holds products and/or advertises products. For example, POP display 102 may include signs, graphics, or other marketing materials that communicate information about a product to a consumer. FIG. 1A depicts an example of an embodiment of POP display 102. In some embodiments, POP display 102 includes the product itself. For example, products such as, but not limited to, demo units of electronic items, appliances, and/or rugs may be a POP display. POP display 102 is typically placed next to or near the merchandise the display is promoting and/or included as part of the merchandise. In some embodiments, POP display 102 is utilized to hold, support, or display products associated with the POP display. In certain embodiments, POP display 102 is a corrugated cardboard display. POP display 102 may also include displays made from materials such as, but not limited to, paper, paperboard, bristol board, foam cored board, plastic, metal, or any other material suitable for holding and/or advertising products.

POP display 102 may be a component of a marketing or promotional campaign. In certain embodiments, POP display 102 is generally located in a retail environment (e.g., a retail store) or any other location where a customer purchases product or a decision to purchase product is made. In some embodiments, POP display 102 is placed in other display locations in order to drive potential customers to a specific area. For example, POP display 102 may be placed in a window display and used to provide (e.g., "beam") promotional information to people as they pass by outside a retail store. Regardless of the location of POP display 102, the POP display may be intended to draw the customer's attention to products associated with the display. These products may, in some embodiments, be new products, products on sale, and/or products associated with a special offer. POP display 102 may also be used to promote special events (e.g., seasonal or holiday-time sales).

In certain embodiments, as shown in FIG. 1, POP system 100 includes the use of customer device 118. Customer device 118 may be, for example, a mobile device. Customer device 118 may be a small computing device, typically small enough to be handheld (and hence also commonly known as a handheld computer or simply handheld). Mobile devices may be any of various types of computer systems devices which are mobile or portable and which perform wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi. In certain embodiments, customer device 118 includes any device used by a customer with display 119 (e.g., an LCD screen or touchscreen), one or more wireless transceivers (e.g., wireless transceivers 120A, 120B, shown in FIG. 1), software package 122, and memory cache 124. Display 119, in some embodiments, includes a user interface for customer device 118 (e.g., the display allows interactive input for the user).

In certain embodiments, wireless beacon 114 on POP display 102 interacts with customer devices 118 carried by potential customers. Wireless beacon 114 may be configured to interact with customer devices 118 through wireless transceiver 120A. In certain embodiments, wireless transceiver 120A is a Bluetooth Low Energy ("BLE") transceiver.

In certain embodiments, wireless beacon 114 includes a unique identifier associated with the wireless beacon. The unique identifier may be broadcast by wireless beacon 114, received through wireless transceiver 120A, and used to identify the wireless beacon (e.g., the unique identifier may be used by a server to identify the wireless beacon as described herein). Thus, in embodiments with multiple wireless beacons 114, the wireless beacons broadcast their respective unique identifiers and the unique identifiers may be used to identify and/or differentiate the wireless beacons and, by extension, the circuit board and POP display associated with each wireless beacon.

Wireless beacon 114 may be a transponder sending data via radio signals. In certain embodiments, wireless beacon 114 is a Bluetooth Low Energy ("BLE") beacon. A Bluetooth LE beacon may operate in either peripheral or central mode, depending on the circumstances, though in certain embodiments, the beacon may default to peripheral mode. Chipsets implementing beacon functionality may be commercially available. Two non-limiting examples are the Texas Instruments CC2541 and CC2600. The disclosed embodiments, however, do not depend on the particular choice of Bluetooth chipset.

Bluetooth low energy (Bluetooth LE, BLE, also marketed as Bluetooth Smart) is a wireless personal area network technology designed and marketed by the Bluetooth Special Interest Group aimed at applications in the healthcare, fitness, beacons, security, and home entertainment industries. Compared to Classic Bluetooth, Bluetooth Smart is intended to provide considerably reduced power consumption and cost while maintaining a similar communication range.

Bluetooth Smart was originally introduced under the name Wibree by Nokia in 2006. It was merged into the main Bluetooth standard in 2010 with the adoption of the Bluetooth Core Specification Version 4.0. In certain embodiments, wireless beacons 114 are Bluetooth LE beacons. Bluetooth LE beacons may be used, at least in part, because Bluetooth LE has been widely adopted in customer devices 118 (e.g., mobile devices). Thus, a potential consumer may likely already have the requisite hardware to interact with circuit board 104 and POP display 102. For example, Bluetooth LE has been built into iPhones and iPads since 2010, and many Android devices since 2013. Bluetooth LE wireless beacons are also, as the name implies, energy efficient, which may be an important consideration for technology deployed on mobile devices. In certain embodiments, the positioning and data transmission capabilities of Bluetooth LE are also of use, though the embodiments disclosed herein may also be implemented using other wireless standards, including the various versions of IEEE 802.11.

In certain embodiments, POP display system 100 includes server 126. Server 126 may communicate with customer device 118 through wireless transceiver 120B on the customer device. In certain embodiments, wireless transceiver 120B is a WiFi-enabled or cellular transceiver. Server 126 may include content 128. In certain embodiments, content 128 is uploaded to server 126 via an exposed API (Application Programming Interface). Content 128 may be included as part of a storage structure or storage management system (e.g., a database) accessible by server 126. For example, content 128 may be stored in a database in an accessible memory of server 126. In certain embodiments, content 128 includes information that corresponds to advertising, marketing, and/or promotional campaigns associated with POP displays 102. For example, content 128 may include, but not be limited, campaign start times, campaign time periods, campaign locations, coupons associated with the campaign, advertising and/or marketing associated with the campaign, and promotions associated with the campaign.

As server 126 includes content 128, the server may be referred to as a "content server", though the phrase "content server" as used in this disclosure should not be considered strictly limiting. In some embodiments, the physical server(s) (e.g., server 126) that stores content 128 may perform other functionality and/or work in conjunction with other servers to enable some or all of its functionality. For example, server 126 may work with a load balancing server to optimize its communications load over a network or authentication servers to validate the entities requesting a download of content. In some embodiments, server 126 may operate in a distributed nature such that content 128 is distributed over more than one physical storage device or logical drive partitions. The term "content server" is intended to encompass all of these scenarios and any other that one of ordinary skill in the art would contemplate in implementing the disclosed functionality.

In certain embodiments, server 126 includes information 130. Information 130 may be included as part of a storage structure or storage management system (e.g., a database) accessible by server 126. Information 130 may include information regarding POP display 102 and wireless beacon 114 such as, but not limited to, the unique identifier, location information (if known), and retail location information for the POP display (e.g., store location information for a specific retailer associated with the POP display). In some embodiments, information 130 includes information recorded from sensors 116 and/or other components on POP displays 102 as well as information recorded on customer devices 118 that is transmitted to server 126.

In certain embodiments, SDK ("Software Developer Kit") 125 is located in software package 122 on customer device 118, as shown in FIG. 1. SDK 125 may allow programmers to develop applications (e.g., mobile application 127) for customer device 118 that interface the customer device with server 126 and circuit board 104. SDK 125 may abstract low level implementation details of POP display system 100 and simplify the development of software applications compatible with the disclosed embodiments. In certain embodiments, SDK 125 includes functionality to facilitate accessing APIs exposed by server 126 (e.g., the content server) as well as wireless (e.g., Bluetooth) mediated interactions with wireless beacons 114.

In certain embodiments, mobile application 127 is located in software package 122 on customer device 118. Mobile application 127 may be coupled to SDK to allow the mobile application to interface and utilize functions of the SDK. In some embodiments, SDK 125 may be embedded in mobile application 127 (e.g., the SDK is a software code element of the mobile application). Mobile application 127 may be, in some embodiments, a retailer "app" or other mobile application written for interaction between a customer and a specific retailer (e.g., the mobile application may be a customer loyalty app specific for a selected retailer). In certain embodiments, mobile application 127 provides an interactive interface for the customer through customer device 118. For example, mobile application 127 may use display 119 as a user interface (the display is a touchscreen) to allow interactive customer input or the mobile application may use the display in combination with another input system (e.g., a keyboard or voice input) to allow interactive customer input. In certain embodiments, mobile application 127 utilizes SDK 125, when run on customer device 118, to detect that the customer device is in proximity to a compatible Bluetooth LE beacon (e.g., wireless beacon 114), as described herein.

In certain embodiments, SDK 125 is configured to receive measurements from customer device 118 through built-in features of the customer device. For example, SDK 125 may receive measurements from accelerometer, gyroscope, compass, audio, light, or Near Field Communication measurements on customer device 118. These measurements may be utilized to increase the accuracy of calculated location information or used to infer additional information about either a user or an environment of POP display 102. For example, information from an accelerometer on customer device 118 may be combined with other information to increase the accuracy of detection of "bumps" or recognition of gestures as described below.

In some embodiments, the measurements received by SDK 125 are sent to server 126 and stored in information 130. Server 126 may integrate the measurement information from customer device 118 to increase accuracy of location information and/or infer additional information, as described below. In some embodiments, server 126 may integrate the measurement information with information from external data sources, which may be located in information 130 on the server. For example, server 126 may integrate store specific information from nearby beacons, geolocation information provided by a retail loyalty application on connected mobile devices, or other information received from third party sources.

In certain embodiments, POP display system 100 utilizes wireless signal strength to infer distance between customer device 118 and POP display 102. POP display system 100 may utilize this distance information to modulate and/or control the particular information conveyed to the customer through customer device 118. In certain embodiments, SDK 125 in software 122 on customer device 118 receives information, based on distance, indicating the detection of "bumps" or "pulls" (e.g., when a user physically touches (or very nearly so) the customer device against a designated area of POP display 102 (e.g., at or near a "tap device here for more information" designated area)). In the disclosed embodiments, the concept of bumping is applied as a way for a user to express interest in POP display 102 independent of any technical requirements of the underlying wireless communication protocol being used.

Various techniques may be utilized to estimate distance between customer device 118 and POP display 102. For example, in certain embodiments, Received Signal Strength Indication ("RSSI") values of Bluetooth signals are measured and analyzed to infer distance. The distance inferred may be relative or absolute in nature (e.g., the technique may only specify a distance from POP display 102 as opposed to exact position). By means of illustration, the general relationship between RSSI value and distance is approximately $RSSI[dbm] = -(10 \times n \times \log_{10}(d) - A)$, where d is the distance and A is the offset which is the measured RSSI value 1 meter point away from the Bluetooth LE device. Again, this is provided simply for illustrative purposes and other relationships and formulas may be utilized by the disclosed embodiments to infer location information about the customer device and, by extension the customer. Other examples of values that may be utilized to determine signal strength include, but are not limited to, packet loss ratio or rate, header error check, cyclic redundancy check, and forward error correction. Furthermore, the measurement of these various values, including RSSI, may be implemented in numerous ways in hardware. For example, one may utilize Goertzel algorithms to derive signal strength values from a series of transceiver power measurements. As shown above, the precise implementation details of the measurement to calculate location information can vary and the embodiments disclosed herein may be suited to the usage of any measurement to calculate location information. Furthermore, location related information (e.g., signal strength measurements, values derived from signal strength measurements, identifiers associated with a particular mobile device, timestamps associated with a signal strength reading) may be saved to a memory (e.g., memory 110 or memory cache 124) for future review and/or analysis. In some embodiments, the location related information includes information about customer device 118. For example, the information may include information about chipsets, antennas, and/or an operating system of customer device 118. The information about customer device 118 may be part of the future review and/or analysis to increase accuracy in assessing relative location information of the customer device and POP display 102.

In certain embodiments, signal strength (e.g., Bluetooth signal strength as measured, for example, via RSSI) between POP display 102's wireless beacon 114 and wireless transceiver 120A on customer device 118 is monitored and, if it surpasses a predefined threshold or "trigger" level, it is inferred that the customer has "bumped" the customer device against the POP display and has made a "pull" delivery request (e.g., the user has indicated his/her intention to receive or "pull" content associated with the POP display). In certain embodiments, the predefined threshold is set at a signal strength level that indicates that the user has clearly intended to initiate a "bump" or "pull" with POP display 102. For example, the predefined threshold may be set at a signal strength level that clearly defines customer device 118 has intentionally been placed on or near to the designated area of POP display 102 by the customer. In some embodiments, the predefined threshold is combined with other information (e.g., information from an accelerometer on customer device 118) to define intent of the customer in "pulling" for content. For example, accelerometer data may be combined with the predefined threshold (measured via RSSI) to recognize a gesture (e.g., movement of customer device 118 in an intentional way) made by the user that indicates intent of the customer to receive information.

In certain embodiments, the predefined threshold improves the reliability of bump detection and the threshold may be dynamic in nature. For example, the threshold may be specified by a formula that accounts for certain variables rather than a set static number. In some embodiments, the algorithm may not allow a new bump to be registered until the signal is outside of a separate threshold, usually higher in value than the entrance threshold. This restriction may help to prevent spurious bumps. Additional techniques may be utilized to improve bump detection between customer device 118 and wireless beacon 114 (such as a filter to smooth RSSI values). In some embodiments, signal profiles for setting the predefined threshold are associated with a type of customer device 118 (e.g., a type of mobile device, an operating system used on the mobile device, and/or a type of antenna used in the mobile device). Server 126 may receive type data for customer device 118 when the customer device is in contact with the server (e.g., the receiver receives mobile device type information and/or operating system information). Server 126 then may send signal profiles (e.g., RSSI signal profiles) associated with the type data to SDK 125 on customer device 118 based on the received type data for the customer device. The signal profiles may be sent to SDK 125 on customer device 118 along with content for engagement of the customer device with POP display 102 (e.g., the content and the signal profiles are sent in the same data packet to the SDK or "substantially simultaneously" to the SDK). SDK 125 may store the signal profiles in memory cache 124 for accessing in assessment of bump indications using customer device 118. SDK 125 may use the signal profiles to define a predefined threshold level in the signal strength for engagement between customer device 118 and POP display 102.

In certain embodiments, the signal profiles sent to SDK 125 by server 126 are specific to customer device 118. For example, the signal profiles may be specifically characterized based on customer device 118 being a specific type of mobile device, having a specific operating system, and/or having a specific antenna. In some embodiments, the signal profiles include RSSI signal profiles specific to customer device 118. Providing signal profiles specific to different customer devices 118 allows different customers using the different customer devices to be provided with substantially consistent customer engagement experiences.

In some embodiments, the signal profiles sent to SDK 125 on customer device 118 are updated as the operating system on the customer device changes. For example, signal profiles associated with a specific customer device may be modified or updated when a new or updated operating system is released for the specific customer device. Thus, if server 126 determines that the operating system on customer device 118 has changed to a new or updated operating system that requires updated signal profiles, the server may provide the updated profiles to the customer device when a request for up-to-date content is received from the customer device. The signal profiles for the specific customer device may also be updated for other changes that may affect the signal profiles (e.g., hardware changes or network changes). Updating the signal profiles associated with customer devices 118 may be used to continually refine and/or provide consistency in customer engagement experiences associated with POP display 102.

Some embodiments may utilize different methods for gauging distance. For example, other performance measures associated with a Bluetooth signal, RSSI values associated with a 802.11 WiFi signal, information from a Near Field Communication signal, etc. may be used. Regardless of the origin and type of information used, the associated algorithms may utilize the information to detect bumps. In some embodiments, the detection of bumps is performed in circuit board 104 rather than on customer device 118.

Bumping may be used to signal that the customer is explicitly requesting digital content (e.g., requesting content to be display on display 119 of customer device 118). In the event that a bump is detected, the SDK may provide content to the customer on customer device 118 (this may be referred to as "pull" delivery). For example, content may be display on display 119 through mobile application 127. The content may include content stored in memory cache 124, which includes content 128 previously received from server 126 as described herein. Conversely, "push" delivery may occur in the absence of a bump, where content 128 may be delivered by server 126 to customers that have not explicitly requested content. In certain embodiments, unsolicited push content is throttled to prevent from overloading the customer with unrequested content, while pull content (e.g., requested content) is not throttled. In some embodiments, the exact throttling scheme used is configurable by software and may be specified by various entities. For example, the exact throttling scheme may be specified by a POP display owner, a retailer, an advertising company, a manufacturer of goods or services associated with the POP display, etc.

In some embodiments, a throttling scheme is personalized for a particular user. For example, the throttling scheme may include personalized data based on a persona of the user. The personalized data may be uploaded to and/or stored in memory cache 124 on customer device 118. The persona of the user may include categories based on one or more user preferences. The preferences may be for categories that include non-specific information about the user (e.g., anonymous information based only on the behavior of the user). Using non-specific information may protect privacy and security of the user of customer device 118. In some embodiments, the persona of the user is defined by preferences specified by a retailer (e.g., through a retailer app in SDK 125 on customer device 118).

Information relevant to the throttling scheme may be incorporated in several aspects of the disclosed embodiments. First, content 128 may be uploaded to server 126 via an exposed API (Application Program Interface) designed to work with the overall device ecosystem. This API requires that the uploaded content be associated with information that allows server 126 to associate content 128 with specific beacons (e.g., wireless beacon 114). The API may also require information associated with the uploaded content that will allow customer device 118, via an API call, to determine if the content should be served up based on push or pull.

In certain embodiments, as described above, there are various ways for a user to indicate or provide an indication that the user has interest in information (e.g., content) regarding POP display 102. The user may indicate or provide an indication of the user's interest in content through interaction of customer device 118 with wireless beacon 114 and POP display 102. In some embodiments, "bump" interaction is used to indicate that the user has interest in content for POP display 102. Bump interaction may include the user placing customer device 118 within a selected distance of wireless beacon 114 to indicate a desire to pull content related to POP display 102. The selected distance may be determined based on a predefined threshold level in signal strength as described herein.

In some embodiments, "dwell" interaction is used to indicate that the user has interest in content for POP display 102. Dwell interaction may include the user (and their customer device 118) dwelling within a selected distance of POP display 102 for a selected time period. Content may be displayed on customer device 118 after the selected time period is reached with the user within the selected distance of POP display 102. The selected distance and/or the selected time period may be predetermined for customer device 118. For example, customer device 118 may include settings determined by the user (e.g., user-configurable settings in a retailer app).

In some embodiments, "push" interaction is used to indicate that the user has interest in content for POP display 102. Push interaction may include customer device 118 receiving data packets from wireless beacons 114 and displaying content in response to receiving the data packets. As described above, push interaction may be controlled or throttled to prevent the user from being overloaded with content. Additionally, SDK 125 may allow the user to determine whether they accept or reject content from push interactions (e.g., the user may be allowed to select to receive or not receive push interaction content in mobile application 127).

In certain embodiments, settings for the interactions described above are tuned and provided to customer device 118 by server 126. The setting for the interactions may define thresholds for when content is displayed to the user on customer device 118 in response to an interaction between the customer device and POP display 102. Settings for the interactions may include distances for detection of the interactions (e.g., predetermined signal strengths), predetermined time periods for the interactions, and/or other characteristics that control interactions described herein. In some embodiments, the settings for the interactions are provided to customer device 118 along with content associated with POP display 102. As the content associated with POP display 102 is typically received (e.g., updated) after data packets from wireless beacon 114 are received, the settings for the interactions may be provided to customer device 118 at a time just after the interaction between the customer device and POP display 102 occurs and just before content is displayed to the user.

In certain embodiments, as shown in FIG. 1, POP display 102 includes sensors 116. Sensors 116 may provide monitoring of activity in and/or around the POP display. In certain embodiments, sensors 116 include proximity sensors that detect activity in the vicinity of POP display 102. Proximity sensor may detect activity based on, for example, heat, light (reflected infrared and/or visible light), sound, and/or images. Examples of sensors 116 include, but are not limited to, ambient light sensors, passive infrared sensors, active infrared sensors, and image based detection sensors. Other examples include accelerometers, temperature sensors, weight sensors, cameras, and sensors that detect when a product has been dispensed or when a display needs to be restocked.

Sensors 116 may be used to measure and record (and, in some embodiments, timestamp in combination with clock 113) activity around the display and save these measurements in memory 110. These measurements and recordings may provide information that can be used for detailed analysis of the level of traffic around POP display 102 by time. The analysis may include determining information such as, but not limited to, how many people walk past the display, how many people stop to look at the display, when a door is opened, how long the door is opened, and whether products are removed. Such analysis may include measuring the timing of the activity, such as how long a potential customer stood in front of the display, commonly referred to as dwell time. Other potential analyses include, but are not limited to, how many shoppers passed by (divided into buckets of time), the average dwell time per shopper, and/or counts of shoppers that had smartphones (customer devices 118) equipped with software package 122. Measurement data from sensors 116 stored in memory 110 may be transmitted (broadcast) in data packets sent out by wireless beacon 114. The data packets with the measurement data may be received by, for example, customer devices 118, network gateway 710, and/or data collection device 711 to then be transmitted to a remote server (e.g., server 126).

In certain embodiments, sensors 116 include a proximity sensor that monitors activity only within a defined range (e.g., a defined distance) from POP display 102. Sensor data may also be used in a transmission throttling scheme as described herein (e.g., a particularly crowded store might dictate the use of a different transmission). Additionally, as described herein, the connection between wireless beacons 114 and/or customer devices 118 may be utilized to share information between POP displays 102.

In some embodiments, a data packet broadcast by wireless beacon 114 includes information regarding assessment of the state of one or more components on POP display 102. Server 126 may receive the data packet to monitor the status of POP display 102 and its components. For example, the data packet may include information regarding an amount of battery power remaining in battery 106. Battery power remaining information may be used by server 126 to estimate a remaining operation lifetime of POP display 102. The battery information may also be used to alert the retail location that POP display 102 is nearing an end of its useful operation. Examples of other component states that may be assessed and provided in the data packet include the state of circuit board 112 or memory 110 (e.g., errors in operation of the circuit board and/or memory), the state of an electronic display on POP display 102, state of clock 113, and operation or status of sensors 116. Assessment of the states of the components may also include assessment of whether a component is active, inactive, in a lower power mode, etc.

In some embodiments, a data packet broadcast by wireless beacon 114 includes information regarding assessment of one or more conditions and/or a status of POP display 102. For example, the data packet may include information regarding one or more conditions and/or a status assessed using image processing of captured images of POP display 102, as described herein. In some embodiments, the data packet includes information about the presence of one or more components on POP display 102. For example, as described herein, the data packet may include information regarding assessment of the presence (or lack of presence) of additional merchandising materials and/or products on POP display 102. The data packet may also include information regarding whether components coupled to and shipped with POP display 102 have been removed from POP display 102. For example, the data packet may include assessment if sensors or cameras have been removed from POP display 102, which can affect the effectiveness of the POP display.

In certain embodiments, information recorded from sensors 116 and/or other components on POP displays 102 as well as information recorded on customer devices 118 is transmitted and stored in server 126 as information 130. Information recorded on customer devices 118 may include any information or data relating to interactions between the customer devices and wireless beacons 114, interactions between the customer devices and server 126, other interactions involving the customer devices, and data obtained by the customer devices such as device sensor data (e.g., position and/or movement measurement data) and/or application data from the software package. In some embodiments, recorded information may be stored in memory cache 124 on customer device 118 before being transmitted to server 126. The recorded information stored in memory cache 124 may include information recorded on customer device and/or information recorded from sensors 116 on POP displays 102 (after the data is transmitted to the customer device via wireless beacon 114). In some embodiments, proximity sensor data is used by server 126 along with position information obtained through wireless transceiver 120B on customer device 118 to improve the accuracy of determining location information (e.g., location information related to location of wireless beacons and POP displays).

In certain embodiments, it may be desirable to only allow wireless beacons to broadcast when there is activity near the wireless beacon. Allowing wireless beacons to only broadcast with nearby activity may allow a large number (e.g., high density) of wireless beacons to be located in a single retail location as not all of the wireless beacons will be actively broadcasting at the same time. In certain embodiments, one or more sensors 116 are used in combination with wireless beacon 114 to allow the wireless beacon to operate in a low power (non-broadcasting) mode while located in a retail location and only actively broadcast when nearby activity is detected. For example, sensor 116 may be a proximity sensor that detects activity within a selected distance from wireless beacon 114. When no activity is detected by sensor 116 (e.g., there is an absence of activity), wireless beacon 114 may enter a low power (sleep or non-broadcasting) mode. In the low power mode, wireless beacon 114 does not respond or provide push/pull events, described herein, as the wireless beacon is not broadcasting any data packets. If sensor 116 detects any activity (e.g., via proximity detection of a customer/user), wireless beacon 114 may be switched to an active (broadcasting) mode substantially instantaneously. Wireless beacon 114 may then be active for any push/pull events or content requests associated with customer device 118.

In certain embodiments, wireless beacon 114 is programmed to actively broadcast a wireless signal when the wireless beacon first arrives at retail location 200 (e.g., operate in an active broadcasting mode). Actively broadcasting the wireless signal may include broadcasting data packets at a high rate or repetitively broadcasting data packets at high rate. Actively broadcasting the wireless signal allows receiving devices (e.g., customer devices 118 and/or network gateways 710) to readily receive the data packets and to identify that wireless beacon 114 is at retail location 200.

After a selected period of time, wireless beacon 114 may enter a lower power mode to reduce power consumption and save battery power. The lower power mode may include broadcasting the wireless signal less frequently. Broadcasting the wireless signal less frequently, however, may decrease the accuracy in analyzing interactions or other characteristics of wireless beacon 114 as less information may be received about the wireless beacon by a remote server (e.g., server 126). In certain embodiments, as described herein, sensors 116 located on POP display 102 include an accelerometer. The accelerometer may be used to detect or assess movement of POP display 102.

If wireless beacon 114 is in the lower power mode, movement of POP display 102 may indicate that the POP display is being moved to a new location (e.g., being moved from the back of the store to the front of the store or to a more desirable location in the store for customer interaction). When movement is detected or assessed by the accelerometer, the accelerometer may add information regarding the movement of POP display 102 to data packets in the wireless signal broadcast by wireless beacon 114. In certain embodiments, wireless beacon 114 stores the information regarding the movement of POP display 102 and later adds the information to data packets that are broadcast by the wireless beacon. For example, the information may be added to data packets sent during normal operation of wireless beacon 114 (e.g., regular broadcasts by the wireless beacon in the low power mode or in the active broadcasting mode). In some embodiments, wireless beacon 114 may broadcast data packets with the information regarding the movement of POP display 102 in response to movement being detected by the accelerometer. The data packets with the movement information may be received by the remote server. Having the movement information may increase the accuracy in analyzing interactions or other characteristics of wireless beacon 114. In some embodiments, wireless beacon 114 may enter the active broadcasting mode (e.g., begin actively broadcasting the wireless signal) when movement is detected by the accelerometer in addition to broadcasting data packets with the additional information.

In some embodiments, POP display 102 includes other sensors 116 that provide additional measurements. For example, sensors 116 may include an accelerometer that is used to detect when product is added or removed from POP display 102. As another example, POP display 102 may be mounted on a door such as a freezer case door found in a grocery store. The accelerometer on POP display 102 may be used to detect when the door is opened and closed. This information may be correlated with other information to determine, for example, how many people walk past the display, how many people stop to look at the display, how long a person looks at items displayed in the freezer before opening the door, how long the door is opened, and whether products are removed from the freezer. Yet another example is a light sensor may be used to determine when the display was unpacked and when the store is opened or closed (as described below, this may be used to determine the actual deployment rate for a set of POP displays). Many POP displays are never deployed and the use of sensors 116 may allow tracking of POP display deployment and addressing such deployment issues based on the deployment information collected.

At some retail locations, products may be displayed and/or be able to be removed from multiple locations inside the retail location. For example, products may be displayed on both POP display 102 and a product shelf near the POP display or elsewhere in the store. Customers may be able to remove products from either POP display 102 or the product shelf and purchase the product at the retail location (e.g., at a register in the retail location). SKU (stock keeping unit) numbers may be readily used to track how many products are sold in the given retail location (e.g., how many products with a given SKU are sold at a given retail location). This SKU information, however, does not discern between where the product was picked up from by the customer (e.g., either POP display 102 or the product shelf).

As described herein, POP display 102 may include sensors 116 that detect when products are added to and/or removed from the POP display. For example, sensors 116 may include accelerometers, weight sensors, proximity sensors, image sensors, and/or other sensors that allow tracking of the activity of product being added to and/or removed from POP display 102. In certain embodiments, additional sensors are placed on the product shelf. The sensors on the product shelf may include sensors substantially similar to sensors 116 on POP display 102 and/or other sensors suitable for tracking the activity of addition and/or removal of product from the product shelf. In some embodiments, the sensors on the product shelf are coupled to the processor or circuit board on POP display 102 (e.g., the sensors on the product shelf may wirelessly transmit activity data to the processor on the POP display).

Product add/removal data from sensors 116 on POP display 102 may be combined with product add/removal data from the sensors on the product shelf for assessment of the data. The product add/removal data from POP display 102 and product add/removal data from the product shelf may be combined with SKU purchase data to determine the relative amounts of product being purchased from POP display 102 versus the product shelf. The determination of the relative amounts of product being purchased from the POP display versus the product shelf may be used to assess an effectiveness of the POP display in selling the product.

In some embodiments, the products displayed on and purchased from POP display 102 and/or the product shelf include multiple SKUs on the products. Multiple SKUs may be used to allow additional data to be collected at the point of purchase (e.g., using a point-of-sale system). Data collected at the point of purchase may be used in combination with product add/removal data from POP display 102 and product add/removal data from the product shelf to assess when other sensor data from the POP display is missed. For example, sensor data from POP display 102 that indicates the POP display is put up or taken down, or moved from the front of the store to the back of the store or vice versa, may be missed and thus it may not be clear from where certain products were removed (as product may be moved from displays that are no longer used back to the shelf). The data collected from the multiple SKUs collected at the point of purchase may then be used in combination with product add/removal data from POP display 102 and product add/removal data from the product shelf to determine relative amounts of product sold using the POP display versus the product shelf.

In some embodiments, as described herein, a device (e.g., a device with a sensor) may be used to detect when products are added to and/or removed from a product shelf. In some embodiments, the product shelf is associated with a POP display. Such a device may be used to track stock of the product and, in some cases, provide low stock or out-of-stock notifications to employees or other personnel associated with the retail location of the product shelf.

Figure 21:
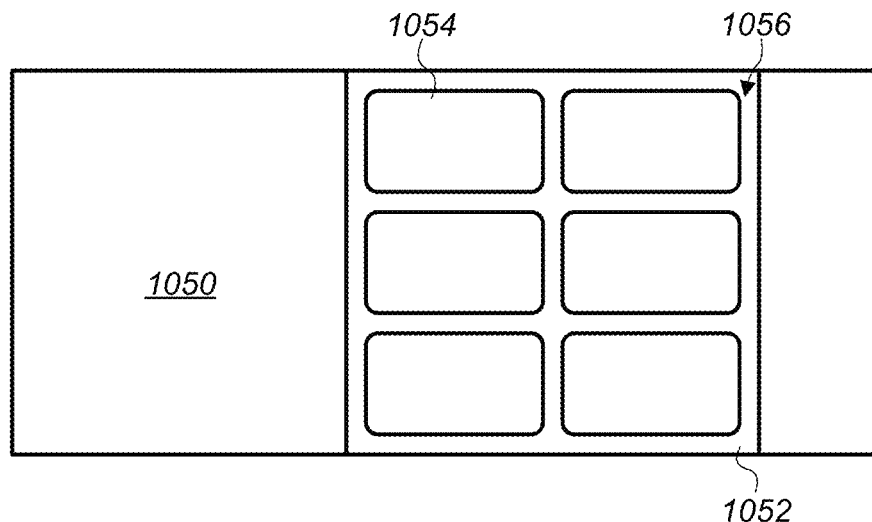
FIG. 21 depicts a top view representation of an embodiment of a product shelf with a device used for assessing product stock on the product shelf.
Figure 22:
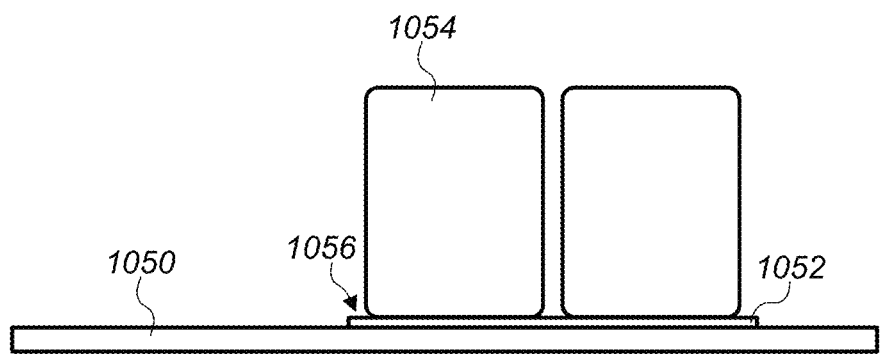
FIG. 22 depicts a front view representation of an embodiment of the product shelf and device of FIG. 21.

FIG. 21 depicts a top view representation of an embodiment of a product shelf with a device used for assessing product stock on the product shelf. FIG. 22 depicts a front view representation of an embodiment of the product shelf and device of FIG. 21. Product shelf 1050 may be used to support one or more retail products. For example, product shelf 1050 may be used to display retail products in customer area of a retail location or used to store retail products in a storage area of the retail location. In some embodiments, product shelf 1050 is associated with a POP display (e.g., POP display 102 described herein).

In certain embodiments, device 1052 is placed on product shelf 1050 (e.g., the device is placed on the surface of the product shelf). Device 1052 may be, for example, a mat, a covering, or another structure placed on product shelf 1050 with a surface that supports retail products being placed on the device. Retail products 1054 may be placed on top of device 1052 on product shelf 1050. In some embodiments, device 1052 includes retail product photos and/or description on the top surface of the device. Such photos and/or description may be used to specify information about the retail product that is to be placed on device 1052. In some embodiments, the photos/description on device 1052 include identifying information for the device including, for example, identifying information such as the unique identifier for a wireless beacon (described below) inside the device. Identifying information may be used to locate device 1052 when inventory status updates are provided by the wireless beacon.

In certain embodiments, device 1052 includes pressure-sensitive surface 1056. Surface 1056 may be used to assess an inventory status of retail products 1054. For example, the inventory status of retail products 1054 may change as products are added/removed from device 1052 and product shelf 1050.

Figure 23:
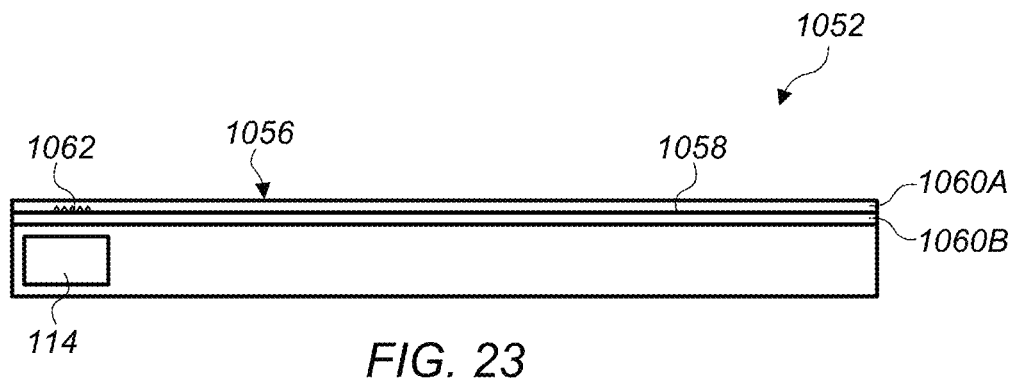
FIG. 23 depicts a side view representation of an embodiment of a device.

FIG. 23 depicts a side view representation of an embodiment of device 1052. In certain embodiments, surface 1056 includes resistive film 1058 positioned between conductive layers 1060A, 1060B. Resistive film 1058 may be, for example, a piezoresistive film. Resistive film 1058 may change resistance as different downward force (e.g., weight or pressure) is applied to the film. Conductive layers 1060A, 1060B may include varying patterns of conductors. The patterns may include, for example, grid, cross-hatched, and/or solid-sheet conductors. These conductors may be attached to resistive film 1058 using an adhesive film. Conductive layers 1060A, 1060B and resistive film 1058 may then be sealed inside the material for device 1052. The material for device 1052 may be an insulating material or protective material such as a rubber, plastic, and/or cardboard material. Most of the materials may diffuse the pressure from grit or small particles that might otherwise puncture resistive film 1058 or create false readings by creating "dimples" in the resistive film (which may cause unrepresentatively-low resistance readings). Conductive layers 1060A, 1060B and resistive film 1058 may be sealed inside device material to protect the conductive layers and the resistive film from the external environment. Device 1052 may be formed, for example, by layering sheets of material (including conductive layers 1060A, 1060B and resistive film 1058) or screen-printing one or more of the layers of material. In certain embodiments, device 1052 has a thickness of at most about 1", at most about 0.5", or at most about 0.25".

In certain embodiments, resistor 1062 is positioned (e.g., embedded) between conductive layers 1060A, 1060B. Resistor 1062 may be, for example, a ceramic or printed resistor. Resistor 1062 may be matched to resistive film 1058. Electrical connections to resistor 1062 may include ground, power, and signal connections. Changes in resistance of resistive film 1058 due to changes in weight applied to surface 1056 may be measured by applying a voltage between ground and power and measuring the voltage produced on the signal lead. In certain embodiments, the resistance of resistive film 1058 increases as retail product 1054 is removed from surface 1056 and decreases as retail products are added to the surface. In some embodiments, the changes in resistance are assessed based on a specific retail product configured to be placed on device 1052 (e.g., resistance measurements are specific to specific types of products (laundry detergent, toilet paper, paper towels, beverages, etc.)).

In certain embodiments, wireless beacon 114 is positioned inside device 1052, as shown in FIG. 23. In some embodiments, wireless beacon 114 is located at or near a front edge of device 1052. Locating wireless beacon 114 at or near the front edge of device 1052 may increase the wireless signal transmission range of the wireless beacon. In some embodiments, device 1052 may include a lip or other protrusion that has a thickness that allows wireless beacon 114 to be placed inside the protrusion, which may increase the transmission range of the wireless beacon.

Wireless beacon 114 may include a processor, a memory, and wireless transmitter along with a battery to provide power to the wireless beacon. In some embodiments, the battery is a printed battery. Wireless beacon 114 may be coupled to resistor 1062. For example, wireless beacon 114 may be coupled to the ground, power, and signal connections of resistor 1062. In some embodiments, such electrical connections are made with printable circuit components as described herein. The processor in wireless beacon 114 may assess resistance changes in resistive film 1058. The changes in resistance assessed by the processor in wireless beacon 114 may be used to assess the inventory status of retail product 1054 on device 1052. The inventory status assessed by wireless beacon 114 may be added to a data packet broadcast in a wireless signal by the wireless beacon transmitter. The data packet may also include the unique identifier for the wireless beacon. The unique identifier may also be associated with device 1052 and/or specific retail product selected for the device.

In some embodiments, the inventory status provided by wireless beacon 114 is an inventory level value. For example, wireless beacon 114 may provide the inventory status as "empty", "full", "one-quarter", "one-half", or other fractional inventory level values as desired. In some embodiments, wireless beacon 114 may immediately broadcast the data packet with the inventory status if the inventory status (e.g., inventory level value) is assessed to be below a selected value. For example, if the inventory status of retail product 1054 falls below one-quarter full, wireless beacon 114 may immediately broadcast the inventory status such that a recipient of the inventory status can restock or resupply the retail product to the product shelf.

The inventory status data packet may be received by a wireless device located at the retail location. For example, the inventory status data packet may be received by a wireless network gateway and/or a data collection device located at the retail location. Typically, the wireless device is located within a transmission range of wireless beacon 114 (e.g., about 500 feet or less from the wireless beacon). In some embodiments, the wireless device is used to notify store personnel of the inventory status of retail products (e.g., when stock is low). In some embodiments, the wireless device may provide notification to another entity via the Internet, a WAN, or other communication network. Such notification may be, for example, to a local distributor that more retail product is needed at the retail location.

In some embodiments, wireless beacon 114 is programmed to begin actively broadcasting at a certain time. For example, wireless beacon 114 may begin actively broadcasting at a time device 1052 is scheduled to arrive at the retail location. In some embodiments, signal strength between wireless beacon 114 and the wireless device receiving the broadcast from the wireless beacon (e.g., the wireless network gateway and/or data collection device) may be used to assess a relative position of device 1052 within the retail location. For example, the signal strength may be used to assess if device 1052 is in the front (consumer portion) or back (storage portion) of the retail location. Additionally, signal strength (or lack of signal) may be used to assess when device 1052 has been disposed in the trash or is no longer in use.

In certain embodiments, POP display 102 includes one or more cameras 140. In some embodiments, cameras 140 are included in or associated with sensors 116. Cameras 140 may include, for example, a camera chip such as, but not limited to, a CCD camera or CMOS sensor. In certain embodiments, cameras 140 are embedded in POP display 102. For example, cameras 140 may be embedded in cardboard used for POP display 102. In certain embodiments, cameras 140 are used to capture images of the surroundings of POP display 102. In some embodiments, cameras 140 are used to capture images of the surroundings of POP display 102 when the POP display is placed at a retail location. For example, cameras 140 may capture images when POP display 102 is turned on at the retail location (e.g., when wireless beacon 114 is activated). In some embodiments, cameras 140 include cameras directed in multiple directions. For example, cameras 140 may be directed to capture 360° images of POP display 102's surroundings.

Images captured using cameras 140 may be stored in memory 110 on POP display 102. In certain embodiments, the captured images are transferred to server 126. For example, the captured images may be transferred along with information transferred from POP display 102 to server 126 as described herein. In some embodiments, the captured images stored in memory 110 are transmitted (broadcast) in data packets sent out by wireless beacon 114. The data packets with the captured images may be received by, for example, customer devices 118, network gateway 710, and/or data collection device 711 to then be transmitted to server 126.

In certain embodiments, server 126 associates the captured images with POP display 102 and assesses a location of the POP display based on the captured images. For example, the captured images may be compared to images captured from POP displays with known locations to assess the location of POP display 102. The captured images may also include other information (e.g., a landmark or other specific indicator of location) and/or other image details that are used to determine a location of POP display 102. For example, OCR (optical character recognition) may be used on the images to determine words and/or numbers in the images and then a keyword search may be used to determine the location of POP display 102. The determined location of POP display 102 may be stored in information 130 on server 126. The determined location of POP display 102 may include a specific retail location and/or an area inside a retail location (e.g., an area of a store such as the back or the front of the store).

In some embodiments, cameras 140 are used to retake or capture additional images when POP display 102 is moved. Sensors 116 located on POP display 102 may include an accelerometer that detects that POP display 102 has been moved (and is now stationary). The detected movement may indicate or trigger that additional images are to be captured by cameras 140. In some embodiments, the additional images are used by server 126 to determine a new location of POP display 102. In some embodiments, the additional images are used to determine if POP display 102 has been moved between different areas inside the retail location (e.g., the POP display has been moved from the front to back of the store or vice versa).

In some embodiments, cameras 140 are used to capture images of activity in and/or around POP display 102 when the POP display is placed at a retail location. In certain embodiments, a processor on circuit board 104 (e.g., controller 112) assesses activity information in and/or around the POP display based on the captured images. For example, image processing of the captured images may be used to assess activity such as, but not limited to, customer traffic counts, selected aspects of customer traffic, customer gesture recognition, and customer eye tracking. Selected aspects of customer traffic may include, but not be limited to, dwell time, estimated age, gender, or race as well as relationships between different aspects. Eye tracking may include, for example, whether a customer looked at POP display 102 or not and/or for how long the customer looked at the POP display. The assessed activity from the captured images may be stored in memory 110 on POP display 102. In certain embodiments, the assessed activity is timestamped and/or location coded when stored in memory 110.

In certain embodiments, signals from wireless beacons 114 placed in POP displays 102 and/or merchandising materials are used to trigger activation of one or more functions on customer device 118. For example, a signal from wireless beacons 114 may trigger activation of a camera function on customer device 118 (such as a camera function on a smartphone). When the camera function is engaged on customer device 118, image recognition capabilities using artificial intelligence (for example, neural networks and/or learning algorithms on the customer device) may be used to determine aspects of the environment surrounding the consumer (e.g., surrounding customer device 118). Aspects of the environment may include, but not be limited to, the direction a consumer is facing, which products and/or category the consumer is looking at, product stocking conditions, product pricing, the presence of other promotional material, and/or a shelf layout. In some embodiments, virtual or augmented reality functionality on customer device 118 may overlay additional virtual information over the captured images. The additional virtual information may include, but not be limited to, promotional messages, additional product or category information or benefits, dosage or usage information/restrictions, in-store navigation diagrams, special pricing, and/or recipes.

In certain embodiments, the assessed activity from the images captured by cameras 140 is transferred to server 126. In some embodiments, the assessed activity from the images captured by cameras 140 is transferred to server 126 along with other data from sensors 116. In some embodiments, data for the assessed activity stored in memory 110 is transmitted (broadcast) in data packets sent out by wireless beacon 114 along with the unique identifier for the wireless beacon. The data packets with the assessed activity data may be received by, for example, customer devices 118, network gateway 710, and/or data collection device 711 to then be transmitted to server 126. Server 126 may associate the assessed activity with a particular POP display 102 based on identifying information received along with the assessed activity data (e.g., the unique identifier for wireless beacon 114 and/or image information used to assess location of the POP display).

In some embodiments, cameras 140 (and/or other cameras positioned in or around POP display 102) are used to capture images of the POP display itself. For example, images of POP display 102 may include images of shelves (or other product display areas) of the POP display and/or advertisement or informational areas of the POP display. Image processing of the captured images may be used to assess one or more conditions and/or a status of POP display 102. For example, image processing of the captured images may be used to determine a presence (or lack of presence) of merchandising materials on POP display 102. In some embodiments, image processing of the captured images may be used to determine a presence (or lack of presence) of components (e.g., sensors or other components coupled to and/or shipped with the display) on POP display 102 and/or sections of the POP display (e.g., particular parts of the POP display). Additionally, image processing of the captured images may be used to determine an inventory of products on POP display 102. Image processing of images captured of POP display 102 may occur on the POP display itself or on server 126 (after images are transferred to the server as described above).

As described herein, POP display 102 may include one or more sensors 116 that collect data about an environment surrounding the POP display (e.g., monitor activity in and/or around the POP display). In certain embodiments, one or more of sensors 116 are capable of transmitting (e.g., broadcasting) collected sensor data and/or data packets indicating the presence of the sensors. In some embodiments, the data packet indicating the presence of sensor 116 includes unique identifiers for the sensors. In certain embodiments, a data collection device is located at a retail location to receive and collect data transmitted by sensors 116.

Figure 2:
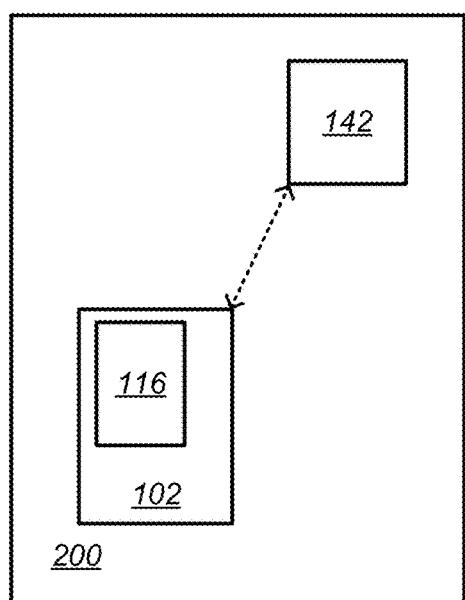
FIG. 2 depicts a block diagram of an embodiment of a retail location with a data collection device.

FIG. 2 depicts a block diagram of an embodiment of retail location 200 with data collection device 142 along with POP display 102 with sensor 116. In some embodiments, data collection device 142 is a wireless network gateway (e.g., similar to network gateway 710 described herein). In some embodiments, data collection device 142 is a data collection device similar to data collection device 711 described herein. Data collection device 142 may, however, be any data collection device suitable for receiving transmissions broadcast by sensors 116. In some embodiments, data collection device 142 is capable of rebroadcasting transmissions received by the data collection device.

In certain embodiments, data collection device 142 is permanently (or substantially permanently) positioned at a retail location. For example, data collection device 142 may be installed at the retail location and used to collect sensor data over many cycles of POP displays 102 being introduced at retail location 200. As many POP displays 102 may be introduced and then removed over time as compared to data collection device 142, the POP displays may be "substantially temporary" while the data collection device is "substantially permanent" at retail location 200.

In certain embodiments, data collection device 142 is used to detect the presence, absence, and/or signal strength of sensors 116 on POP displays 102 as the POP displays are introduced and/or removed from retail location 200. Detecting presence, absence, and/or signal strength of sensors 116 allows data collection device 142 to assess the execution of POP displays 102 (e.g., assess the activity of adding/removing POP displays from the retail location and where the POP displays are positioned at the retail location). In addition, data collection device 142 may collect sensor data from sensors 116. The sensor data may be stored on data collection device 142 for later access and/or transmitted to a remote server for data analysis (e.g., transmitted to server 126).

Figure 3:
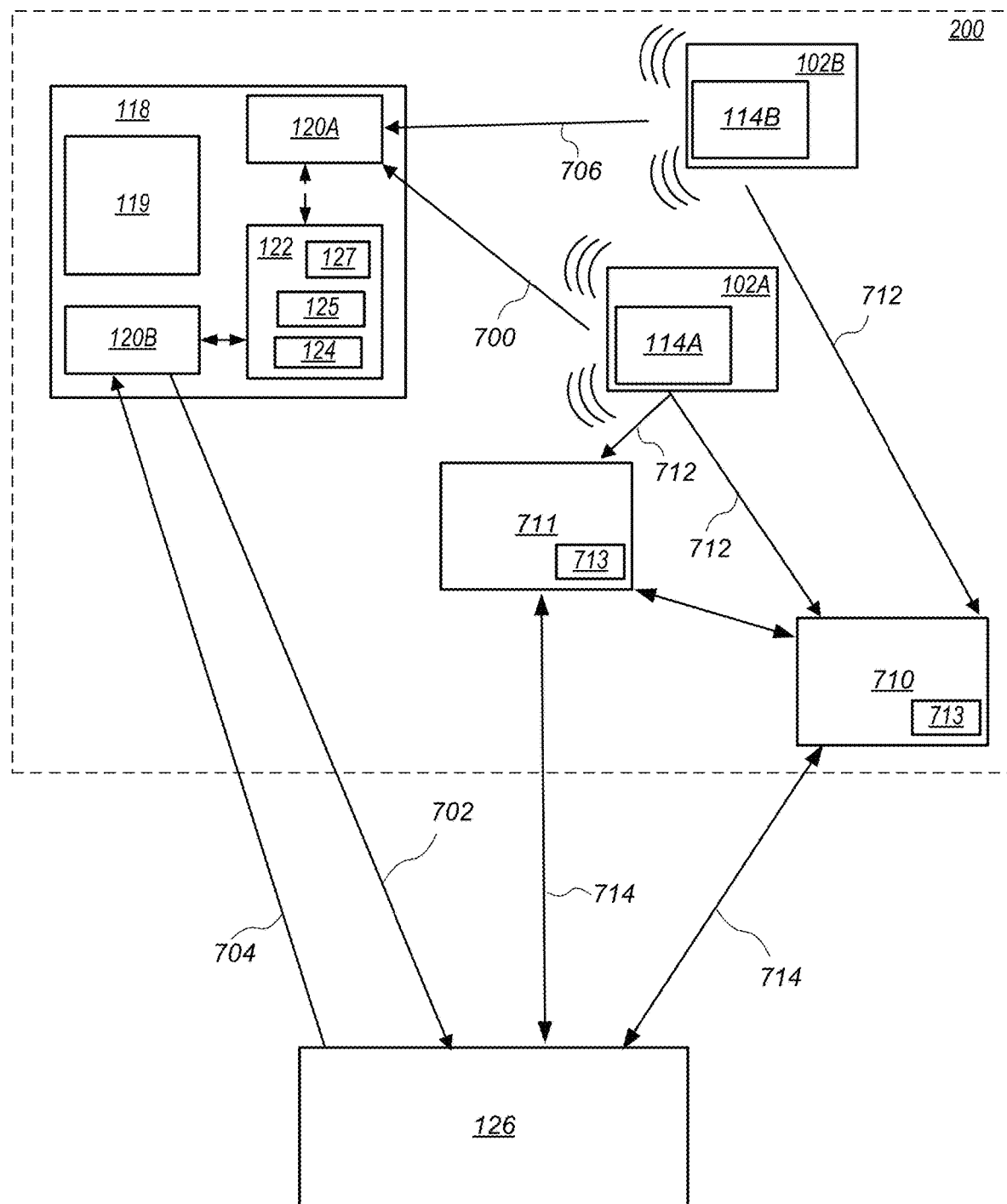
FIG. 3 depicts a block diagram representation of an embodiment of an interaction between a customer device, wireless beacons, and a server.

FIG. 3 depicts a block diagram representation of an embodiment of an interaction between customer device 118, wireless beacons 114, and server 126. In certain embodiments, customer device 118 receives first Bluetooth LE packet 700 from first wireless beacon 114A. First wireless beacon 114A may be, for example, a wireless beacon located at or near a retail entrance (e.g., a store entrance). In certain embodiments, first wireless beacon 114A is located in an area where customer device 118 is able to communicate with server 126 (e.g., the customer device has wireless connectivity (either through WiFi or cellular transmission with the server). Upon receipt of first Bluetooth LE packet 700, SDK 125 may inspect memory cache 124 and determine if the memory cache contains up-to-date data (content) for first wireless beacon 114A. If the content is not up-to-date in memory cache 124, then SDK may contact 702 server 126 (e.g., the content server) and retrieve 704 the latest content (e.g., content 128) associated with first wireless beacon 114A. The retrieved content may be stored in memory cache 124.

In some embodiments, server 126 may be aware of the location of first wireless beacon 114A and/or other wireless beacons (identifiable by their unique identifiers) associated with the first wireless beacon. The other wireless beacons (e.g., second wireless beacons 114B, shown in FIG. 3) may be other wireless beacons that are nearby first wireless beacon 114A. In certain embodiments, second wireless beacons 114B are wireless beacons that are located in the same store as, or in proximity to, first wireless beacon 114A. In some embodiments, second wireless beacons 114B are wireless beacons in other stores at other locations that are associated with the particular venue of first wireless beacon 114A (e.g., the beacons are associated with a single retail chain).

Knowing the association between first wireless beacon 114A and second wireless beacons 114B, server 126 may, therefore, transmit the latest content for the second wireless beacons in addition to transmitting the latest content for the first wireless beacon. The content for both first wireless beacon 114A and second wireless beacons 114B may be stored in memory cache 124. Transmitting the latest data for second wireless beacons 114B may improve customer device 118 user's experience as information for each subsequent wireless beacon encountered may already be on the customer device and accessed immediately as the subsequent beacons are encountered (e.g., when SDK 125 receives second Bluetooth LE packet 706 from the second wireless beacons). This may be particularly advantageous in areas where there is limited or no data connectivity (e.g., where it would otherwise be impossible to download the content associated with a newly encountered wireless beacon). For example, when customer device 118 enters a store and detects first wireless beacon 114A, the customer device may automatically download the latest content associated with all second wireless beacons 114B in the store and store the content in memory cache 124 rather than incrementally downloading content as the customer device encounters each second wireless beacon. Incremental downloading may be slower and/or may not be possible as one wanders deeper into a physical structure and customer device 118 loses wireless network connectivity (e.g., enters cellular dead spots within the structure). Again, SDK 125 manages this functionality and, from the perspective of mobile application 127, the SDK notifies the mobile application of push and pull events (described herein) as well as delivering any associated content from memory cache 124 to the mobile application. Mobile application 127 may then display content from memory cache 124 to the customer on display 119. FIGS. 4A-4K depict examples of content being displayed on display 119. In some embodiments, display 119 allows the customer to interact with content displayed by mobile application 127 (e.g., the content may include a menu of options for selection by the customer).

An additional advantage of SDK 125 is that the SDK may transmit to server 126 location information available from customer device 118 about the customer device's location along with the unique identifier received from wireless beacon 114. In some embodiments, the location information is sent to server 126 when a request for content is made from the server. In certain embodiments, location information about the location of customer device 118 includes GPS data (such as latitude/longitude data) from the customer device (e.g., using built-in GPS on the customer device). In some embodiments, location information about the location of customer device 118 includes detected WiFi networks (e.g., WiFi networks accessed by the customer device). In some embodiments, mobile application 127 provides SDK 125 with the location of customer device 118 (e.g., the mobile application may tell the SDK which store associated with the mobile application at which the customer device is located). The location information of customer device 118 along with the unique identifier from wireless beacon 114 may allow server 126 to identify the physical or retail location (e.g., a specific store number for a retail chain) of the wireless beacon having the unique identifier.

FIG. 5 depicts a flowchart of an embodiment of method 800. Method 800 may be used to assess a location of wireless beacon 114 and POP display 102. In 802, a plurality of POP displays 102 and their wireless beacons 114 may be associated with a selected campaign. As described herein, a "campaign" refers to an advertising, a marketing, or a promotional campaign associated with a particular retail product or a grouping of products associated with one campaign. For example, the campaign may be a special sale for a limited time for the particular retail product. In some embodiments, the campaign is associated with specific retailers, specific stores within a retail chain, and/or specific geographic locations. In some embodiments, the campaign has a selected time period associated with the campaign (e.g., the campaign is active for a selected amount of time).

In some embodiments, associating wireless beacons 114 with the selected campaign in 802 includes associating the wireless beacons with a selected campaign associated with a specific retailer. For example, wireless beacons 114 may be designated for a specific advertising campaign intended for a specific retailer. In 804, the wireless beacons may be randomly distributed to a plurality of retail locations. Even though the selected campaign may be known for wireless beacons 114, the exact final location of POP displays 102 with the wireless beacons is typically unknown (as described below for step 314 in FIG. 11). Thus, each of the retail locations that receive the randomly distributed POP displays 102 may be associated with the same selected campaign.

After POP displays 102, along with wireless beacons 114, are placed at their intended locations and the wireless beacons are activated (e.g., activated at either their final display location or a temporary storage location such as a store back (or storage) area), one or more different methods may be used to assess a retail location of each of the POP displays (e.g., the store at which each POP display is located). For example, as shown in FIG. 5, method 806A, method 806B, method 806C, and method 806D may each be used, either alone or in combination, to, in 808, assess the retail location of a selected POP display 102 and wireless beacon 114. Methods 806A, 806B, 806C, 806D may be used to assess the retail location of multiple POP displays 102. In some embodiments, one method may be used to assess the retail location of all the POP displays associated with the selected campaign. In some embodiments, one method may be used to assess the retail location of a first POP display while another method is used to assess the retail location of a second POP display, a third POP display, a fourth POP display, etc.

FIG. 6 depicts a flowchart of an embodiment of method 806A used to assess a location of a POP display. Once POP display 102 is placed at a retail location (e.g., in 804, shown in FIG. 5), method 806A may be used to assess the retail location of the POP display using interaction with customer device 118 and SDK 125 on the customer device. In 900, customer device 118 may receive a packet (e.g., a data packet such as packet 700, shown in FIG. 3) from wireless beacon 114. The packet may include the unique identifier for wireless beacon 114.

In 902, SDK 125 may combine the received unique identifier along with geographic information on the location of customer device 118. For example, the geographic information may include the geographic location of customer device 118 such as, but not limited to, latitude and longitude location or GPS location of the customer device. In 904, SDK 125 may then provide the geographic location of customer device 118 along with the unique identifier to a remote server (e.g., server 126, shown in FIGS. 1 and 3). In some embodiments, a time stamp from customer device 118 is also provided to the remote server. In certain embodiments, SDK 125 provides unique identifiers for a plurality of wireless beacons along with the geographic location of customer device 118.

In 906, the remote server may then assess or determine the retail location of wireless beacon 114 with the unique identifier using the geographic location information provided along with the unique identifier. If multiple unique identifiers are sent to the remote server, the remote server may determine the retail location of each of the wireless beacons with the unique identifiers associated with the geographic location information. The determined retail location may be, for example, a retail store number associated with a retail chain associated with the selected campaign. In some embodiments, the retail location is determined using the geographic location in combination with other information available to the remote server, including, but not limited to, information from other customer devices and/or information about retail locations associated with the selected campaign. In some embodiments, the remote server assesses the time stamp received from SDK 125 in combination with the geographic location of customer device 118, the unique identifier, and the retail locations associated with the selected campaign. Assessing the time stamp may allow the remote server to assess if the POP display is active during a selected time period associated with the selected campaign for the POP display.

Information from other customer devices may include, but not be limited to, geographic location information from interaction of other customer devices with the wireless beacon. Thus, in some embodiments, the remote server may use information from multiple customer devices to determine the retail location of a wireless beacon. The information about retail locations associated with the selected campaign may be provided to the remote server or obtainable by the remote server using information input earlier about the selected campaign. In some embodiments, the remote server stores the retail location information along with the unique identifier in a database (e.g., information 130 on server 126, shown in FIG. 1).

The retail location determined in 906 may be provided to method 800, shown in FIG. 5, to either be used as the assessed retail location in 808 or used in other methods (e.g., 806B or 806C) to determine the retail locations of other POP displays. In some embodiments, the retail location determined in 906 may be used to assess if the location of the POP display and the wireless beacon has changed. For example, the remote server may look up the unique identifier and assess if a previous location for the unique identifier was recorded to assess if any change in location has occurred.

FIG. 7 depicts a flowchart of an embodiment of method 806B used to assess a location of a POP display. Method 806B may include assessing the retail location of POP display 102 and wireless beacon 114 using the presence of other detected wireless beacons (POP displays) with known retail locations in proximity to the wireless beacon and interaction with one or more customer devices 118. In some embodiments, multiple wireless beacons are interacting with a single customer device 118 (e.g., the single customer device receives packets from multiple wireless beacons at or around the same time). In some embodiments, the wireless beacons are interacting with multiple customer devices 118 at or around the same time with a remote server receiving information from the multiple customer devices (with knowledge of the customer devices being at the same location).

As shown in FIG. 7, method 806B includes determining, at the remote server, a retail location of a first POP display in 910. The retail location of the first POP display may be determined, for example, using method 806A, shown in FIG. 6, method 806C, shown in FIG. 8, or method 806D, shown in FIG. 10. Determining the retail location of the first POP display in 910, as shown in FIG. 7, allows the remote server to know the retail location of the first POP display. In some embodiments, the retail location of the first POP display may be known and provided to the remote server in 910 (e.g., a separate entity or application provides the retail location of the first POP display or the retail location the first POP display is to be sent to is known before being sent to the location). In some embodiments, the same retail location is determined (and then known) for multiple POP displays in 910 (e.g., the same retail location may be determined (and then known) for two or more POP displays). The remote server may associate together the multiple POP displays at the same retail location.

After the location of the first POP display(s) is determined (or known) in 910, customer device 118 may receive a first data packet (or a set of first data packets for multiple POP displays) with the unique identifier for the first POP display(s) in 912. At or around the same time, customer device 118 may receive a second data packet from a second POP display in 914. The second POP display may have a retail location that is unknown to the remote server. The second data packet may include the unique identifier for the second POP display.

In 916, SDK 125 on customer device 118 may provide the unique identifier for the first POP display(s) and the unique identifier for the second POP display to the remote server (e.g., server 126, shown in FIGS. 1 and 3). In 918, the remote server may determine, based on the remote server receiving both the unique identifier for the first POP display(s) and the unique identifier for the second POP display at the same time, that the second POP display is at the same retail location as the first POP display(s). Put another way, the remote server determines that the second POP display is at the same retail location as the first POP display(s) because the remote server receives both unique identifiers from the same customer device, which is at the retail location. The retail location of the second POP display determined in 918 may be provided to method 800, shown in FIG. 5, to be used as the assessed retail location in 808.

In some embodiments, the remote server may receive the unique identifier for the first POP display(s) and the unique identifier for the second POP display from different customer devices in 916 (e.g., two or more different mobile devices). In such embodiments, however, the remote server may receive other identifying information (e.g., geographic location information or specific content related information) that allows the remote server to associate the unique identifier for the first POP display(s) with the unique identifier for the second POP display and determine that the POP displays are at the same retail location in 918.

Figure 8:
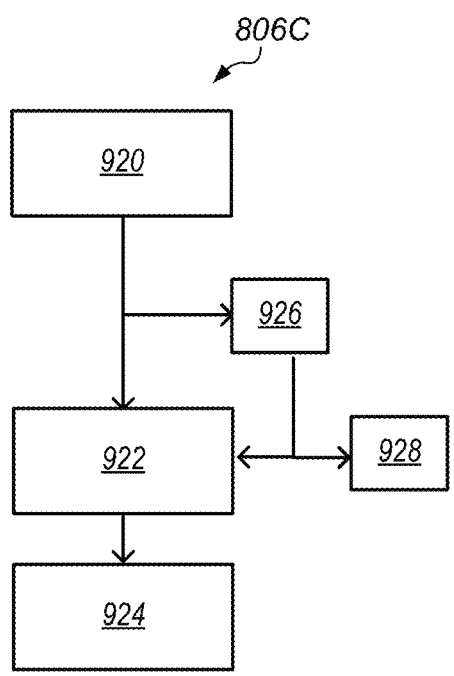
FIG. 8 depicts a flowchart of a third embodiment of a method used to assess a location of a POP display.

FIG. 8 depicts a flowchart of an embodiment of method 806C used to assess a location of a POP display. Method 806C may include assessing the retail location of POP display 102 and wireless beacon 114 using communication with a network gateway or data collection device located at the retail location. In certain embodiments, as shown in FIGS. 1 and 3, network gateway 710 and/or data collection device 711 are located at retail location 200. One or more network gateways 710 and/or data collection devices 711 may be installed at known retail locations for interfacing with POP displays after the POP displays are distributed and reach the retail location. Network gateways 710 may be, for example, permanent network gateways installed at each retail location in a retail chain or supply chain with the location of each network gateway being known. Thus, for POP display distribution, the retail locations of multiple network gateways 710 are known by the remote server. Data collection devices 711 may also be permanent data collection devices with the locations of the data collection devices being known by the remote server.

In certain embodiments, network gateway 710 is a wireless network gateway. For example, network gateway 710 may be any hardware (e.g., a processor and one or more wireless antenna) capable of networked communication over one or more wireless communication networks and/or interfacing between wireless communication networks (e.g., interfacing between a local area network (LAN) and a wide area network (WAN)). Communication networks for network gateway 710 may include, but not be limited to, WANs cellular networks, wireless networks, and the Internet. In certain embodiments, network gateway 710 is connected to the Internet and is capable of interfacing and communicating using Bluetooth LE, WiFi, sub-gigahertz radio, cellular, and other longer-range radio bands.

In certain embodiments, data collection device 711 is a wireless data collection device that includes hardware (e.g., a processor and one or more wireless antenna) capable of networked communication over one or more wireless communication networks. In certain embodiments, data collection device 711 is used for communication over a local area network (LAN). Data collection device 711 may, however, also be capable of communicating over a wide area network (WAN)). Data collection device 711 may be capable of interfacing and communicating using Bluetooth LE, WiFi, sub-gigahertz radio, cellular, and other radio bands.

In some embodiments, data collection device 711 is used to relay data between wireless beacons 114 and network gateway 710. For example, broadcasts from wireless beacons 114 may be received by data collection device 711 and then rebroadcast from the data collection device to network gateway 710 (e.g., data collection device 711 and network gateway 710 may communicate over a LAN). Network gateway 710 may then transmit data received from data collection device to server 126 (e.g., over a WAN). In such embodiments, data collection device 711 may be used as a repeater at retail location 200 for wireless beacon 114 broadcasts to ensure data broadcast by the wireless beacon reaches network gateway 710. Repeating the broadcasting of data from wireless beacons 114 may be useful, for example, in larger retail locations where network gateway 710 (which is used to transmit data to remote server 126) may not reliably receive information from all the wireless beacons at the retail location. For example, if a wireless beacon is out of signal range of network gateway 710, data collection device 711 may be located closer to the wireless beacon to receive and rebroadcast the wireless signal to the network gateway. For relatively large retail locations, multiple data collection devices 711 may be used to communicate with network gateway 710. Using one or more data collection devices 711 to broadcast wireless beacon data to network gateway 710, which then transmits data to remote server 126, allows the network gateway to be used as the primary communication device with the remote server.

In some embodiments, data collection device 711 includes hardware capable of communicating over a wide area network (WAN). In such embodiments, data collection device 711 may transmit wireless signal data directly from wireless beacons 114 to remote server 126 over the WAN. Using data collection devices 711 to transmit data to remote server 126 may be useful in situations where communication through a single network gateway is not suitable. It is to be understood that network gateway 710 and data collection device 711 may be interchangeable in one or more embodiments as used herein. For example, in embodiments describing the use of network gateway 710, data collection device 711 may be used in place of the network gateway, or vice versa. Additionally, in some embodiments described herein, network gateway 710 and data collection device 711 may be substantially equivalent devices (e.g., devices capable of communicating over both LANs and WANs).

In some embodiments, wireless beacons 114 include multiple wireless communication network transmission capabilities. For example, wireless beacons 114 may be capable of broadcasting data packets over two or more different wireless communication networks substantially simultaneously. In some embodiments, wireless beacons 114 are capable of broadcasting over sub-gigahertz radio (or another longer-range radio band) in addition to (or substantially simultaneously with) broadcasting over Bluetooth LE. Sub-gigahertz broadcasting may provide increased range of data transmission as compared to Bluetooth LE (e.g., sub-gigahertz may have a transmission range of up to about a mile). Sub-gigahertz broadcasting may include, for example, broadcasting over the ISM band (UHF). In some embodiments, sub-gigahertz radio includes radio signals (e.g., wireless signals) with a frequency between 100 MHz and 1 GHz. Examples of sub-gigahertz radio bands include, but are not limited to, 315 MHz, 433 MHz, 902 MHz, and 928 MHz. In certain embodiments, sub-gigahertz radio signals are tuned to a set frequency without frequency hopping (unlike Bluetooth LE). In some embodiments, other longer broadcast range (and detection range) radio bands may be used instead of, or in addition to, sub-gigahertz radio bands. For example, broadcast radio bands such as, but not limited to, WiFi, LORA, or ZigBee may be used in wireless beacons 114, network gateway 710, and/or data collection device 711. In some embodiments, wireless beacons 114 may be equipped with a communication chip capable of broadcasting over even larger distances and directly to the remote server. In such embodiments, wireless beacons 114 may provide data directly to the remote server.

In certain embodiments, wireless beacons 114 are equipped with a communication chip (e.g., wireless transceiver 120A) capable of both Bluetooth LE and sub-gigahertz broadcasting (or another longer-range radio band). While Bluetooth LE may be used for broadcasting to mobile devices (or other Bluetooth LE capable devices), a larger LAN may be provided between wireless beacons 114 and network gateway 710 or data collection device 711 by using the longer broadcast range provided by sub-gigahertz radio (or another longer-range radio band). In some embodiments, network gateway 710 and/or data collection device 711 may provide a data collection network (e.g., a LAN for data collection) for collecting data broadcast 712 by wireless beacons 114 (e.g., unique identifiers, sensor data, etc.) and transmitting the data over a communication network 714 (e.g., a WAN connected to the remote server).

In certain embodiments, network gateway 710 and/or data collection device 711, shown in FIG. 3, are capable of receiving data packets from wireless beacons 114 over the LAN network. In certain embodiments, the data packets include data collected from sensors 116. In some embodiments, sensors 116 are capable of broadcasting data over sub-gigahertz radio (or another longer-range radio band). The data broadcast by sensors 116 may be collected by network gateway 710 and/or data collection device 711, as described herein. The use of sub-gigahertz radio (or another longer-range radio band) in network gateway 710, data collection device 711, and wireless beacons 114 may allow a larger LAN to be provided at the retail location. In some embodiments, using sub-gigahertz radio (or another longer-range radio band) communication allows a single network gateway (e.g., network gateway 710) to receive (and/or send) communications from multiple wireless beacons 114 at a single retail location, even a large retail location such as a warehouse-type retail location.

In certain embodiments, as shown in FIG. 8, method 806C includes a network gateway (e.g., network gateway 710 and/or data collection device 711) at a known retail location (e.g., retail location 200) receiving a data packet (e.g., data broadcast 712) from wireless beacon 114 on POP display 102 in 920. The data packet may include the unique identifier of the wireless beacon and the POP display. The network gateway may provide the unique identifier to the remote server in response to receiving the data packet in 922. In some embodiments, the network gateway provides the unique identifier to the remote server over communication network 714 (e.g., cellular network, WiFi network, or the Internet). In some embodiments, the network gateway provides the unique identifier to the remote server using customer device 118. For example, the network gateway provides the unique identifier along with identifying/location information about the network gateway to SDK 125 on customer device 118. SDK 125 may then provide this information to the remote server when customer device 118 communicates with the remote server.

In certain embodiments, a network gateway (or a data collection device) may be placed in a storage location ("depot") convenient to Direct Store Delivery (DSD) personnel. Such depots are common for DSD products; however, the inventory of merchandising materials available is difficult to monitor. In such cases, beacons may be attached to merchandising material—either individual materials or cases of materials—stored in the storage location. Inventory of the merchandising materials may be monitored by a network gateway with, for example, a cellular modem for communication to a remote server. Monitoring the inventory of merchandising material with the network gateway may greatly improve the timeliness and accuracy regarding availability of materials in depots.

In 924, the remote server may associate the POP display having the unique identifier with the network gateway providing the unique identifier and the retail location of the network gateway. Using this association, the remote server may determine the retail location of the POP display with the unique identifier because the retail location of the associated network gateway is known (e.g., the installation location of the network gateway is known as described above). In some embodiments, the network gateway associates the POP display having the unique identifier with the retail location of the network gateway and provides data about the association to the remote server, which then stores information about the retail location of the POP display. The retail location of the POP display having the unique identifier determined in 924 may be provided to method 800, shown in FIG. 5, to be used as the assessed retail location in 808.

In some embodiments, method 806C includes assessing a signal strength between the POP display with the unique identifier and the network gateway in 926. The assessed signal strength may be provided to the remote server along with the unique identifier in 922. The remote server may use the assessed signal strength to determine a specific (or relatively specific) location of the POP display within the retail location in 928. For example, the exact location of the network gateway at the retail location may be known (e.g., in a server room at the retail location). The assessed signal strength may provide information that is used to estimate the distance between the POP display with the unique identifier and the network gateway. From the estimated distance, the specific location of the POP display within the retail location may be determined (e.g., estimated or approximated).

In certain embodiments, in 926, signal strengths for sub-gigahertz radio (or another longer-range radio band) signals (e.g., data packets) received in network gateway 710 from wireless beacons 114 (on POP displays 102) are used to assess locations of the wireless beacons (and the POP displays). In certain embodiments, as described above, network gateway 710 provides (e.g., transmits) the signal strength data to another processor (e.g., server 126 in 922) that assesses the locations of the wireless beacons from the transmitted signal data. In some embodiments, network gateway 710 includes a processor to assess locations of wireless beacons 114 based on the received signals in 928 and the assessed location is then provided to the server in 922.

In certain embodiments, RSSI values of the sub-gigahertz radio (or another longer-range radio band) signals received in network gateway 710 are used to assess the locations of wireless beacons 114 in 928. For example, the RSSI values may be used to assess the locations of wireless beacons 114 within (or inside) the retail location associated with network gateway 710. In some embodiments, a distance of wireless beacon 114 from network gateway 710 is assessed using the RSSI value. The sub-gigahertz radio (or another longer-range radio band) signals received in network gateway 710 are not frequency hopping signals like Bluetooth LE signals. Thus, using RSSI values of the sub-gigahertz radio (or another longer-range radio band) signals received in network gateway 710 may provide more accurate RSSI values for wireless beacons 114 than using Bluetooth LE. The more accurate RSSI values may provide more accurate assessment of the locations of wireless beacons 114 using evaluation or triangulation of the RSSI values. Providing a more accurate location of wireless beacon 114 within the retail location may allow a processor (e.g., a processor on network gateway 710 or on server 126) to more accurately determine a specific location of the wireless beacon inside the retail location.

Figure 9:
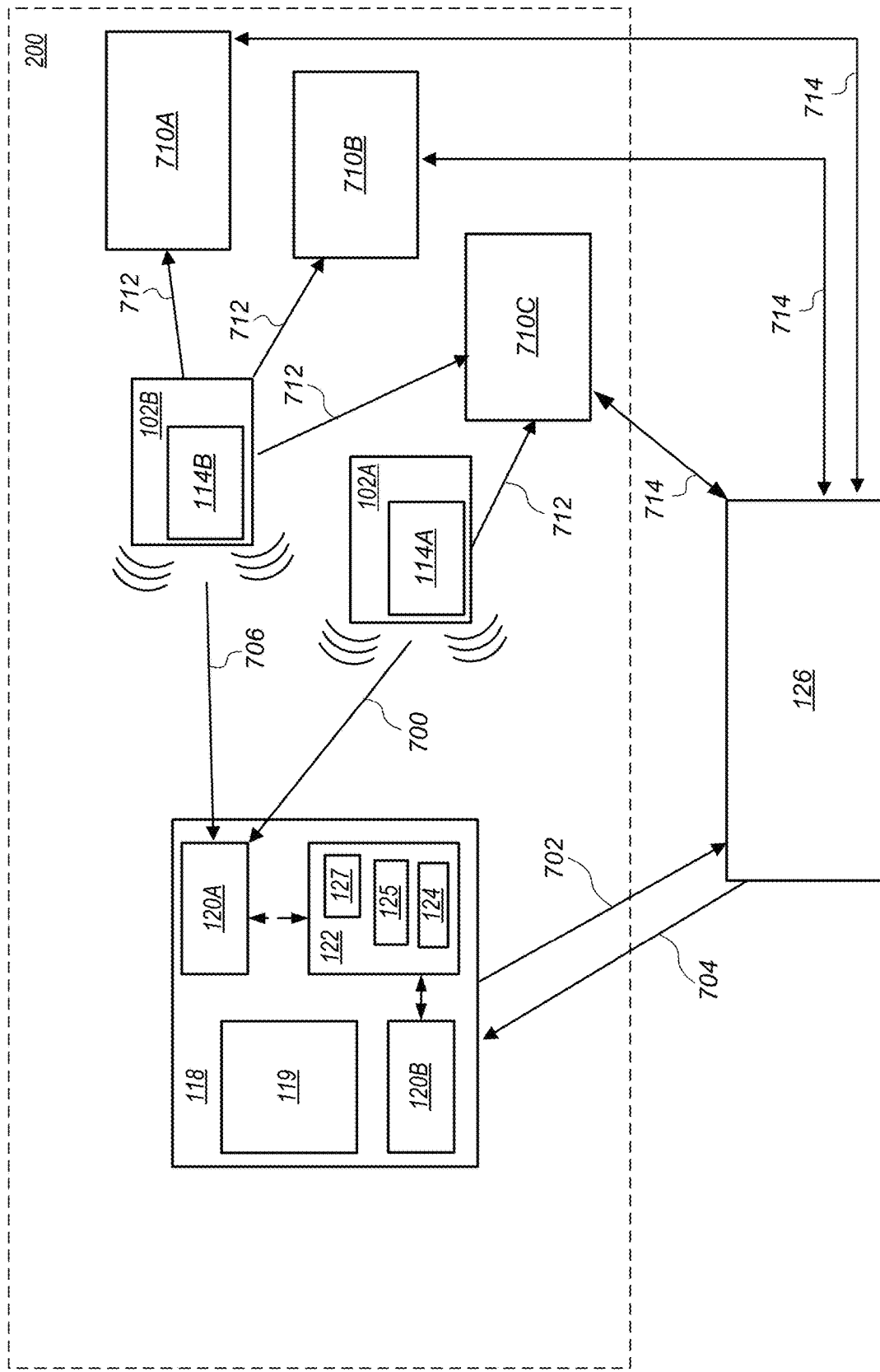
FIG. 9 depicts a block diagram representation of an embodiment of an interaction between a customer device, wireless beacons, and multiple network gateways at a retail location.

In some embodiments, assessing a specific location of wireless beacon 114 and POP display 102 within the retail location in 928 is accomplished using multiple wireless network gateways and/or wireless data collection devices. In some embodiments, two or more network gateways (or data collection devices) may be used to provide triangulation of the specific location of wireless beacon 114 and its associated POP display 102 within the retail location in 928. FIG. 9 depicts a block diagram representation of an embodiment of an interaction between customer device 118, wireless beacons 114, and multiple network gateways 710 at retail location 200. In certain embodiments, multiple network gateways 710A, 710B, 710C may be distributed throughout retail location 200. The locations of network gateways 710A, 710B, 710C may be known (e.g., known by a remote server or known by the network gateways). In some embodiments, network gateways 710A, 710B, 710C may be distributed in a certain section of retail location 200. For example, network gateways 710A, 710B, 710C may be distributed in a back area of retail location 200, a storage area, or other non-customer area of the retail location where POP displays 102 are placed when not being used to interact with customers.

In certain embodiments, triangulation of the location of wireless beacon 114B includes assessing signal strengths of two or more data broadcasts 712A, 712B, 712C between the wireless beacon and network gateways 710A, 710B, 710C. Data broadcasts 712A, 712B, 712C may include, for example, Bluetooth radio data broadcasts and/or sub-gigahertz radio data broadcasts. In some embodiments, the assessed signal strengths are provided to server 126 (e.g., the remote server) along with the unique identifier for wireless beacon 114B by network gateways 710A, 710B, 710C. Server 126 may use the assessed signal strengths to triangulate a position of wireless beacon 114B relative to the network gateways. In some embodiments, the assessed signal strengths are provided or collected by one of the network gateways (e.g., network gateway 710A) and the network gateway uses the assessed signal strengths to triangulate a position of wireless beacon 114B. The triangulation information may be used to assess the specific location (or an estimate of the specific location) of wireless beacon 114B within retail location 200.

In embodiments with network gateways 710A, 710B, 710C located in the back area of retail location 200, the spacing between the network gateways and wireless beacon 114B may be smaller as storage areas tend to be smaller areas than customer areas of retail locations (e.g., shopping areas in retail stores). The smaller spacing may provide a more accurate assessment of the location of wireless beacon 114B relative to network gateways 710A, 710B, 710C. For example, triangulation with typical Bluetooth radios may be difficult at distances over about 30 feet. Thus, having both network gateways 710A, 710B, 710C and wireless beacon 114B in the same area may provide more accurate assessment of the location of the wireless beacon when the wireless beacon is in the back area of retail location 200. Additionally, in some embodiments, network gateways 710A, 710B, 710C may be placed in a specific pattern that provides more accurate assessment of the location of wireless beacons in the area of the network gateways (e.g., a small or tight pattern for the network gateways). In some embodiments, using network gateways 710A, 710B, 710C in the back area of retail location 20 to assess the location of wireless beacon 114B may be used to deduce that if the wireless beacon is detected by the network gateways as not being in the back area of the retail location but in the retail location, the wireless beacon is in the customer area (e.g., front) of the retail location. In some embodiments, sensors (e.g., sensors 116) on POP displays 102 and/or network gateways 710A, 710B, 710C may be used to increase the accuracy of assessing the specific location of wireless beacon 114 within retail location 200. For example, light and/or motion sensors may be used on either POP displays 102 and/or network gateways 710A, 710B, 710C to increase the accuracy of location assessment.

In certain embodiments, as shown in FIGS. 1 and 3, network gateway 710 and/or data collection device 711 includes sensor 713. In certain embodiments, sensor 713 is an accelerometer. Network gateway 710 and/or data collection device 711 may be powered either by battery power or AC power (e.g., plugged into a wall outlet). The accelerometer may be used to assess or detect movement of network gateway 710 and/or data collection device 711. Network gateway 710 and/or data collection device 711 may be moved, for example, to provide a better location for receiving signals from wireless beacons 114 and/or during store reorganization. Moving network gateway 710 and/or data collection device 711 may change their position relative to the remote server, wireless beacons 114, other network gateways (or data collection devices), and/or a network access point.

In certain embodiments, network gateway 710 and/or data collection device 711 are retrained or reprogrammed based on its new absolute position and/or the changes in its relative positions. Network gateway 710 and/or data collection device 711 may provide a transmission (e.g., a signal) to the remote server (e.g., server 126) that the network gateway and/or the data collection device has been moved. For example, network gateway 710 may add a data packet to its transmission to the remote server indicating movement of the network gateway. In response to receiving the transmission that network gateway 710 and/or data collection device 711 have been moved, the remote server may send information to the network gateway and/or the data collection device to retrain or reprogram the device based on its new position. For example, the remote server may modify one or more operating parameters of network gateway 710 and/or data collection device 711 based on the received movement data. Retraining or reprogramming of network gateway 710 and/or data collection device 711 may include updating or reconfiguring signal data for the network gateway and/or the data collection device. In some embodiments, the remote server may send retraining or reprogramming information to additional network gateways or additional data collection devices based on the movement of network gateway 710 and/or data collection device 711 as such movement may affect the entire LAN of network gateways and data collection devices.

Figure 10:
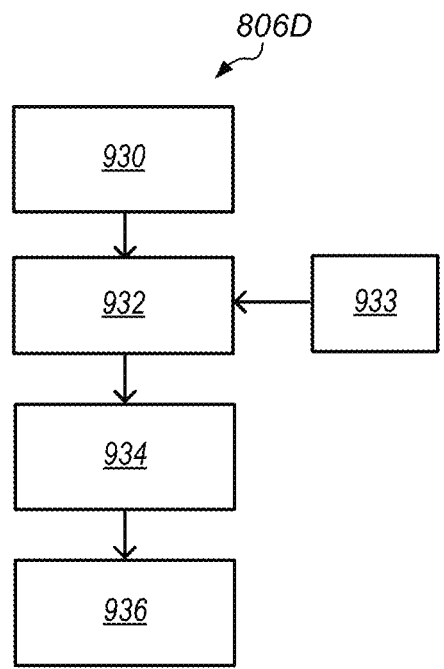
FIG. 10 depicts a flowchart of a fourth embodiment of a method used to assess a location of a POP display.

FIG. 10 depicts a flowchart of an embodiment of method 806D used to assess a location of a POP display. Method 806D may be used to assess the retail location of the POP display using interaction with customer device 118 and SDK 125 on the customer device. In 930, customer device 118 may receive a packet (e.g., a data packet such as packet 700, shown in FIG. 3) from wireless beacon 114. The packet may include the unique identifier for wireless beacon 114. In some embodiments, customer device 118 may receive multiple packets from multiple wireless beacons, each packet having the unique identifier for the originating wireless beacon.

In 932, SDK 125 may combine the received unique identifier along with information about the retail location of customer device 118 from 933. In certain embodiments, the retail location of customer device 118 in 933 is provided by another application (or entity) located on the customer device. For example, mobile application 127 (located in software package 122 on customer device 118, as shown in FIG. 1) may provide the retail location of the customer device. The manner in which mobile application 127 determines the retail location of customer device 118 may be unknown to SDK 125. For example, mobile application 127 may be a retailer "app" that determines the retail location (e.g., store number) of customer device 118 through an unknown or proprietary algorithm. Regardless of the manner in which mobile application 127 determines the retail location of customer device 118, SDK 125 may receive the retail location known by the mobile application in 933 and combine this information with the unique identifiers for the wireless beacons.

In 934, SDK 125 may then provide the retail location of customer device 118 along with the unique identifier to the remote server. In some embodiments, a time stamp from customer device 118 is also provided to the remote server. In certain embodiments, SDK 125 provides unique identifiers for a plurality of wireless beacons along with the retail location of customer device 118.

In 936, the remote server may assess or determine the (selected) retail location of wireless beacon 114 with the unique identifier by associating the wireless beacon with the provided retail location of customer device 118. If multiple unique identifiers are sent to the remote server, the remote server may determine the retail location of each of the wireless beacons with the unique identifiers by associating the retail location of customer device 118 with each wireless beacon. The retail location of the POP display determined in 936 (the POP display having the wireless beacon with the unique identifier) may be provided to method 800, shown in FIG. 5, to be used as the assessed retail location in 808.

Identification of the retail location of wireless beacon 114 by server 126 through the interaction of the wireless beacon with customer device 118 allows the wireless beacon's location to be dynamically cataloged by the server and potentially other portions of the overall system, including the wireless beacon itself. Identification of the retail location by server 126 may be advantageous in that it does not require that the final destination of wireless beacon 114 and circuit board 104 be known at the time of manufacture or distribution since its location may be determined without any external intervention after POP display 102 containing the circuit board has been set up in its intended final location.

The above disclosed embodiments may be utilized to optimize embodiments of a manufacturing supply chain associated with POP displays 102 and circuit board 104. As noted above, the location of a given wireless beacon and the other wireless beacons that it may connect to need not be known before the wireless beacon, or circuit board, is installed in its final location. Current commercially available products, however, treat the installation of wireless beacons as a network infrastructure project and do not contemplate integrating wireless beacons into other systems (e.g., POP displays). Thus, for a given store, technicians typically install hard points to supply power and network connectivity for each wireless beacon, which severely limits a store manager's flexibility in placing the beacons. Additionally, once a wireless beacon is deployed in a location, moving the wireless beacon may require bringing in a technician to disconnect and then rewire each wireless beacon in its new location. Location changes must also be accompanied by revisions to the database that describes the placement of each wireless beacon. This mode of deployment is fundamentally incompatible with conventional POP displays (e.g., non-connected POP displays), which typically can be moved around at will. If wireless beacons and their attendant power and networking requirements are installed in POP displays, then the POP displays may become inflexible infrastructure points without a system that allows for flexible movement and locating of the POP displays as described herein.

As described herein, the embodiments of POP display system 100 and POP display 102 with wireless beacon 114 may provide increased flexibility for the placement and movement of the POP displays because of the modular, ad hoc nature of the disclosed embodiments. POP display system 100 may provide a flexible and easy to deploy system that does not require specialized technicians and/or expensive wiring. In certain embodiments, a store manager is able to simply assemble POP display 102 and place the POP display in the store anywhere desired as if it was a conventional display.

Additionally, the disclosed modular POP display system 100 and methods associated with the system simplify the overall supply chain for POP displays. Traditionally, POP displays are manufactured in bulk at a factory and then sent to a distribution center where the displays may remain in storage for months at a time before distribution to a final location. When incorporating wireless beacons, this creates a logistical problem as one would ideally like to know where a given wireless beacon will end up (e.g., so the display can be programmed based on the final location). Current manufacturing supply chains, however, are not structured to accommodate that level of granularity. Typically, large pallets of displays are manufactured, stored, and bulk distributed to stores en masse without regard to a specific display's journey. This method is not a problem when a display simply contains a static display and perhaps a coupon and/or a product holder. For POP displays that interact (e.g., dynamically interact), via wireless beacons, with a customer device so that location, content, and customer specific information may be communicated between the customer device and a remote server, however, such distribution methods are problematic as they require experienced and expensive technicians to install wireless beacon enabled displays at their known final location. Once installed, a human may manually configure each wireless beacon enabled display with its location and identification information, as well as record such information for use in a database. The manual installation, however, may be tedious, time consuming, and difficult to implement on a consistent basis.

Figure 11:
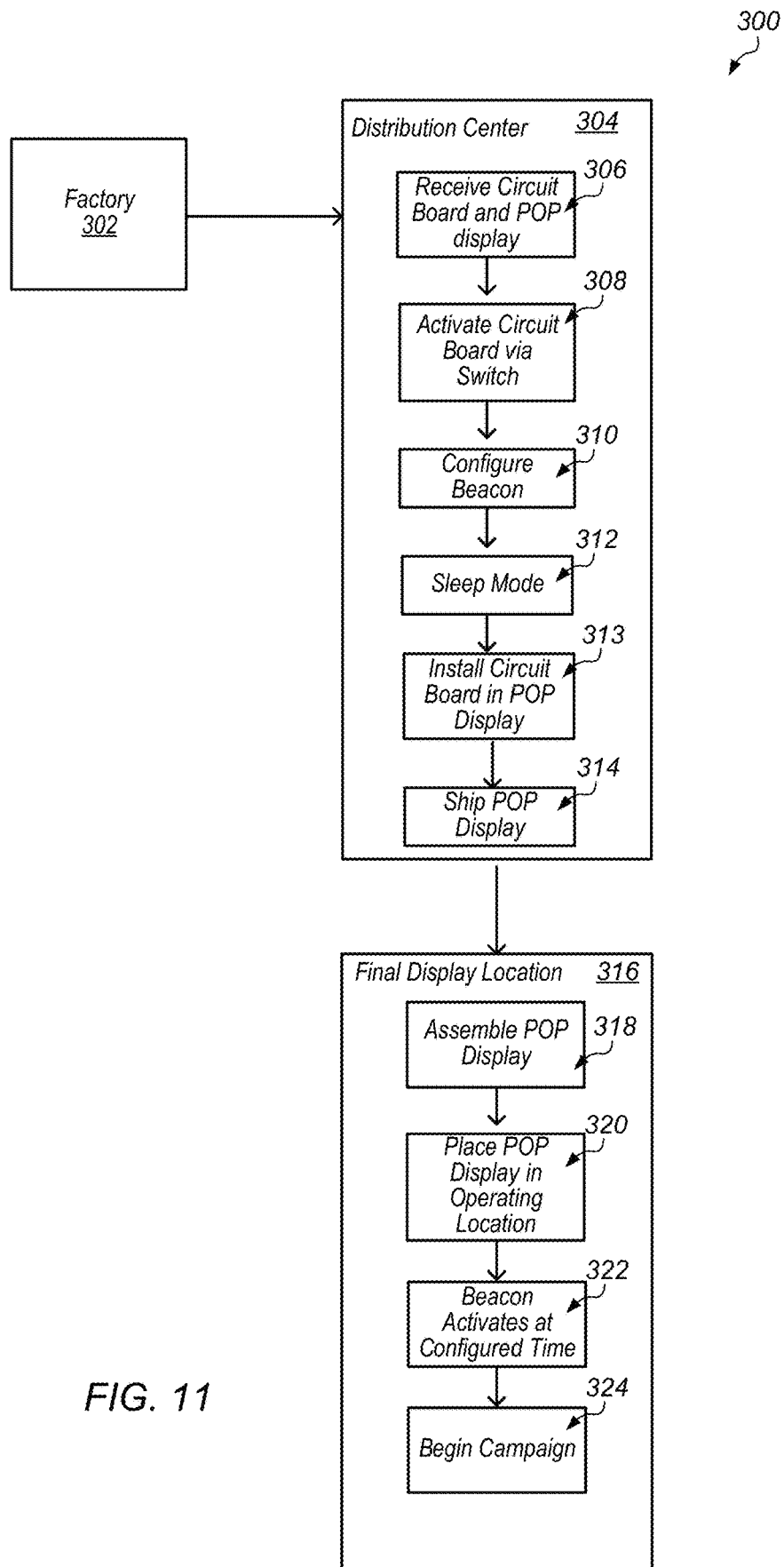
FIG. 11 depicts a flowchart of a manufacturing supply chain associated with POP displays.

FIG. 11 depicts a flowchart of a manufacturing supply chain associated with POP displays 102. Supply chain 300 utilizes embodiments of POP display system 100, POP display 102, and circuit board 104 disclosed herein that via their ad hoc nature, may be flexible and readily compatible with existing manufacturing practices. In certain embodiments, large quantities of POP displays 102 may end up at a final display location without advanced planning and interaction between the POP displays with circuit boards 104, customer devices (e.g., customer devices 118), and a server (e.g., server 126) may provide a configuration to POP system 100 as needed.

In certain embodiments, as shown in FIG. 1, circuit board 104 includes battery 106. In some embodiments, battery 106 is a non-removable battery or a permanently affixed battery. Battery 106 being a non-removable battery may provide power savings in the context of the supply chain 300, shown in FIG. 11. Non-removable batteries may be desirable in supply chain 300 because they are cheaper and are more reliable. For example, it may be more difficult for a permanently affixed battery to be jarred out of its connection as compared to a normal (removable) battery mounted in a typical holder. Additionally, another downside to removable batteries is that they may have to be installed on site by the personnel who set up POP display 102 with circuit board 104 in its final location. Such personnel may fail to install the batteries correctly or even install the batteries at all, rendering POP display 102 useless for its intended purpose.

A consideration in using a non-removable (e.g., permanent) battery as battery 106, as shown in FIG. 1, is that, due to the fact that the battery cannot be replaced, it is important to preserve battery life to maximize the service life of circuit board 104. To increase battery life, in certain embodiments, as shown in FIG. 1, circuit board 104 includes switch 108. Switch 108 may be a switch such as a power jumper or functional equivalent (e.g., a dip switch). Switch 108 may provide a removable connection between battery 106 and the rest of the circuitry in circuit board 104 (e.g., wireless beacon 114). Thus, no power is drained from battery 106 when switch 108 is not installed or turned on. Not installing switch 108 allows circuit board 104 to be stored for extended lengths of time (e.g., approximately one year or greater) without reducing any useable power storage in battery 106.

As shown in FIG. 11, POP display 102 (shown in FIG. 1) is manufactured in factory 302. After manufacture in factory 302, POP display 102 may be moved from the factory to distribution center 304. In certain embodiments, POP display 102 moves from factory 302 to distribution center 304 along with circuit board 104. Circuit board 104 may have battery 106 disconnected from any power draining circuitry (e.g., controller 112 and/or wireless beacon 114). For example, switch 108 may disconnect power to power draining circuitry. At distribution center 304, circuit board 104 (with deactivated circuitry) and POP display 102 are received in 306. At 308, switch 108 is installed or turned on to provide power from battery 106 to the rest of the circuitry in circuit board 104 and wireless beacon 114 is activated. In certain embodiments, wireless beacon 114 is configured such that, upon its first activation, the wireless beacon scans for specific connections that are associated with its configuration mode.

The use of a power switch (e.g., switch 108) in circuit board 104 and supply chain 300 provides several advantages. One advantage is that switch 108 ensures that battery 106 is disconnected at the time of manufacture of POP display 102 to extend the life of the battery. Another advantage is that the wireless beacon 114 is deactivated until switch 108 is connected. Deactivating wireless beacon 114 allows distribution center 304 to activate a small number of POP displays at a time in a configuration procedure discussed below. If, for example, the thousands, or even hundreds of thousands, of POP displays in a warehouse (e.g., distribution center 304) were active at the same time and their wireless beacons were actively broadcasting and/or scanning, the resulting electronic cacophony could render all communication and configuration difficult or even impossible. Empirical testing has shown that having more than 50 active beacons in close proximity may cause severe wireless interference problems. Thus, a distribution center full of active beacons could be rendered completely useless. Furthermore, transportation rules and requirements often restrict the transmission of electromagnetic signals by shipped items. Thus, the ability to disable wireless broadcasts by the included beacons both after initial manufacture and during distribution has the additional benefit of facilitating the transport of embodiments of POP displays 102 with wireless beacons 114.

In some embodiments, it may be desirable to physically activate a battery at the time a circuit board is removed from its shipping container. In such embodiments, an insulator may be placed between battery terminals to turn the controller off. Such an insulator may be tethered to the external shipping enclosure in such a way that the battery insulator is pulled from between the terminals as the circuit board is removed from the shipping enclosure. Removing the battery insulator may then activate the controller and the wireless beacon.

In certain embodiments, after wireless beacon 114 establishes a connection in 308, variations of the wireless beacon's parameters are configured in controller 112 via software in 310. Controller 112 may be configured, for example, via the BLE connection made between wireless beacon 114 and a programmer device (e.g., a wireless programming device). In certain embodiments, wireless beacons 114 are associated with a selected campaign in 310 (e.g., as part of step 802, shown in FIG. 5). During configuration in 310, time parameters may be set in controller 112 such that wireless beacon 114 is able to determine and act upon a target start date of a (selected) campaign. For example, controller 112 and clock 113 may be configured with the current date and time as well as the target date and time for the selected campaign to begin. In certain embodiments, this process is simplified to absolute amount of time between the time of configuration and the beginning of the selected campaign. Various other parameters may be set during the configuration in 310 as well.

In certain embodiments, during configuration 310, unique label 117, shown in FIG. 1, is scanned or otherwise identified. In some embodiments, unique label 117 is added to circuit board 104 before arriving at distribution center 304. In some embodiments, unique label 117 is added at distribution center 304. Scanning unique label 117 may allow the unique label to be associated with wireless beacon 114 and its unique identifier. For example, unique label 117 may be scanned and the unique label may be programmed (via the BLE connection) to be associated with the unique identifier for wireless beacon 114 and/or other associated data such as, but not limited to, an activation date or campaign associated with circuit board 104 and the wireless beacon. Associating unique label 117 with wireless beacon 114 (and its associated data) allows information about the wireless beacon to be accessed while the wireless beacon is asleep by scanning the unique label. Unique label 117 may be scanned while wireless beacon 114 is asleep to obtain programmed information (e.g., campaign information or activation time) and place circuit board 104 into a proper POP display (as described below) before the POP display is shipped to a final display location.

After configuration is complete in 310, the configuration application disconnects from controller 112 and wireless beacon 114 (and circuit board 104) may enter sleep mode 312. In sleep mode 312, wireless beacon 114 may shut down its Bluetooth radio, and the circuitry in circuit board 104 may enter a low power mode to conserve the batteries before the circuit board is installed onto POP display 102 and also while the POP display is stored in advance of being shipped to a final location (e.g., a retail location). Thus, even though switch 108 has been activated in distribution center 304, the problem of having too many active Bluetooth radios (e.g., wireless beacons) in close proximity in the distribution center is inhibited as each activated radio only remains active for a short period of time as configuration of the wireless beacon is conducted. Also, it is worth noting that the low power mode referred to above includes any control circuitry, such as a microcontroller, not just the Bluetooth beacon itself. It will also be apparent to one of ordinary skill in the art that such circuitry may be implemented in various layouts, such as in several discrete chips or one integrated chip.

While circuit board 104 and wireless beacon 114 are in sleep mode 312 or a low power mode, the circuit board may be installed in POP display 102 in 313. After circuit board 104 is installed, POP display 102 may be moved (e.g., shipped or transported) in 314. POP display 102 may be moved to final display location 316, as shown in FIG. 11. Final display location 316 may be, for example, a retail or shopping location for POP display 102 to be located in front of customers to provide an interactive customer experience. At final display location 316, POP display 102 may be assembled in 318 and placed in an operating location in 320. After being placed at the operating location in 320, when the configuration circuitry (programmed in 310) determines that the target date and time for the campaign has been reached, the circuitry awakens from its sleep state at the configured time in 322. In 322, wireless beacon 114 activates its wireless (e.g., Bluetooth) radio and campaign related operations begin in 324.

In some embodiments, when POP display 102 is located at distribution center 304 (or another storage warehouse before the POP display is sent to the retail location), wireless beacons 114 may be programmed to broadcast their signals (turn on their Bluetooth radios) for at least some time (e.g., while the wireless beacons are in low power mode and/or in sleep mode 312). At distribution center 304, the exact location of wireless beacons 114 and POP displays 102 is not necessary to be known but it is useful to have a knowledge whether the wireless beacons and the POP displays are, or are not, at the distribution center. In such embodiments, wireless beacons 114 may broadcast their signals for at least some time so that the signals can be received to determine if the wireless beacons (and their associated POP displays 102) are in distribution center 304. The signals may be received, for example, by a wireless network gateway or other data collection device located at distribution center 304.

As described above, however, if every wireless beacon 114 at distribution center 304 broadcasts at the same time, it can create various problems with receiving the signals and/or other electronics in the distribution center. As described herein, wireless beacon 114 may be programmed with information about the target date and/or time for a campaign associated with the wireless beacon and its associated POP display 102. In certain embodiments, wireless beacon 114 intermittently broadcasts its wireless signal with the target date and/or time for the campaign while in its low power mode. With multiple (e.g., hundreds or thousands) of wireless beacons 114 at distribution center 304 associated with the same campaign, each wireless beacon (or a small group of wireless beacons) may be programmed to broadcast its wireless signal during a different time period. For example, each wireless beacon 114 (or a small group of wireless beacons) may broadcast its wireless signal once a day during a selected time slot during the day. The selected time slot may have a predetermined broadcast duration (e.g., the duration of the broadcast is predetermined) of at most about 10 minutes, at most about 15 minutes, or at most about 20 minutes. In some embodiments, beacons may be assigned to specific frequencies to further reduce the chance of collisions or airway saturation (e.g., two or more beacons may be assigned different frequencies for broadcasting their wireless signals).

In certain embodiments, each wireless beacon 114 is assigned a time slot for broadcasting based on its unique identifier. As the unique identifier is typically randomly assigned, assigning each wireless beacon 114 a time slot based on the unique identifier for the wireless beacon may distribute wireless beacon broadcasts throughout the day. Distributing wireless beacon 114 broadcasts throughout the day at distribution center 304 may reduce the probability of signal collisions in the distribution center as the number of wireless beacons broadcasting at any given time is reduced. In certain embodiments, after the target date and/or time of the campaign is reached, wireless beacons 114 begin broadcasting more frequently (e.g., every hour or so) as POP displays are expected to be active and at the retail location by the target date and/or time.

As described above, the embodiment of supply chain 300 may provide a solution to the problem of how to build POP displays with wireless beacons in advance while not running down the batteries while the displays are being stored. Using supply chain 300 may also ensure that the associated radios are inactive while the POP display is being stored and transported. These aspects may be important when considering the overall supply chain.

Figure 12:
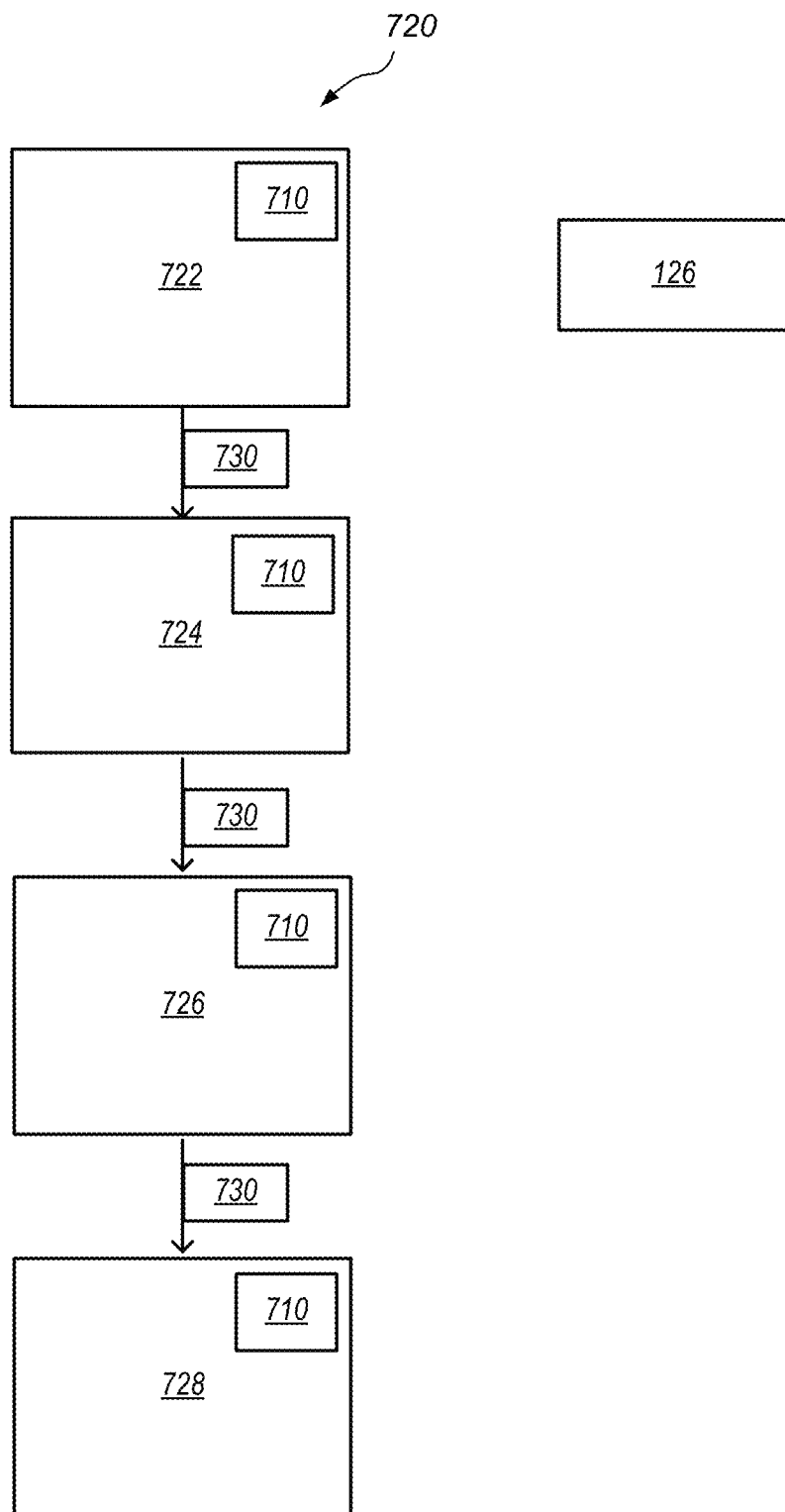
FIG. 12 depicts an embodiment of a supply/distribution chain for POP displays.

In certain embodiments, wireless network gateways and/or wireless data collection devices (e.g., network gateway 710 or another data collection device such as data collection device 711) are used at one or more locations in a supply/distribution chain for POP displays 102 to monitor movement of the POP displays through the supply/distribution chain. FIG. 12 depicts an embodiment of supply/distribution chain 720 for POP displays 102. In certain embodiments, supply/distribution chain 720 includes factory 722. Factory 722 may be, for example, a factory for manufacturing and/or assembly of POP displays 102. In some embodiments, circuit board 104 with wireless beacon 114 is installed on POP displays 102 at factory 722.

In some embodiments, POP displays 102 are moved to pack-out 724. At pack-out 724, products, product information, and/or other product materials may be added to POP displays 102. After the pack-out of POP displays 102, the POP displays may be moved to distribution center 726. Distribution center 726 may be, for example, a distribution center associated with a specific retailer (e.g., a distribution center for a specific retail store). At distribution center 726, wireless beacons 114 may be programmed to be associated with a selected campaign for the specific retailer as described herein. For example, the unique identifiers for wireless beacons 114 may be associated with the selected campaign.

In certain embodiments, POP displays 102 are moved to retail location 728 at a designated time associated with the selected campaign for the specific retailer. As described herein, the location of a specific retail location 728 for each POP display 102 may not be known and the POP displays are distributed randomly to several retail locations associated with the specific retailer. At retail location 728, POP displays 102 may be located in a front or back of the retail location at one or more times during their use. Additionally, methods described herein may be used to determine if POP displays 102 are located in the front or back of retail location 728.

POP displays 102 may be moved through supply/distribution chain 720 using a variety of shipping/freight transit methods. For example, as shown in FIG. 12, POP displays 102 may be moved through supply/distribution chain 720 using trucks 730. Other shipping methods may be used including, but not limited to, train, ship (boat), or air transport.

In certain embodiments, network gateways 710 are located at factory 722, pack-out 724, distribution center 726, and/or retail location 728. In some embodiments, network gateways 710 are located on trucks 730. Network gateways 710 may be used, as described herein, to receive data packets from wireless beacons 114 on POP displays 102 and transmit data received in the data packets to a remote server (e.g., server 126). Network gateways 710 on trucks 730 may transmit information to a remote server over a wireless data network (e.g., a cellular network).

As described above, wireless beacons 114 may not be programmed to broadcast information for the selected campaign until they are located at distribution center 726. Wireless beacons 114 may, however, include initial programming that configures the wireless beacons 114 to broadcast identifying information for the wireless beacons (e.g., the unique identifiers) once the wireless beacons are activated in some manner Thus, wireless beacons 114 may be activated at factory 722 to begin broadcast identifying information. The identifying information may be received by network gateway 710 at factory 722. Server 126 may then identify that specific wireless beacons are at factory 722 based on the identifying information received from network gateway 710 with the location of the network gateway being known by the server. Network gateways 710 with known locations at each of the other locations in supply/distribution chain 720 may be used similarly to identify the locations (and time at the locations) of wireless beacons 114 (and their associated POP displays 102) as the POP displays move through the supply/distribution chain.

In certain embodiments, wireless beacons 114 intermittently broadcast their wireless signals (e.g., data packets with identifying information) while the wireless beacons are in a low power mode. For example, as described above, each wireless beacon 114 may broadcast its wireless signal during a different time period (e.g., once a day during a selected time slot during the day). Intermittently broadcasting the wireless signals from wireless beacons 114 may prevent interference between wireless signals and/or overloading network gateways 710 with wireless signals. As described herein, wireless beacons 114 may become active (e.g., broadcast continuously or substantially continuously) when the wireless beacons arrive at retail location 728 and/or when the designated time for the selected campaign begins.

In certain embodiments, POP displays 102 that move through supply/distribution chain 720 include one or more sensors on the display (e.g., sensor 116 as described herein). The sensors may be used to track one or more properties of POP displays 102 as the POP displays move through supply/distribution chain 720. Data from the sensors may be stored in memory on POP displays 102 (e.g., memory 110). In some embodiments, the data from the sensors is stored and then sent to server 126 after POP displays 102 reach their final location (e.g., retail location 728). In some embodiments, the sensor data is sent to server 126 as POP displays 102 move through supply/distribution chain 720. For example, the sensor data may be provided in data packets broadcast by wireless beacons 114 and received by network gateways 710. Network gateways 710 may then provide the sensor data to server 126.

Examples of properties of POP displays 102 that may be tracked by the sensors include, but are not limited to, temperature and motion of the POP displays. Tracking temperature of POP displays 102 may be useful for perishable products that are temperature sensitive. For example, if the temperature of POP displays 102 exceeds minimum and/or maximum temperatures allowable for a selected product, an alert may be sent that the product may be spoiled or unsafe for consumer use. Tracking motion of POP displays 102 may be useful for determining how the POP displays are handled through supply/distribution chain 720.

In some embodiments, POP display 102 includes a light sensor (e.g., one of sensors 116, shown in FIG. 1, is a light sensor). In such embodiments, the light sensor may be used to trigger activation of the radio only after the light sensor detects visible light level above a threshold and the campaign date has started. Using the light sensor to trigger activation may further conserve power by not turning the radio on if POP display 102 has not been unpacked or the store is closed and the lights are off. The radio and some sensors, however, may not need to operate under the same schedule or conditions. For example, certain sensors may be active even when POP display 102 is in low power mode. These sensors may be used to allow POP display 102 to determine whether the display is being transported or being set up at a final location. One skilled in the art will recognize that this permits one to select what a skilled artisan deems to be the optimal tradeoff between battery consumption and situational awareness. Some embodiments may utilize other sensors to determine whether the store is open or whether potential customers are nearby (e.g., proximity sensors may be used to determine if customers are nearby). Information from these sensors may also be combined with the campaign start date to determine whether the radio should be activated. In some embodiments, one of sensors 116 is an accelerometer. The accelerometer may be active when POP display 102 is in low power mode and may trigger activation of the radio when any movement is registered by the accelerometer. If, however, a light sensor does not detect a visible light level above the threshold and/or the campaign date has not started, the activation of the radio may be temporary (e.g., only for a short, selected amount of time).

Figure 13:
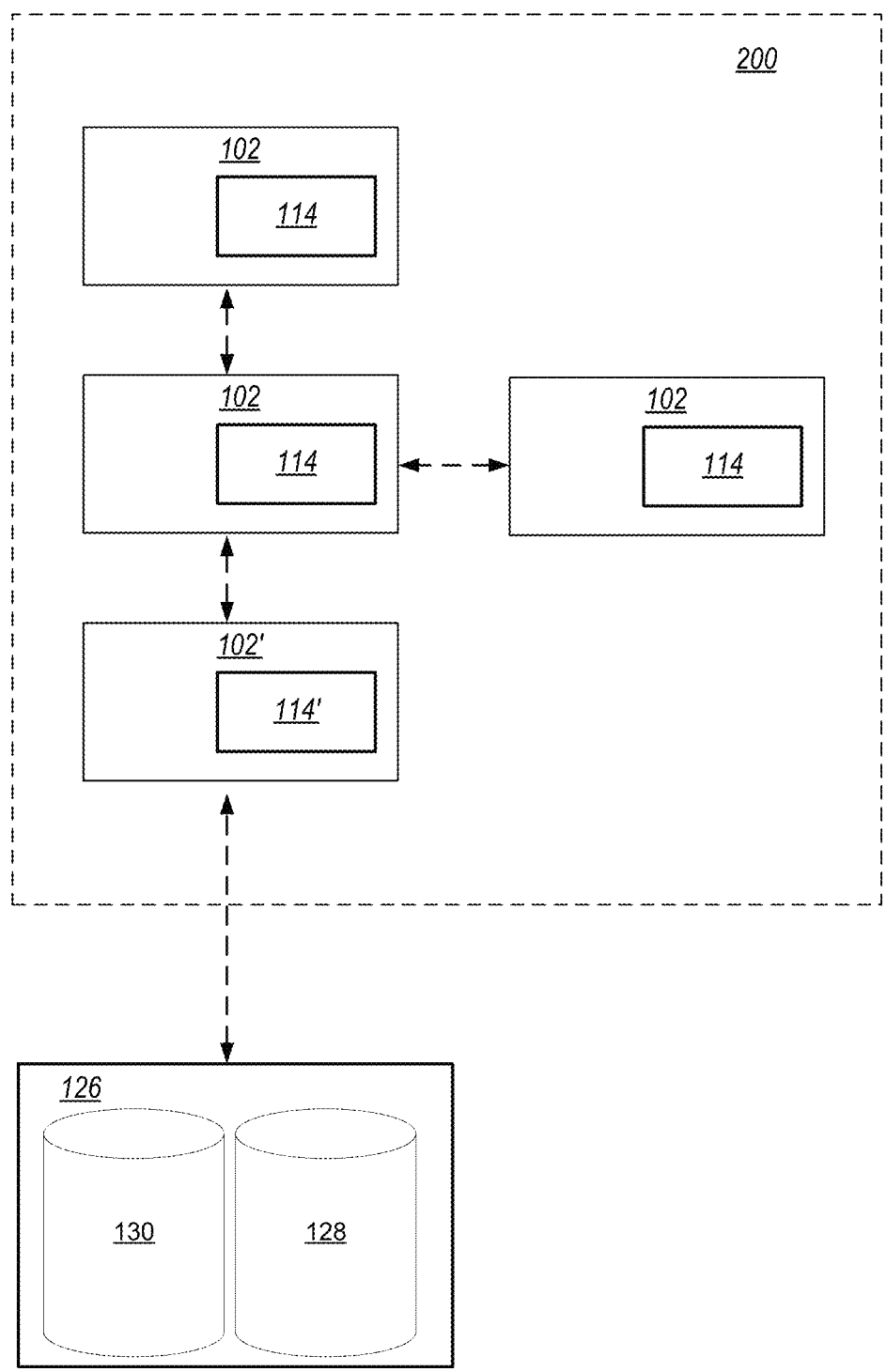
FIG. 13 depicts a block diagram of an embodiment of a plurality of point of purchase displays at a retail location.

In some embodiments, POP display 102 (and POP display system 100) allows for the tracking of the deployment rate of POP displays at a retail location. FIG. 13 depicts a block diagram of an embodiment of a plurality of POP displays 102 at retail location 200. POP displays 102 at retail location 200 are capable of communicating with each other and/or with server 126. In certain embodiments, POP displays 102 communicate with each other and provide information to a single POP display (e.g., POP display 102'). POP display 102' may then communicate with server 126 to provide the information to the server, as shown in FIG. 13.

In some embodiments, server 126 detects information about the relative locations of wireless beacons 114. For example, since each wireless beacon 114 is equipped with a unique identifier, server 126, upon detecting and determining the identity of one wireless beacon 114 in communication range with another wireless beacon, may determine that the beacons are associated with a specific store. In some embodiments, depending on the configured broadcast mode of wireless beacons 114, server 126 may communicate with wireless beacon 114' to relay information to the wireless beacon and other wireless beacons 114 within communication range of wireless beacon 114'. In this way, a group of beacons may operate as an ad hoc distributed communication network, which is advantageous as this does not require that the network be set up and configured beforehand by a technician.

As shown in FIG. 3, network gateway 710 may be located at retail location 200. Network gateway 710 may be capable of receiving data packets broadcast from wireless beacons 114 located at retail location 200. Wireless beacons 114 may be located on POP displays 102 that are associated with a selected campaign where the selected campaign is based on retail location 200. Network gateway 710 may provide information from the received data packets to a remote server. The information provided may include unique identifiers for wireless beacons 114. Based on receiving the unique identifiers for wireless beacons 114 from network gateway 710, the remote server may assess that the wireless beacons are associated with the selected campaign (based on their unique identifiers), the wireless beacons are working, and the wireless beacons (and their associated POP displays 102) are located at retail location 200.

In some embodiments, network gateway 710 is capable of receiving data packets broadcast from additional wireless beacons located at retail location 200. These additional wireless beacons may be "rogue" wireless beacons that are not associated with the selected campaign for retail location 200. These additional wireless beacons may include, but not be limited to, wireless beacons associated with other campaigns and/or wireless beacons used for other functions. Network gateway 710 may provide information regarding these additional wireless beacons to the remote server. In some embodiments, the remote server may catalogue or attempt to identify the additional wireless beacons for reporting purposes. For example, a report may be provided to retail location 200 (or an entity associated with the retail location) identifying the additional wireless beacons at the retail location that are not associated with the selected campaign.

In some embodiments, the presence of a display may be detected on the selling area of a store (e.g., the customer area or front of the store) and when present, trigger a message to consumers whether they are present in the store or not (e.g., does not matter if the consumer is physically present in the store or not). In such embodiments, detection of the presence of the display may be used to announce temporary "deals" or other offers that may be an attraction for consumers to make a special or unplanned trip to the store.

While marketing materials (such as product displays or POP displays) are intended for use at a retail location (e.g., retail location 200), often, and sometimes in large percentages, these marketing materials are not put up at all, are put up at the wrong time, or are discarded prematurely. Thus, there is an interest in monitoring retail location compliance with marketing (e.g., selected campaign) plans using small electronic devices embedded or coupled to the marketing materials. A challenge presented with the use of electronic devices, however, is disposal of potentially-hazardous batteries or circuit boards with hazardous materials. Many current options for disposal of potentially-hazardous batteries or circuit boards with hazardous materials are expensive or not available for many retail locations.

Additionally, disposal standards are evolving at different paces by state and by country. Consumer product manufacturers and retailers are facing a combination of regulatory challenges and fear that some aspect of their long-standing disposal programs will be subject to steep fines or closure. Further, in addition to financial penalties, public trust and consumer loyalty, which typically takes years or decades to build, may deteriorate rapidly with public disclosure of disposal infractions.

Wireless beacons 114 and circuit boards 112 on POP displays 102, as described herein, may pose new and different disposal issues. In particular, embodiments described herein of wireless beacons 114 and/or circuit boards 112 include electronics and batteries designed to be embedded in large volumes of cardboard-based disposable displays, signs, and other marketing materials (e.g., POP displays 102). Retailers may not even be aware of the presence of wireless beacons 114 and/or circuit boards 112 due to their being embedded in POP displays 102. Typically, any items embedded in POP displays 102 are discarded along with the paper-based materials to which they are attached. Proper disposal of these electronic items may, however, be critical as new technologies and/or future regulations are developed. It may also be desirable to provide affordable and/or creative solutions for proper disposal of these electronic items.

As described herein, wireless beacons 114 (located on circuit boards 112) may be manufactured and sent to a factory for assembly of POP display 102 (e.g., factory 722, shown in FIG. 12). Assembly of POP display 102 may include adding marketing materials and/or special signage to the POP display in addition to coupling or embedding circuit boards 112 and wireless beacons 114 on the POP display. In certain embodiments, wireless beacon 114 is placed in an enclosure when coupled to POP displays 102. The enclosure may be provided to enable proper disposal and/or recycling of wireless beacon 114.

Figure 14:
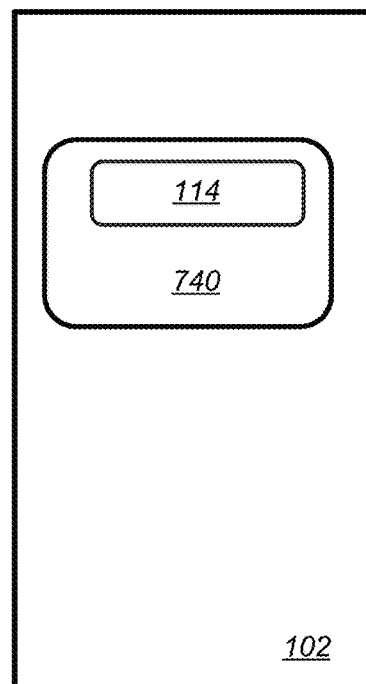
FIG. 14 depicts a top view representation of an embodiment of a wireless beacon in an enclosure on a POP display.
Figure 15:
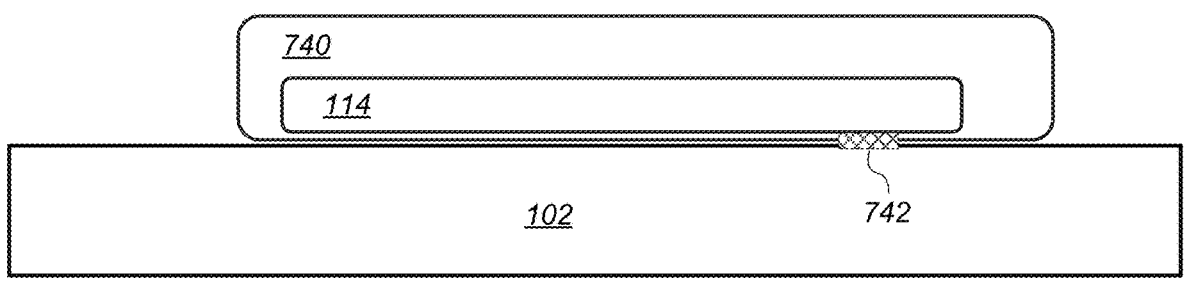
FIG. 15 depicts a side view representation of the embodiment depicted in FIG. 14.

FIG. 14 depicts a top view representation of an embodiment of wireless beacon 114 in enclosure 740 on POP display 102. FIG. 15 depicts a side view representation of the embodiment depicted in FIG. 14. Enclosure 740 may include pliable materials that are durable or sturdy. Enclosure 740 may be, for example, a plastic bag with a particular shape. In some embodiments, enclosure 740 is a plastic bag with a rectangular shape similar to a mailing envelope.

In certain embodiments, enclosure 740 is coupled to POP display 102 using an adhesive material (e.g., an adhesive strip of material), or another attachment means, that allows a person (e.g., a retailer employee) to remove the enclosure from the POP display by applying a small amount of force. In certain embodiments, as shown in FIG. 15, sensor 742 is positioned between enclosure 740 and POP display 202. In some embodiments, sensor 742 may include, or be part of, the attachment means for attaching enclosure 740 to POP display 202. Sensor 742 may be used to detect when enclosure 740 is attached to POP display 102 and/or when the enclosure is removed from the POP display. For example, in some embodiments, sensor 742 may be a light sensor or a magnetic sensor used to assess a condition of the attachment between enclosure 740 and POP display 102 (e.g., assess whether or not the enclosure is attached to the POP display). When sensor 742 detects that enclosure 740 and POP display 102 are attached, wireless beacon 114 may be allowed to actively operate as described herein (e.g., broadcast its wireless signal).

When sensor 742 detects that enclosure 740 and POP display 102 are not attached, an operating state of wireless beacon 114 may be changed. The change in operating state may be executed by a program on wireless beacon 114. In certain embodiments, wireless beacon 114 may change to an operating state where the wireless beacon is placed in an "alert" state. In the alert state, wireless beacon 114 may broadcast a wireless signal with one or more data packets that indicate a "removal" status of the wireless beacon (e.g., indicate that the wireless beacon has been removed from POP display 102). The wireless signal may be received by customer devices 118, network gateway 710, and/or data collection device 711 and transmitted to server 126, as described herein. After a suitable period for broadcasting its "removal" status, wireless beacon 114 may execute a shutdown program to turn the wireless beacon off substantially permanently.

In some embodiments, sensor 742 includes, or is, a piece of conductive tape. The conductive tape may be used to attach (couple) enclosure 740 to POP display 102. Enclosure 740 may include a small hole that allows the conductive tape to couple wireless beacon 114 to POP display 102. In some embodiments, the conductive tape is used in addition to the adhesive material coupling enclosure 740 to POP display 102. The conductive tape may form an electrical connection to electronics in wireless beacon 114 that is detected by circuitry in the wireless beacon. With the electrical connection detected, wireless beacon 114 is allowed to actively operate as described herein (e.g., broadcast its wireless signal).

In certain embodiments, when enclosure 740 is removed from POP display 102 (e.g., at the end of its use or for any other reason), the conductive tape remains attached to POP display 102 and the conductive tape disconnects from electronics in wireless beacon 114. When the conductive tape disconnects from the electronics in wireless beacon 114, the circuitry in the wireless beacon 114 may detect the change in physical state of the wireless beacon and change an operating state of the wireless beacon. For example, the operating state may be change to an operating state with enclosure 740 not attached to POP display 102 as described herein.

In certain embodiments, enclosure 740 includes instructions for returning wireless beacon 114 to a proper disposal location (e.g., the manufacturer or programmer of the wireless beacon responsible for disposal or recycling of the electronics in the wireless beacon). The instructions may include a shipping address and prepayment information for shipping enclosure 740 and wireless beacon 114. For example, enclosure 740 may be a prepaid shipping enclosure with a preprinted address and postage paid information for scanning by a shipping company.

Enclosure 740 may include a barcode label or QR label (e.g., unique label 117) that is scannable to indicate the unique identifier for wireless beacon 114. When enclosure 740 is received at the shipping destination (e.g., the shipping address on the enclosure), the barcode label may be scanned to enter the unique identifier into a database indicating wireless beacon 114 has been returned. The database may associate the unique identifier with the retail location (e.g., store) that returned wireless beacon 114 based on location information determined for the wireless beacon. The database may also include the selected campaign associated with the returned wireless beacon 114.

Information regarding the return of multiple wireless beacons in the database may be used to assess one or more characteristics of a disposal/recycling program associated with the wireless beacons. For example, statistics such as, but not limited to, which stores are most proactively returning (e.g., recycling) the wireless beacons for a selected campaign, which stores are removing and discarding the wireless beacons (shown by indicate of the wireless beacon turning off but not being returned), the number of beacons being redeployed (e.g., returned and then sent back into service), and which beacon placement practices are suitable for better recycling. These statistics may be used to assess ratings for manufacturers, retailers, and/or display providers.

The disposal/recycle program using enclosure 740 described above may provide a simple, low effort and inexpensive program for recycling and/or reusing wireless beacons 114. In addition, enclosure 740 and sensor 742 in combination with circuitry on wireless beacon 114 may be used to provide automatic indication of removal of the wireless beacon from POP display 102, provide automatic shutdown of broadcasting for the wireless beacon as well as other electronic functions, and provide a simple return method for a retailer. Returning wireless beacons 114 to the shipping destination (e.g., a proper disposal/recycling site) may allow the wireless beacons to be refurbished, reused, or disposed of properly rather than simply being thrown in landfills or other locations not suitable for electronic disposal.

It is known in the industry that, on average, only a fraction of POP displays delivered to a store are actually deployed. In certain embodiments, however, wireless beacon 114 is capable of communicating, whether directly or indirectly, with server 126, as shown in FIGS. 1 and 13. Thus, wireless beacon 114 may relay information gathered by sensors 116 indicating that its POP display has been deployed. For example, if POP display 102 reaches its campaign start time but its light sensor indicates darkness for a prolonged period of time, it may be inferred that the POP display was not deployed on a timely basis.

In some embodiments, data collected from sensors 116 and/or customer device 118 (and/or other sources) that is stored in information 130 on server 126, shown in FIG. 1, may be used for historical analysis of the performance of POP display 102. In some embodiments, the historical analysis data is correlated with saved data from wireless beacon 114 to further gauge customer engagement. For example, combining information about dwell time with the fact of whether the potential customer made a pull request may be used to gauge customer engagement. In some embodiments, the historical data is correlated with third party data (e.g., retailer data such as purchase history, etc.). Correlating the historical data with third party data may provide further information useful to the retailer to enhance a customer's experience.

In some embodiments, various statistical analyses are utilized on historical data collected from POP display 102. Statistical analyses that may be used include, but are not limited to, machine learning and data mining techniques, set theory, multivariate statistics, and time series analyses. Examples of machine learning include deep learning, neural networks, support vector machines, random forests, decision tree learning, association rule learning, inductive logic, clustering, Bayesian networks, reinforcement learning, representation learning, similarity and metric learning, sparse dictionary learning, and genetic algorithms. Examples of data mining, which is often coextensive with machine learning, include spatial data mining, temporal data mining, senor data mining, pattern mining, and subject-based data mining. In some embodiments, these techniques are used for aspects besides historical analysis. For example, smoothing techniques associated with some types of temporal data mining may be used to filter a series of RSSI signal strength values used in bump detection disclosed herein.

Figure 16A:
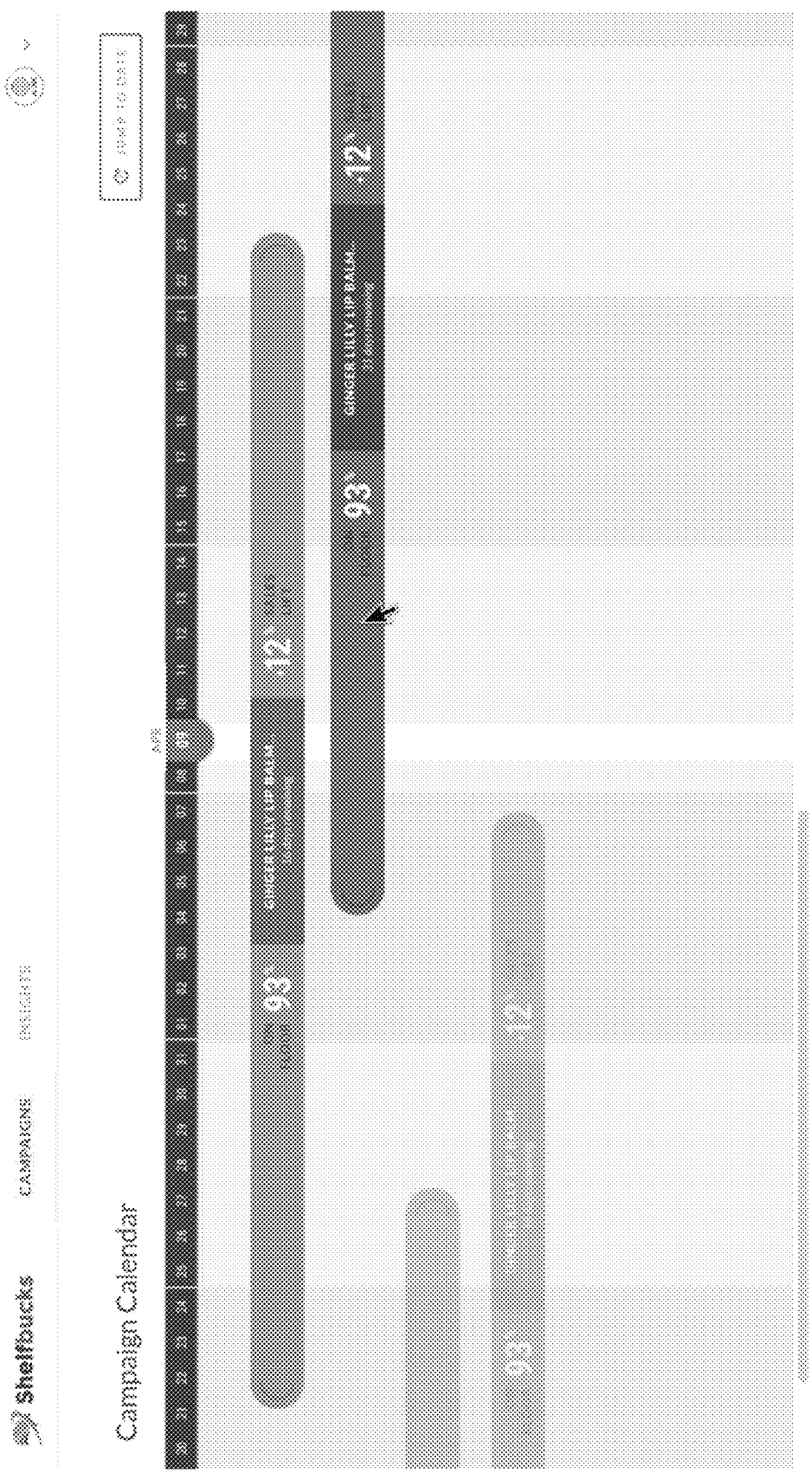
FIG. 16A illustrates an example of a campaign calendar.
Figure 16B:
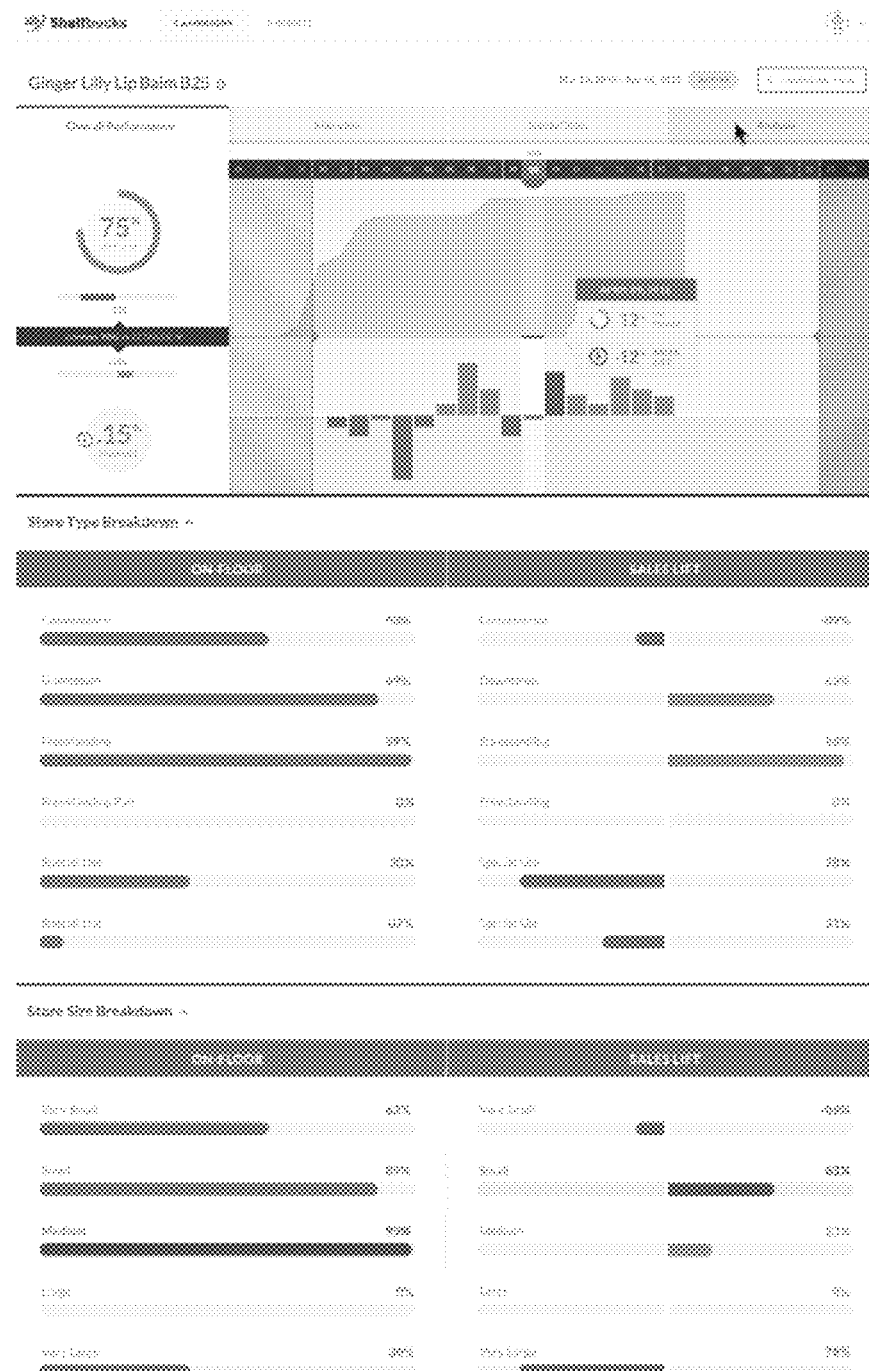
FIG. 16B illustrates an example of an interface displaying various statistics related to POP display deployment and sales.
Figure 16C:
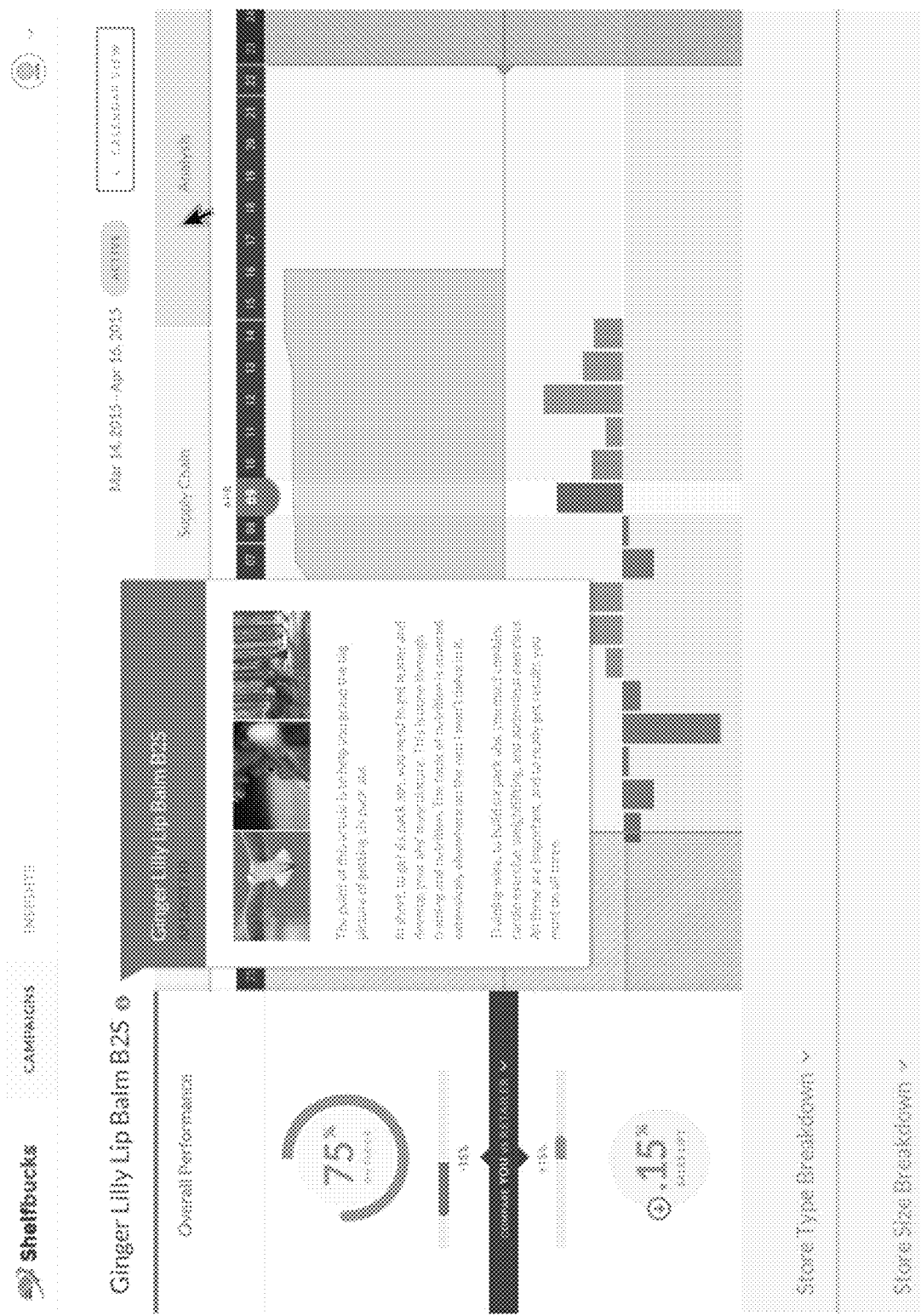
FIG. 16C illustrates an information screen related to the product associated with the POP display.
Figure 16D:
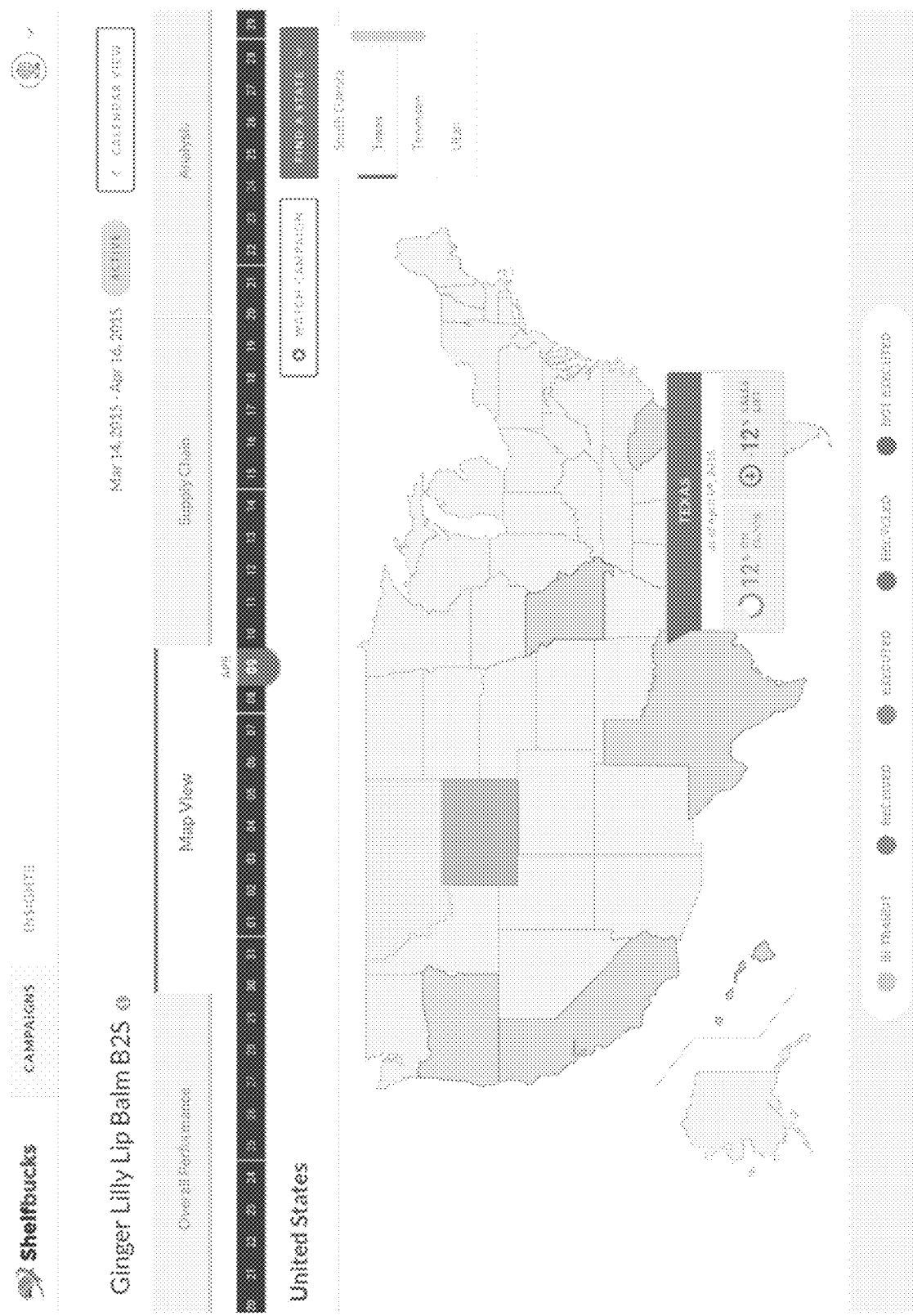
FIG. 16D illustrates an interface displaying national deployment information for POP displays.
Figure 16E:
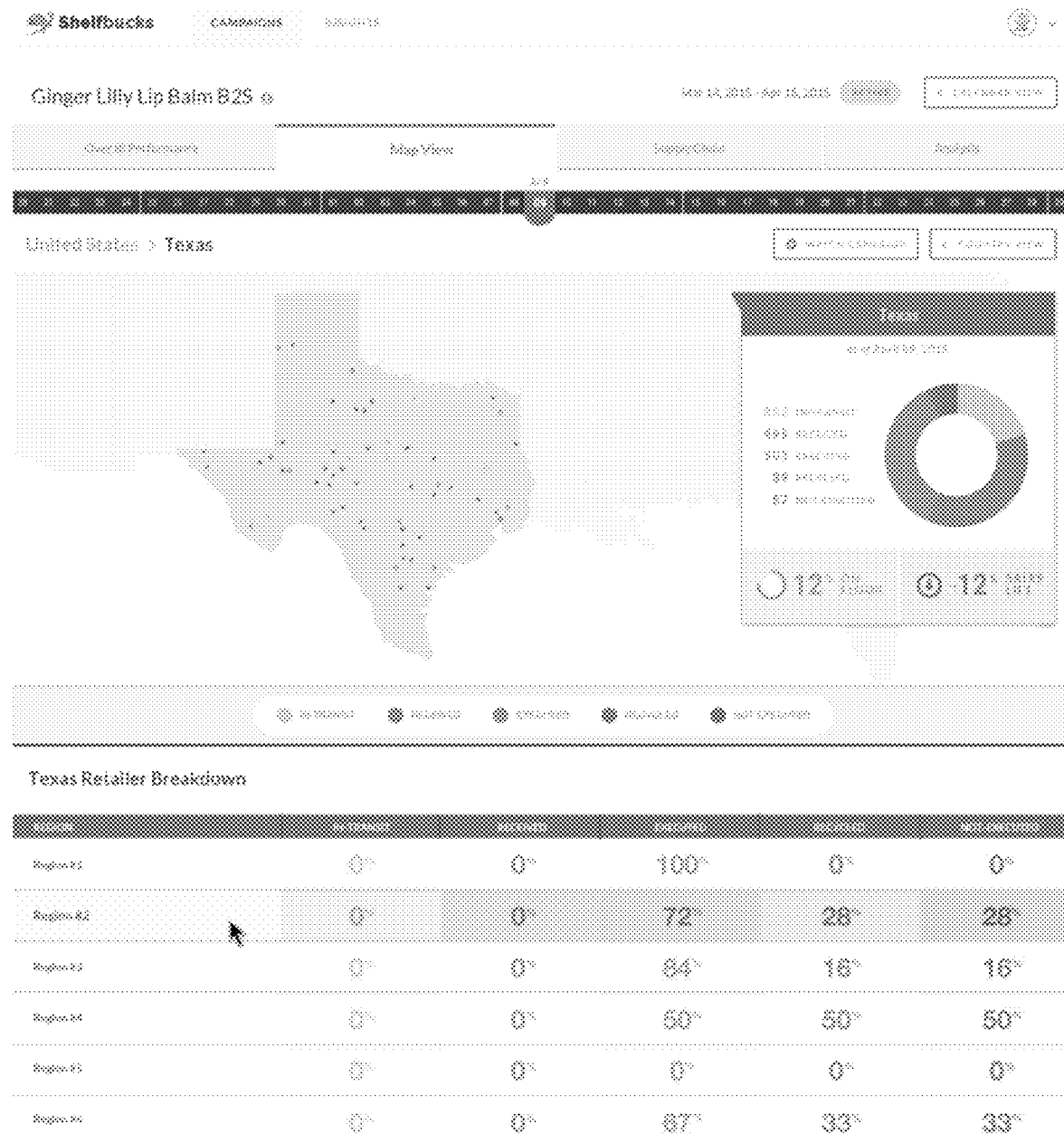
FIG. 16E illustrates an interface displaying state deployment information for POP displays.
Figure 16F:
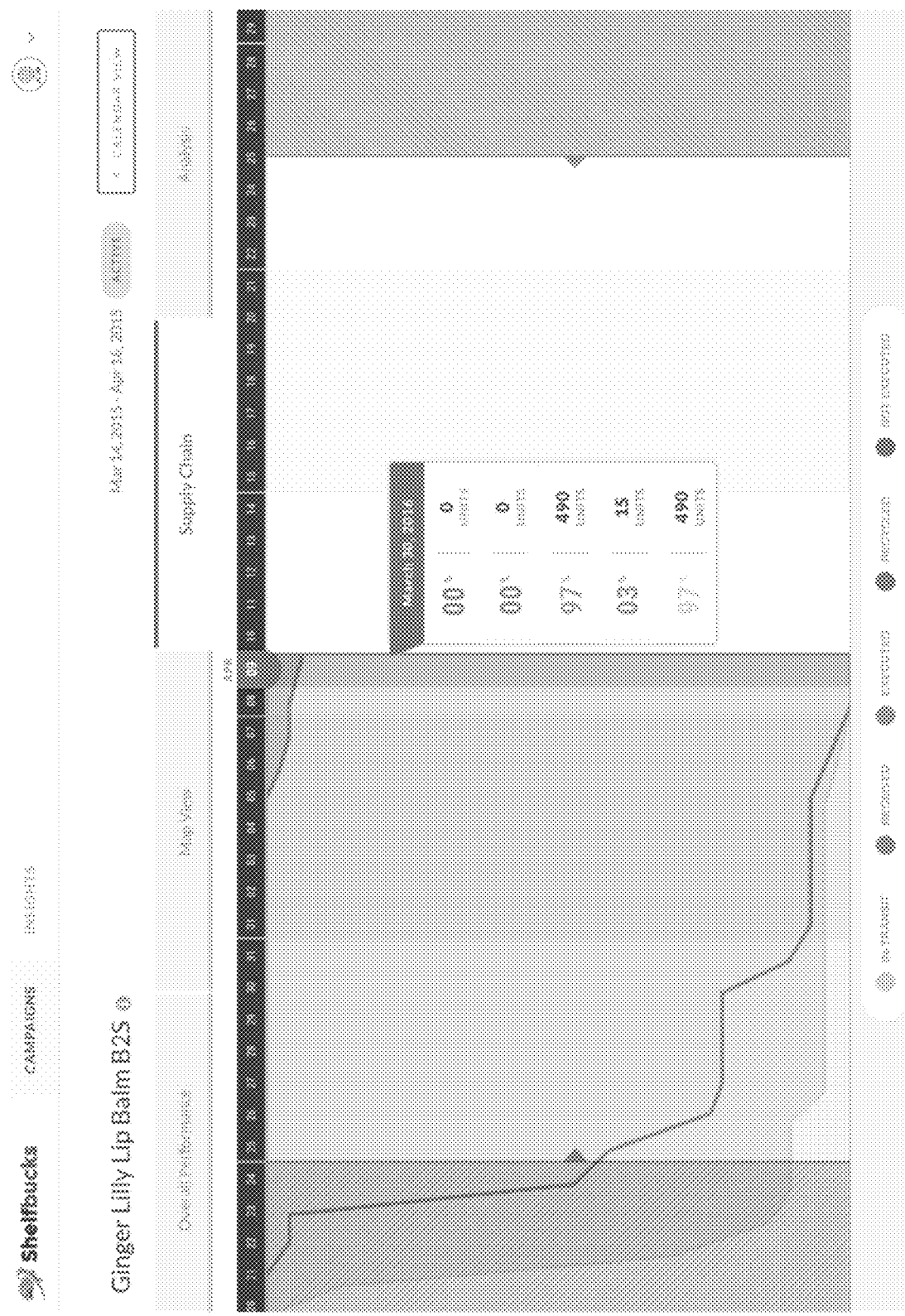
FIG. 16F illustrates an interface displaying supply chain information.
Figure 16G:
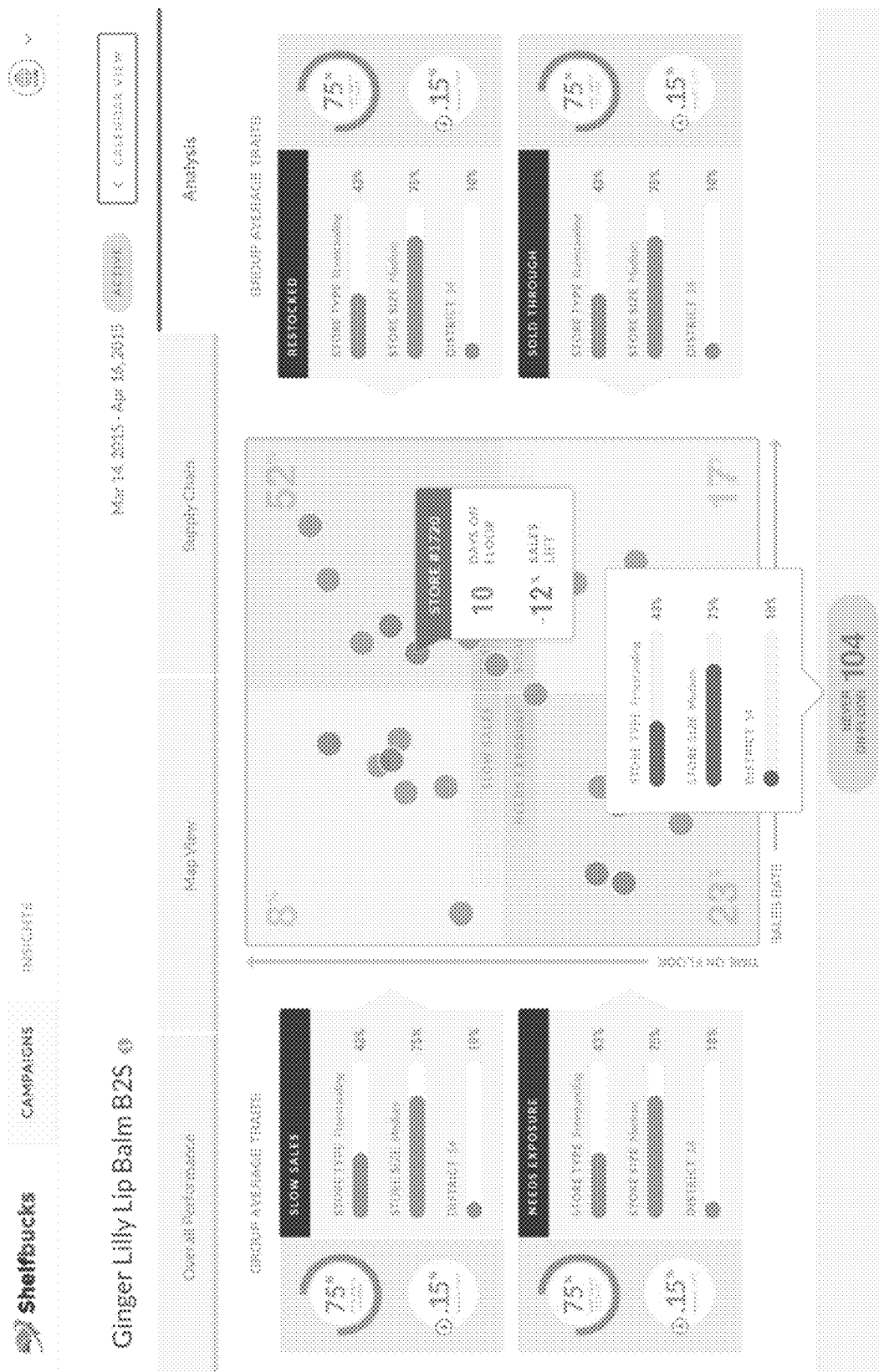
FIG. 16G illustrates an interface displaying a sales analysis associated with the POP display.

Examples of different types of data that may be collected and analyzed for POP displays 102 are illustrated in FIGS. 16A-16G. FIG. 11A illustrates an example of a campaign calendar. FIG. 16B illustrates an example of an interface displaying various statistics related to POP display deployment and sales. FIG. 16C illustrates an information screen related to the product associated with the POP display. FIG. 16D illustrates an interface displaying national deployment information for POP displays. FIG. 16E illustrates an interface displaying state deployment information for POP displays. FIG. 16F illustrates an interface displaying supply chain information. FIG. 16G illustrates an interface displaying a sales analysis associated with the POP display.

In some embodiments, POP display 102 includes components or devices that reduce the surrounding infrastructure requirements for supporting the POP display. Specifically, POP display 102 may be equipped with wireless transmission functionality to transmit any recorded measurements or information derived therein as described above. This information may be transmitted to a network gateway and/or a data collection device (e.g., network gateway 710 and/or data collection device 711, shown in FIG. 3) located within or near the store (e.g., retail location 200, shown in FIG. 3). In certain embodiments, instead of a network gateway, an employee of the retailer or a POP display service provider may be equipped with a mobile device that contains an application adapted to connect to POP display 102 and retrieve data from the point of purchase display to be relayed to a server. This connection may be accomplished utilizing the same wireless connection that is used for beacon functionality, or may be conducted by other standard wireless transmission protocols as described herein, e.g., IEEE 802.11. This minimizes the need for wireless transmission infrastructure to support the retrieval of information collected by the point of purchase displays.

In some embodiments, POP display system 100 utilizes the application already installed on a potential customer's mobile device (e.g., software package 122 on customer device 118) to relay the collected information to a server (e.g., server 126). As shown in FIG. 1, POP display 102 may connect with customer device 118 via the same wireless connection that enables beacon functionality (e.g., Bluetooth connection between wireless beacon 114 and wireless transceiver 120A) and deliver the data to the customer device. Customer device 118 may then transmit the data to server 126 via wireless transceiver 120B or another wireless transceiver. Since transmission through customer device 118 may incur a data charge on the customer, the application may be configured to prompt the user for permission to do so. In some embodiments, the application may offer the user some form of compensation for the use of their data connection. For example, a discount on some good or service in the store. In this way, data can be moved to server 126 by users who are normally just walking around the store and requires no special infrastructure. Additionally, the data to be transmitted may be compressed using standard techniques to minimize the amount of bandwidth consumed, and the application (e.g., the SDK) may be configured to, under certain cases, delay the transfer of data over the mobile device's wireless network connection to the server if the network connection is not over WiFi and/or the mobile device is not connected to an external power source. In other words, the mobile device may be directed to save the data and wait until the customer is connected to a wireless network where transmission of the data will not adversely impact the customer's wireless data plan or the mobile device's battery life.

In some embodiments, wireless beacon 114 may be attached to a high-value or high-interest product. In such cases, wireless beacon 114 may be used to know/track when the product has been moved or removed within or beyond the store. Tracking movement of the product may be useful for inventory control or theft monitoring. For example, if movement is detected, the server could note the date and time of movement in order to review security camera video of the event.

In certain embodiments, POP display system 100, shown in FIG. 1, includes one or more security protocols. The security protocols may be used to provide secure customer interaction and/or customer engagement with POP display system 100, and/or to control access to customer interactions and/or customer engagement with the POP display system. The security protocols may be used to provide security for a retailer associated with POP display system 100.

In certain embodiments, the security protocols are included in SDK 125 located in software package 122 on customer device 118, as shown in FIG. 1. In some embodiments, the security protocols are included in software or hardware on network gateway 710. The security protocols may include protocols for providing a geofence around one or more retail locations. For example, a list of acceptable locations for interaction between customer device 118 and POP display system 100 may be stored in memory cache 124 on the customer device. In some embodiments, SDK 125 provides the list of acceptable locations into memory cache 124. Acceptable locations may include, but not be limited to, geographic zones around retail locations associated with a selected campaign for a selected retailer (e.g., a perimeter around a retail location).

Figure 17:
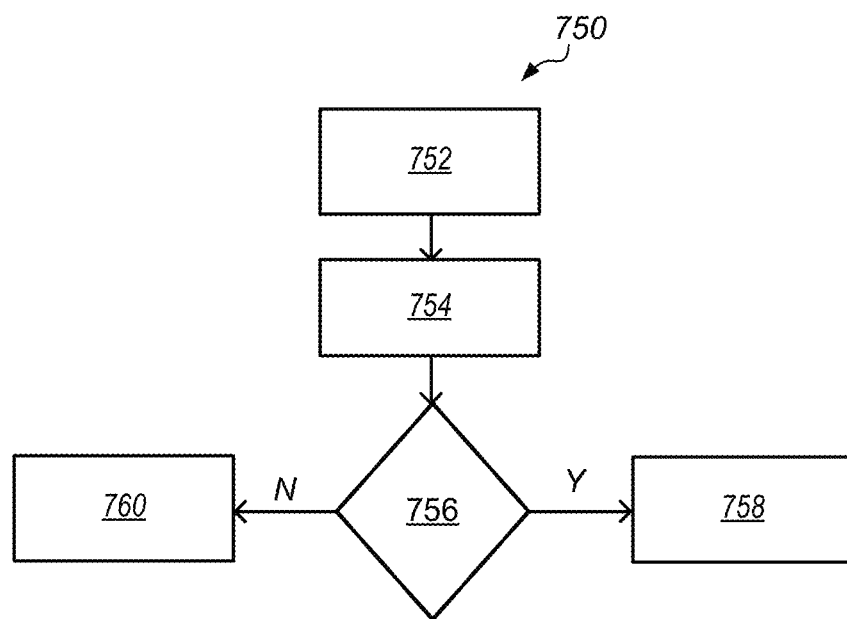
FIG. 17 depicts a flowchart of an embodiment of a geofence protocol process.

FIG. 17 depicts a flowchart of an embodiment of a geofence protocol process. In certain embodiments, geofence protocol process 750 begins when customer device 118 receives packet 700 from POP display 102 in 752. In 754, SDK 125 may assess a geographic location of the customer device (e.g., a GPS location of the customer device) and/or location information about the customer device. In 756, SDK 125 may determine if the geographic location (or a location determined from the location information) of customer device 118 is in the list of acceptable locations. SDK 125 may access the list of acceptable locations from memory cache 124 in order to determine if the geographic location of the customer device is in the list of acceptable locations. If SDK 125 determines that customer device 118 is at a geographic location in the list of acceptable locations ("Y"), then interaction between the customer device and POP display system 100 may be allowed in 758 (e.g., customer interaction and/or customer engagement with the POP display system is allowed). If SDK 125 determines that customer device 118 is at a geographic location that is not in the list of acceptable locations ("N"), then interaction between the customer device and POP display system 100 would be prevented in 760. In some embodiments, interaction between customer device 118 and POP display system 100 may be throttled or limited (e.g., only limited interaction for selected content is allowed) in 760.

In some embodiments, a list of locations where interaction between customer device 118 and POP display system 100 is not acceptable may be stored in memory cache 124 on the customer device. For example, a list of countries that are not acceptable for customer interaction and/or customer engagement may be stored in memory cache 124. Such countries may include, for example, countries where a retailer associated with POP display system 100 does not do business.

Mobile application 127, as described herein, may be located in software package 122 on customer device 118, as shown in FIG. 1. Mobile application 127 may be, for example, a retailer "app" such as a customer loyalty app specific for a selected retailer. In certain embodiments, mobile application 127 includes security protocols for customer interaction and/or customer engagement with POP display system 100.

Mobile application 127 may include one or more protocols for signing (logging) in a user of the mobile application (e.g., for signing in the customer to the mobile application). In certain embodiments, when customer device 118 receives packet 700 from POP display 102, SDK 125 directs mobile application 127 to request a digitally signed payload from the retail server (e.g., the remote server for the mobile application or loyalty app) that is logged into the mobile application. The signed payload may be based on the user that is logged into mobile application 127. If the user is logged into mobile application 127, the signed payload may be received by customer device 118 and utilized by SDK 125.

In certain embodiments, SDK 125 sends the signed payload along with a request for up-to-date data (e.g., content) from server 126. The signed payload may be used by server 126 to authenticate and/or validate the request for the up-to-date data. Using the signed payload to authenticate and/or validate the request may provide security for interactions between customer device 118 and POP display system 100 involving mobile application 127. Additionally, the retail server may assess the number of requests being made for a selected signed payload (e.g., requests are being made by a user with the selected signed payload). The retail server may direct server 126 to throttle or limit content requests for the user with the selected signed payload if it is determined that the user is abusing or overusing POP display system 100 for a specific retailer.

Merchandise displays (e.g., POP displays) and/or other product merchandising materials may often be designed and/or created to be assembled and placed in a consolidated space in a retail location. An example of displays and products in the consolidated space may be a box containing a number of beauty products designed to sit on a retailer's end cap. A header card may be used to highlight that the product represents the latest seasonal shade of colors. A separate side panel may highlight a mix of products available for each shade. Another separate adjoining panel may highlight that a coupon is available for items contained on the display. Retailers may, however, often omit one or more of these elements (e.g., panels) due to the lack of space, lack of time, or lack of awareness of their criticality to sales of the product. Thus, it may be useful to assess the proximal presence of one or more of the elements used for promotion associated with a selected campaign, where the selected campaign includes two or more elements as described above.

As described herein, wireless beacons 114 may be used in POP displays 102 to interact with customers and provide content to the customers on customer devices 118. The content provided may be particular to the selected campaign as determined by the product manufacturer and/or the retailer. Additionally, wireless beacons 114 in POP displays 102, along with other components associated with the wireless beacons on the POP displays, provides data collection, activity and/or environment assessment using sensors, simplified portable battery supply, and intermittent broadcasting to extend battery life.

In certain embodiments, product merchandising materials associated with POP display 102 (e.g., the elements used for promotion described above) include additional identification tags. For example, the product merchandising materials may include passive EPC (Electronic Product Code) tags. POP display 102 may include an EPC radio capable of assessing the EPC tags in proximity to POP display 102. The EPC radio may, for example, broadcast a wireless signal that reflects from the tags and is received by the radio, indicating the presence of the tags (and product merchandising materials) near the radio. In some embodiments, the EPC radio is intermittently used to assess the EPC tags in proximity to POP display 102. Intermittent use of the EPC radio may reduce battery usage with the EPC radio and thus, increase efficiency in using the EPC radio. Additionally, the product merchandising materials are likely to not move frequently relative to POP display 102, so intermittent assessment (e.g., 1-3 times per day) of the EPC tags may be suitable for certain embodiments.

In some locations, it may be possible for EPC tags not associated with POP display 102 to be within a range of the EPC radio (a typical range being about 25 feet). Thus, in some embodiments, power for the EPC radio may be throttled from high to medium to low to further assess which EPC tags are proximal or on POP display 102 compared to other EPC tags that are randomly in the vicinity of the POP display. In some embodiments, additional EPC tags may be placed on products that are placed on POP display 102. EPC tags on the products may be used, for example, to assess inventory of products on POP display 102.

In certain embodiments, the EPC radio broadcasts a signal in a range of 902 MHz to 928 MHz. In some embodiments, the EPC radio is included in a single chip or a chip set associated with wireless beacon 114. For example, the EPC radio may be part of a sub-gig radio, as described herein. In some embodiments, the sub-gig radio may be used as the EPC radio (depending on the frequencies required).

In certain embodiments, two or more POP displays 102 (and their wireless beacons 114) are used for testing (e.g., assessing) the usefulness of different customer interaction experiences. For example, multiple POP displays 102 may be used to conduct A/B (or split) testing of different customer interactions. In such embodiments, a first POP display 102 (or a first set of POP displays) is configured to provide a first customer (consumer) interaction experience to one or more customers. The first customer interaction experience may include, for example, displaying certain content on display 119 of customer device 118 in response to the customer device receiving data packets from wireless beacons 114 on the first POP display 102. The content displayed may be controlled based on, for example, the unique identifier of wireless beacon 114 on the first POP display 102. In embodiments using a first set of POP displays, the content displayed may be controlled based on unique identifiers for wireless beacons associated with the first set of POP displays.

For comparative testing (e.g., A/B or split testing), a second POP display 102 (or a second set of POP displays) may be configured to provide a second customer interaction experience to the customers. The second customer interaction experience may include displaying different content on display 119 of customer device 118 than the first customer interaction experience. Similar to the first POP displays 102, the content displayed for interaction with the second POP displays 102 may be controlled using the unique identifiers for the second POP displays.

In certain embodiments, the customers' or users' interactions with the content displayed in both the first customer interaction experience and the second customer interaction experience are assessed as the interactions take place. Assessing the customers' interactions with the content displayed may include, for example, assessing the customers' responses to questions, the customers' clicking of hyperlinks, the customers' access of coupons or other promotions related to the product displayed, and/or the customers' interface with other on-screen prompts. Assessing the customers' interactions may also include, but not be limited to, assessing movement of customers in response to receiving content, dwell times of customers after receiving content, removal of products from the POP display by the customer, and purchase of products associated with the POP display.

Comparison of the customers' interactions with the content displayed in the first customer interaction experience with the customers' interactions with the content displayed in the second customer interaction experience may provide an assessment of the comparative effectiveness of the different customer interaction experiences. In some embodiments, one or more of the customer interaction experiences may be dynamically altered during testing. For example, a customer interaction experience (e.g., the content displayed) may be altered during testing if the currently displayed content is proving to be ineffective in generating interest in the product. Dynamically altering the interaction experience may provide additional information relating to the effectiveness of different interaction experiences on a single POP display or a single set of POP displays.

In some embodiments, customer devices 118 (e.g., mobile devices such as smartphones) can act as wireless beacons. Each smartphone may have a unique identifier that is included in its BLE advertising packet. The unique identifier is most often used for pairing the device with another BLE device. The smartphone's properties as a beacon, however, may be exploited without the smartphone being paired or connected with BLE listening devices.

In one embodiment, a BLE listening device is installed in one or more locations throughout a retail store or public location, such as a mall, store window, or a lobby. This BLE listening capability (or device) may be embedded within a network gateway or data collection device, or it could be independent of those devices. A video screen or other media messaging device may be placed in one or more locations. There may be multiple messages intended to be conveyed through the media device that may vary depending on the presence, number, and/or proximity of smartphones nearby. When people "opt in" to use their personal information or preferences to tailor information content, additional message options may be served through the media device.

The advantages of using a non-phone video screen or media messaging device may revolve around consumer reach and ease of use. With a messaging device, consumers don't need to have their smartphones handy to receive content. A specific phone app or SDK may not be necessary for customers to trigger and receive information. A larger screen can convey more information and/or clearer graphics than a smartphone screen. "After-hours", such devices may also be used to provide store personnel with a task list or section stocking instructions.

Examples of uses of a non-phone video screen or media messaging device include, but are not limited to, the following:

The media device could indicate that specific deli orders, photo printing, or prescriptions are available for pickup when a customer is proximal to the media device.

The media device's message may be triggered and tailored when X or more people are proximal. The message content may further be tailored through a server when Y people of a specific age group, sex, or interest set are present, provided they opt-in to utilizing their smartphone ID's to be associated with such messages (e.g., information about blood pressure monitoring for seniors, baby products for new parents, gluten-free products for people with food sensitivities).

The media device may display an introductory message of interest to a number of people, then "hand-off" specific offers or additional interactive messages to specific smartphones to ensure customer privacy or responsiveness to unique interests.

The media device could simultaneously collect data regarding traffic counts, proximity, and dwell time.

As described herein, large sets of POP displays are often sent from the display manufacturers to distribution centers or warehouses (e.g., "co-packers") for storage before being sent to their intended retail locations. At one or more of these distribution centers, the POP displays may be combined with retail products before being sent out for use at the retail locations. In certain embodiments, as described herein, wireless beacons may be attached to the POP displays while the displays are located at the distribution center or at a co-packer. In some embodiments, the wireless beacons are attached to the POP displays just prior to the displays being sent out to their intended retail locations. For example, the wireless beacons may be attached to the POP displays just before or during the pack-out process for the displays and retail products.

In embodiments where the wireless beacons are attached to the POP displays at the distribution center (or another intermediate location between the manufacturer and the final retail location), it may be important that each wireless beacon's unique identifier is properly associated with the selected campaign for the POP displays. In some embodiments, wireless beacons are programmed (including programming of unique identifier) and the unique identifier is paired with the selected campaign just before the wireless beacons are sent to the distribution center (e.g., co-packer) to be attached to the POP displays.

Such a programming and attachment process for the wireless beacons may, however, incur certain problems. For example, the wireless beacons may be applied to the wrong marketing materials (e.g., attached to the wrong POP displays). Additionally, it can be costly to pair each unique identifier to the selected campaign before the wireless beacon is attached to the POP display and/or it can be difficult to timely ship the wireless beacons prior to pack-out dates, which are often uncertain dates. Battery life may also be limited, and prematurely turning on the wireless beacons shortens the economic life of the wireless beacons. To overcome some of these problems, techniques for ensuring wireless beacons are properly associated with the selected campaign and attached to POP displays for the selected campaign may be utilized. Additionally, some techniques that reduce costs associated with shipping and last-minute preparation of wireless beacons may be used.

In certain embodiments, printable circuits are used in combination with POP displays and wireless beacons to improve the process for properly associating wireless beacons with POP displays and marketing campaigns. "Printable circuits", as described herein, may include electronics that are printed on a surface (e.g., components printed using a printer) that are coupled together to form an electronic circuit. Printable circuits and/or components may be printed using techniques known in the art (e.g., inkjet printing or screen printing). Examples of printable components in printable circuits include, but are not limited to, passive components (e.g., resistors and capacitors) and active components (e.g., field effect transistors). In some embodiments, printed batteries are used in combination with or in addition to printable circuits. Printed batteries may be printed using more complex techniques than other printable components.

In some embodiments, some portion of a printable wireless beacon circuit is printed at the time the corrugate cardboard (or other display material) is printed with a marketing message. For example, a brand-specific logo and/or promotional message associated with a specific "campaign" may be printed. The identification (e.g., identification number) of the campaign may be encoded in a circuit printed at the same time as the brand-specific logo and/or promotional message. The circuit encoded with the campaign identification may subsequently be mated with a circuit containing an identification that is unique to each display associated with the campaign. In some embodiments, an activation date may also be encoded in the printable circuit at that time. In some embodiments, the additional identification information is contained in the form of an adhesive "patch" that may be attached to the display manually, or placed in a precise location through machine application.

Figure 18:
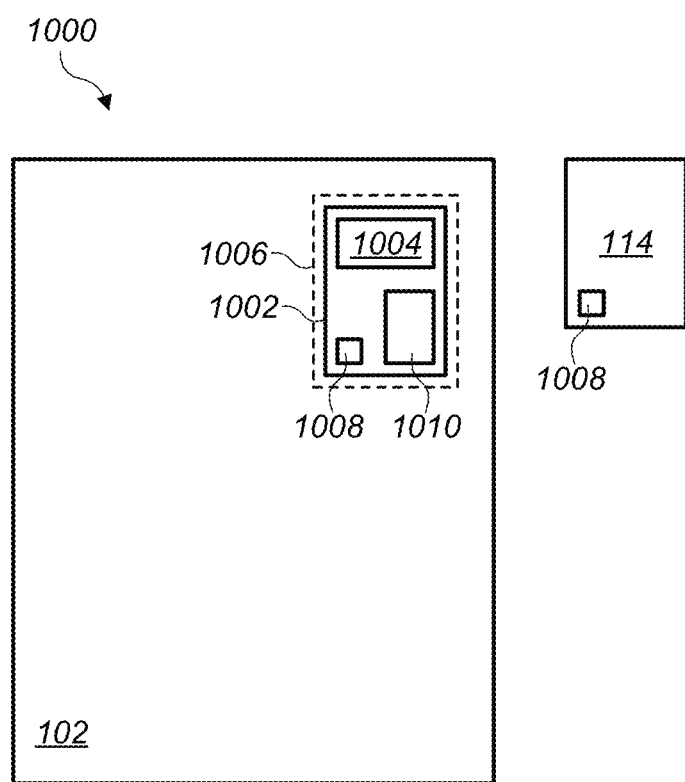
FIG. 18 depicts a representation of an embodiment of a POP display system utilizing printable circuits.

FIG. 18 depicts a representation of an embodiment of a POP display system utilizing printable circuits. System 1000 includes POP display 102 and wireless beacon 114. In certain embodiments, system 1000 includes printable circuit 1002 on POP display 102. In some embodiments, printable circuit 1002 is attached (or otherwise coupled) to POP display 102. In other embodiments, printable circuit 1002 is formed as a part of POP display 102. For example, printable circuit 1002 may be printed directly on material used for POP display 102 along with signs, graphics, or other marketing materials printed on the POP display.

Printable circuit 1002 may be used in combination with or instead of microchips or other electronic circuit components normally mounted on a conductive board (e.g., a circuit board). In certain embodiments, printable circuit 1002 is printed using conductive or electronic inks. Inks used for printable circuit 1002 may include, but not be limited to, functional inks based on organic substances, polymers, nanoparticles, or thin-film semiconductors. Such functional inks have been developed for manufacturing flexible electronics that have contributed to the development of antennas, transistors, solar cells, radio frequency identification (RFID), flexible displays, electronic clothes, sensors, etc. In some embodiments, printable circuit 1002 is made of flexible substrate materials. For example, paper may be used as the substrate material. Paper may be used as the substrate material due to its accessibility, low cost, foldability, disposability, retrievability, and low or negligible pollution. In some embodiments, printable circuit 1002 includes organic printable components. For example, printable circuit 1002 may include an organic field effect transistor. Inorganic printable components may also be used for one or more printable components.

In certain embodiments, printable circuit 1002 includes printed data 1004. Printed data 1004 may be, for example, data printed on the surface used for printable circuit 1002. Printed data 1004 may include data or information associated with a selected campaign (e.g., a selected retail campaign) for POP display 102. In some embodiments, printed data 1004 includes one or more parameters for the selected campaign. The parameters for the selected campaign in printed data 1004 may include configuration parameters or other information relevant to the selected campaign.

In certain embodiments, at least one parameter included in printed data 1004 is a unique identifier for wireless beacon 114. Thus, as disclosed herein, wireless beacon 114 may receive and be assigned the unique identifier from printed data 1004 when the wireless beacon is attached to POP display 102. The unique identifier for wireless beacon 114 included in printed data 1004 may be associated with or assigned to the selected campaign for POP display 102. For example, server 126, shown in FIG. 1, may associate the unique identifier in printed data 1004 with the selected campaign for POP display 102. In certain embodiments, the unique identifier in printed data 1004 is associated/assigned to the selected campaign before printing the printed data on POP display 102. Examples of other parameters that may be included in printed data 1004 include, but are not limited to, activation date of the selected campaign, campaign identification information, and retailer information.

In certain embodiments, wireless beacon 114 in system 1000 does not include any programming or configuration information associated with the selected campaign before being attached to POP display 102. For example, wireless beacon 114 may include pre-flashed chips with code for operation as a wireless beacon without any additional programming or configuration information. In certain embodiments, the pre-flashed code for wireless beacon 114 includes instructions for receiving printed data 1004 when the wireless beacon is attached to POP display 102. The instructions may, for example, be stored in a memory of wireless beacon 114.

Figure 19:
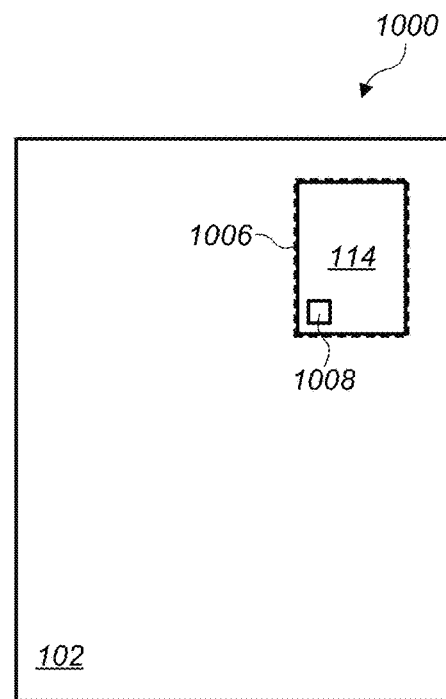
FIG. 19 depicts a representation of an embodiment of a system with a wireless beacon properly attached to a POP display.

In certain embodiments, wireless beacon 114 is attached to POP display 102 at or near the location of printable circuit 1002. For example, wireless beacon 114 may be attached to POP display 102 along dashed lines 1006 surrounding printable circuit 1002, shown in FIG. 18. Dashed lines 1006 may represent a location for proper attachment of wireless beacon 114 to POP display 102. FIG. 19 depicts a representation of an embodiment of system 1000 with wireless beacon 114 properly attached to POP display 102 along dashed lines 1006. When wireless beacon 114 is properly attached to printable circuit 1002 on POP display 102, as shown in FIG. 19, the wireless beacon is able to access and receive printed data 1004 in the printable circuit.

In some embodiments, illumination indicator 1008 provides indication that wireless beacon 114 has been properly attached to printable circuit 1002. Illumination indicator 1008 may be, for example, an LED or other illuminator that is triggered on when proper connection is made between wireless beacon 114 and printable circuit 1002. In some embodiments, illumination indicator 1008 is located on wireless beacon 114. In some embodiments, illumination indicator 1008 is included in printable circuit 1002 (e.g., is a component of the printable circuit), as shown in FIG. 18.

Once wireless beacon 114 is properly attached to printable circuit 1002 on POP display 102, as shown in FIG. 19, the wireless beacon may receive printed data 1004 from the printable circuit. Printed data 1004 may include configuration parameters for the wireless beacon such as the unique identifier for wireless beacon 114 and an activation date for the selected campaign. After receiving printed data 1004, wireless beacon 114 may enter a low power mode (e.g., a sleep or non-broadcasting mode) until the activation date for the selected campaign or another active mode is begun as described herein.

In some embodiments, wireless beacon 114 is powered on before being attached to printable circuit 1002 on POP display 102. Wireless beacon 114 may be powered on before being attached if the wireless beacon includes a battery on the wireless beacon. In some embodiments, wireless beacon 114 is powered on when the wireless beacon is attached to printable circuit 1002 on POP display 102. For example, a switch or other trigger device on POP display 102 may turn on wireless beacon 114 as the wireless beacon is attached to the POP display. In some embodiments, wireless beacon 114 does not include a battery (e.g., the wireless beacon is unpowered before being attached to POP display 102). In such embodiments, power for wireless beacon 114 may be provided by a battery located on POP display 102. The battery may be coupled to wireless beacon 114 through printable circuit 1002. In certain embodiments, printable circuit 1002 includes printed battery 1010. Printed battery 1010 may provide power to wireless beacon 114 when the wireless beacon is attached to printable circuit 1002. In some embodiments, printed battery 1010 may include two or more printed batteries.

As described above, pre-flashed wireless beacon 114 may be attached to POP display 102 at a distribution center (e.g., a co-packer) with the wireless beacon 114 receiving parameters associated with the selected campaign from printed data 1004 on the POP display. As wireless beacon 114 is sent to the distribution center in the pre-flashed state, the wireless beacon does not need to be pre-programmed or configured for the selected campaign before it is sent to the distribution center. Thus, a plurality of wireless beacons 114, all having the same pre-flashed code without specific configuration parameters, may be sent to multiple distribution centers without logistical concerns about exactly which wireless beacon is sent where because the wireless beacons will receive their configuration parameters (e.g., "obtain their identity") when attached to printable circuits 1002 on POP displays 102.

Figure 20:
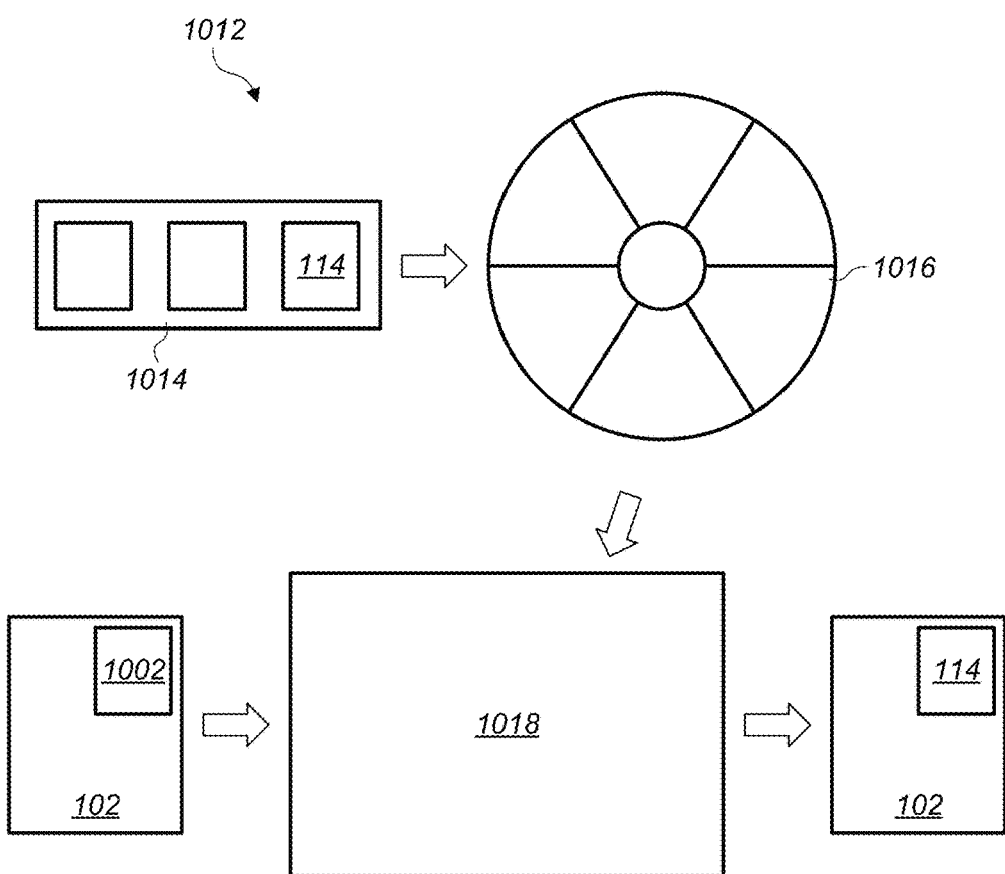
FIG. 20 depicts a representation of an embodiment of reel/tray based system for attaching wireless beacons to printable circuits on POP displays.

In some embodiments, a reel and tray/tape based system is used to attach wireless beacons 114 to printable circuits 1002 on POP displays 102. FIG. 20 depicts a representation of an embodiment of reel/tray based system 1012 for attaching wireless beacons 114 to printable circuits 1002 on POP displays 102. Wireless beacons 114 may be placed on trays 1014. Trays 1014 may be similar to trays and/or tape used for surface mount integrated circuit components. In some embodiments, trays 1014 are fed onto reels 1016. Reels 1016, with trays 1014 and wireless beacons 114 wound onto the reels, may be transported to a distribution center (e.g., a co-packer).

At the distribution center (or other location for attaching wireless beacons 114 to POP displays 102), reels 1016 may be placed into apparatus 1018. Apparatus 1018 may be used to attach wireless beacons 114 to POP displays 102 with printable circuits 1002. Apparatus 1018 may be designed similar to apparatus for surface mounting integrated circuit components such that wireless beacons 114 are properly located on printable circuits 1002 on POP displays 102 (e.g., the wireless beacons are properly attached to the printable circuits to receive printed data).

Tracking and accountability of shipments of prescription pharmaceuticals is important for both economic and regulatory considerations. From an economical perspective, it is important to prevent theft and/or unintended loss of prescription pharmaceutical products, many of which are relatively expensive. Regulations, meanwhile, typically require that all reasonable efforts be made to ensure that the number of loss incidents be minimized and that maximum effort be made to recover and/or determine the source of any product losses. This may be especially true for controlled substances such as narcotics, sleeping pills, or pseudoephedrine. It is also desirable to consider additional accountability measures when losses become problematic.

Figure 24:
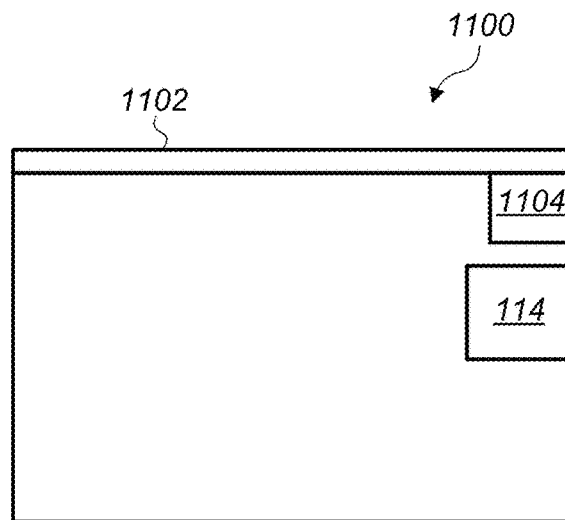
FIG. 24 depicts an embodiment of a product tote.

Prescription pharmaceutical products and/or other high-value, tightly-controlled products are often shipped in reusable totes or similar shipping containers. An embodiment of a tote is shown in FIG. 24. Tote 1100 may be a plastic tote or a tote made from another suitable reusable material. In certain embodiments, tote 1100 is a shipping container for prescription pharmaceutical products. Tote 1100 may also be a shipping container for other products such as other high-value, tightly-controlled products. For example, tote 1100 may be a shipping container for products that need to be grouped in some way for shipment. Tote 1100 may be used to ship prescription pharmaceutical products from one location to another (e.g., from a warehouse to a pharmacy).

In certain embodiments, tote 1100 includes cover 1102 that can be repeatedly opened and closed. Cover 1102 may be, for example, a lid or other structure that opens and closes to provide access to the inside of tote 1100. When contents (e.g., prescription pharmaceutical products) are placed in tote 1100, cover 1102 is sealed using, for example, tamper evident tape, zip ties, crimped bands, or another sealing material that provides notice that the tote has been unsealed or tampered with during transportation. Tote 1100 is supposed to only be opened at its final location (e.g., a pharmacy) by authorized personnel.

Some retailers require that totes be opened in specific areas under surveillance cameras. A typical problem in pharmacies or stock rooms, however, is that security cameras are often only located in consumer areas of the stores (e.g., where consumer shopping takes place) to, for example, prevent shoplifting. Even in pharmacies, cameras are typically dedicated to monitoring purchase transactions. Thus, unpacking of tote 1100 often goes unrecorded. To record unpacking of tote 1100 would require significant infrastructure investment in surveillance cameras and/or additional equipment. The use of wireless beacons and network gateways (and/or data collection devices) may provide a simple, cost effective solution for tracking tote 1100 and the loading/unloading of the tote to provide accountability of products.

In certain embodiments, tote 1100 includes wireless beacon 114 and switch 1104. Wireless beacon 114 may transmit a data packet with the unique identifier for the wireless beacon in a wireless signal. The unique identifier may be associated with tote 1100 and/or the products (e.g., the prescription pharmaceutical products) associated with the tote. Switch 1104 may be a microswitch or another switch that can detect opening/closing of cover 1102. When cover 1102 is opened/closed, switch 1104 may provide a signal to wireless beacon 114 that the cover has been opened/closed.

Wireless beacon 114 normally transmits its wireless signal at a standard (normal) transmittal rate. In certain embodiments, when cover 1102 is closed, wireless beacon 114 increases its transmittal rate to a more rapid transmission rate for a selected amount of time (e.g., the wireless beacon goes from the first (standard) transmittal rate to a second (higher) transmittal rate for the selected amount of time). After the selected amount of time expires, the transmittal rate of wireless beacon 114 goes back to its standard (slower) transmittal rate. Similarly, when cover 1102 is opened, wireless beacon 114 may increase its transmittal rate to the more rapid transmission rate for a selected amount of time. The amount of time for either rapid transmission mode when tote 1100 is opened or closed may be, for example, a selected number of minutes suitable for a network gateway (e.g., network gateway 710) to receive and recognize the unique identifier for wireless beacon 114.

Tote 1100 may be opened or closed in a selected area either at the warehouse or the pharmacy. In certain embodiments, the selected area where the contents of tote 1100 are loaded or unloaded (e.g., the tote is opened or closed) is a workstation provided for a use to load/unload the tote. In certain embodiments, at least one workstation is installed at both loading (e.g., warehouse) and unloading (e.g., pharmacy) locations for the products. Using a workstation at both ends of the transport process may provide a system for confirming both loading and unloading processes of the products and ensuring the loading and unloading processes have minimal exposure to fraud or theft.

Figure 25:
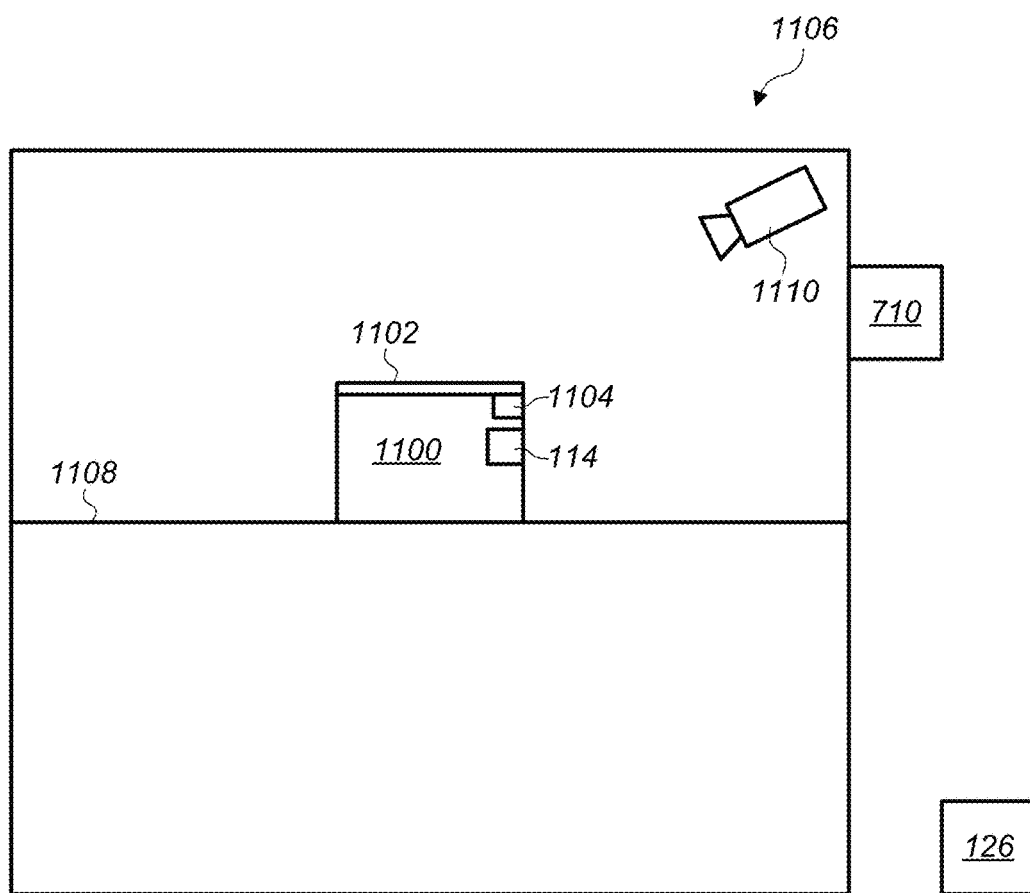
FIG. 25 depicts a representation of an embodiment of a workstation for loading/unloading a tote.

FIG. 25 depicts a representation of an embodiment of workstation 1106 for loading/unloading tote 1100. Workstation 1106 may include shelf 1108 to place tote 1100 on for loading/unloading. In certain embodiments, workstation 1106 includes camera 1110. Camera 1110 may be a video camera but may also be capable of providing multiple still images over a short time frame. Camera 1110 may be a wide-angle camera to enable a large field of view of area around tote 1100. Camera 1110 may be a small, inexpensive camera (e.g., a camera similar in cost and size to a smartphone camera). Camera 1110 may be positioned to simultaneously capture video of tote 1100, the contents of the tote, and a user loading/unloading the tote. In some embodiments, camera 1110 may include two or more cameras positioned around workstation 1106 that simultaneously capture video of the workstation.

Camera 1110 may be coupled to network gateway 710 to provide its video feed to the network gateway. In certain embodiments, network gateway 710 is a wireless network gateway. Network gateway 710 may receive video from camera 1110 either through a wireless connection or a wired connection. In certain embodiments, camera 1110 is always on and providing video feed to network gateway 710. For example, camera 1110 may provide substantially continuous video of workstation 1106 to network gateway 710. Video received by network gateway 710 from camera 1110 may be temporarily stored in a memory of the network gateway. For example, video received by network gateway 710 may be stored in a short-term reusable memory in the network gateway.

In some embodiments, images from camera 1110 are processed through one or more artificial intelligence algorithms to detect and report on the contents of tote 1100. Detecting and reporting on contents of tote 1100 may be used to certify correct or incorrect loading of a tote. Additionally, detecting and reporting on contents of tote 1100 may be used to compare products in the tote at receipt versus products in the tote at the time of pack-out. Such comparisons may aid in the assessment of loss prevention opportunities and/or issues.

In some embodiments, special instructions or notes associated with the shipment are included in a data record associated with images and/or packing/unpacking of tote 1100. These instructions or notes may be generated and/or included from either the pack-out facility or the receiving pharmacy. Additional information associated with a particular shipment record may be generated by automated collectors and/or gateways (e.g., network gateway 710) installed at the originating warehouse, delivery trucks, and/or store entrances or stocking areas.

In certain embodiments, network gateway 710 receives wireless signals from wireless beacon 114 on tote 1100. In some embodiments, network gateway 710 cycles between two different detection modes for receiving wireless signals from wireless beacon 114. In a first mode, network gateway 710 may be relatively insensitive to detecting (e.g., reading) wireless signals from wireless beacon 114. In the first mode, network gateway 710 may only be able to detect (read) wireless beacon 114 when tote 1100 (and thus the wireless beacon) is at or immediately adjacent workstation 1106. In a second mode, network gateway 710 may be a higher sensitivity mode where the network gateway can detect (read) signals from wireless beacon 114 over a greater area (e.g., over an entire store or pharmacy). Through long-distance reads (e.g., detecting signals over a greater area in the second mode), the arrival at the store of a given tote may be noted. Through reads only proximal to the workstation, the arrival of the tote to the pharmacy area may be noted. Through reads immediate to the workstation, the unpacking event may be identified. In some embodiments, network gateway 710 uses only a single detection capability for receiving wireless signals from wireless beacon 114. For example, network gateway 710 may only use a detuned antenna that receives wireless signals from throughout the store/pharmacy.

During normal operation (e.g., when wireless beacon 114 is transmitting at its normal transmittal rate), network gateway 710 receives the substantially continuous video from camera 1110 and temporarily stores a selected amount of video in the network gateway memory. At a loading workstation 1106 (e.g., a workstation at the warehouse), when cover 1102 of tote 1100 is closed after the tote's contents (e.g., prescription pharmaceutical products) are loaded into the tote, wireless beacon 114 begins transmitting at the second (higher) transmittal rate, as described above. Network gateway 710 may recognize the higher transmittal rate as a signal that tote 1100 has been loaded with contents and, in response, the network gateway may associate wireless beacon 114's unique identifier with an order number assigned to the tote's contents.

Additionally, in response to receiving the higher transmittal rate signal from wireless beacon 114, network gateway 710 may transfer a selected amount of video from its temporary memory storage to an event registry in its memory. The selected amount of video may include a selected amount of video (e.g., a selected number of minutes of video) from before the higher transmittal rate signal is received and a selected amount of video subsequent to receiving the higher transmittal rate signal. The event registry may also include time and date information as well as any other relevant information regarding the loading transaction deemed necessary. After the selected amount of video subsequent to receiving the higher transmittal rate signal is recorded into the event registry, network gateway 710 may transmit the data of the event registry to remote server 126. For example, network gateway 710 may transmit the data of the event registry to remote server 126 over a cellular communication network.

Remote server 126 may store the transmitted data in a database. The database may store the transmitted data with reference to any of the information provided in the event registry. For example, the data may be registered according to the assigned order number, the unique identifier for wireless beacon 114, identification information for the user loading the contents, time/date information (e.g., time/date of video recording in event registry), description information of the shipped products, and/or description information for subsets of the shipped products.

At an unloading workstation 1106 (e.g., a workstation at the pharmacy), when cover 1102 of tote 1100 is opened after the tote has been received at the pharmacy and a user begins to unload the contents (e.g., prescription pharmaceutical products), wireless beacon 114 begins to again transmit at the second (higher) transmittal rate, as described above. As wireless beacon 114's unique identifier has already been associated with the order number assigned during loading of the contents, network gateway 710 at the pharmacy may already associate tote 1100 with the assigned order number and the expected contents of the order. In some embodiments, the content information may be provided to the user at the unloading workstation 1106.

In response to receiving the higher transmittal rate signal from wireless beacon 114, network gateway 710 at the pharmacy may transfer a selected amount of video from its temporary memory storage to an event registry in its memory. The selected amount of video may include a selected amount of video (e.g., a selected number of minutes of video) from before opening of tote 1100 and a selected amount of video subsequent to opening the tote. The event registry may also include time and date information as well as any other relevant information regarding the unloading transaction deemed necessary. After the selected amount of video subsequent to opening tote 1100 is recorded into the event registry, network gateway 710 may transmit the data of the event registry to remote server 126.

Remote server 126 may store the transmitted data in its database and associate the transmitted data with the previously stored loading data for the order number. Similar to the loading event storage, the data may be registered according to the assigned order number, the unique identifier for wireless beacon 114, identification information for the user unloading the contents, time/date information, description information of the received products, and/or description information for subsets of the received products. The database now includes data for both loading/unloading of the products for the specific order number. A user may then retrieve video (and other information) associated with the specific order number as needed and be able to review the video to see what went into the tote, who loaded the tote, what came out of the tote, and who unloaded the tote as well as any other relevant information stored in database relevant to the events surrounding loading/unloading of the tote. After information for multiple loading/unloading events is stored in the database, a user may be able to retrieve, sort, and/or process the information for the multiple loading/unloading events as needed to determine, for example, where products are lost, misplaced, or stolen.

In some embodiments, wireless beacon 114 includes a counter. The counter may count the number of times wireless beacon 114 transmits at the second (higher or non-standard) transmittal rate. Thus, the counter may track the number of times tote 1100 is opened and closed. The counter may also store information about the date/time of when wireless beacon 114 transmits at the second transmittal rate. Information from the counter may be transmitted to network gateway 710 (and remote server 126) along with other data regarding the loading/unloading processes. The counter information may be used to compare the number of times tote 1100 is opened/closed versus the number of times the tote is received at workstations 1106 and opened/closed at the workstations. Thus, the counter information may be used to ensure that tote 1100 has not been opened or closed at a location besides workstations 1106.

In certain embodiments, one or more process steps described herein may be performed by one or more processors (e.g., a computer processor) executing instructions stored on a non-transitory computer-readable medium. For example, communication between POP display 102, customer device 118, server 126, and/or network gateway 710, shown in FIG. 1, may have one or more steps performed by one or more processors executing instructions stored as program instructions in a computer readable storage medium (e.g., a non-transitory computer readable storage medium). In certain embodiments, controller 112, on POP display 102, software package 125, on customer device 118, server 126, and/or network gateway 710 include program instructions in the computer readable storage medium.

Figure 26:
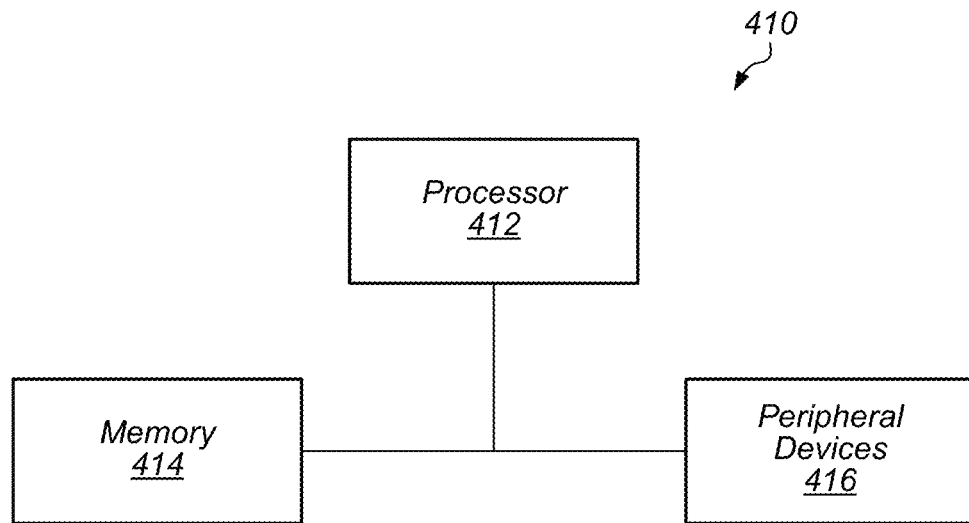
FIG. 26 depicts a block diagram of one embodiment of an exemplary computer system.

FIG. 26 depicts a block diagram of one embodiment of exemplary computer system 410. Exemplary computer system 410 may be used to implement one or more embodiments described herein. In some embodiments, computer system 410 is operable by a user to implement one or more embodiments described herein such as communication between POP display 102, customer device 118, server 126, and/or network gateway 710, shown in FIG. 1. In the embodiment of FIG. 26, computer system 410 includes processor 412, memory 414, and various peripheral devices 416. Processor 412 is coupled to memory 414 and peripheral devices 416. Processor 412 is configured to execute instructions, including the instructions for communication between POP display 102, customer device 118, server 126, and/or network gateway 710, which may be in software. In various embodiments, processor 412 may implement any desired instruction set (e.g. Intel Architecture-32 (IA-32, also known as x86), IA-32 with 64-bit extensions, x86-64, PowerPC, Sparc, MIPS, ARM, IA-64, etc.). In some embodiments, computer system 410 may include more than one processor. Moreover, processor 412 may include one or more processors or one or more processor cores.

Processor 412 may be coupled to memory 414 and peripheral devices 416 in any desired fashion. For example, in some embodiments, processor 412 may be coupled to memory 414 and/or peripheral devices 416 via various interconnect. Alternatively or in addition, one or more bridge chips may be used to coupled processor 412, memory 414, and peripheral devices 416.

Memory 414 may comprise any type of memory system. For example, memory 414 may comprise DRAM, and more particularly double data rate (DDR) SDRAM, RDRAM, etc. A memory controller may be included to interface to memory 414, and/or processor 412 may include a memory controller. Memory 414 may store the instructions to be executed by processor 412 during use, data to be operated upon by the processor during use, etc.

Figure 27:
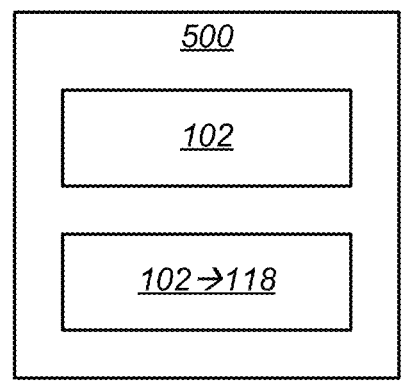
FIG. 27 depicts a block diagram of one embodiment of a computer accessible storage medium.

Peripheral devices 416 may represent any sort of hardware devices that may be included in computer system 410 or coupled thereto (e.g., storage devices, optionally including computer accessible storage medium 500, shown in FIG. 27, other input/output (I/O) devices such as video hardware, audio hardware, user interface devices, networking hardware, etc.).

Turning now to FIG. 27, a block diagram of one embodiment of computer accessible storage medium 500 including one or more data structures representative of POP display 102 (depicted in FIG. 1) and/or memory cache 124 (depicted in FIG. 1) included in an integrated circuit design and one or more code sequences representative of communication between POP display 102, customer device 118, server 126, and/or network gateway 710 (shown in FIGS. 1 and 3). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 500 may store data in a non-transitory manner, where non-transitory in this context may refer to not transmitting the instructions/data on a signal. For example, non-transitory storage may be volatile (and may lose the stored instructions/data in response to a power down) or non-volatile.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs (field programmable gate arrays).

In some embodiments, a non-transitory computer-readable memory medium may be configured so that it stores program instructions and/or data, where the program instructions, if executed by a computer system, cause the computer system to perform a method, e.g., any method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. An apparatus, comprising:
a point of purchase (POP) display comprising a consumer product display, the POP display being configured to be deployed at a retail location; and
at least one printable circuit attached to the POP display, the at least one printable circuit encoding a plurality of parameters for a selected retail campaign associated with the POP display, wherein the plurality of parameters include: (i) a campaign identification number that identifies the selected retail campaign, (ii) a POP display identifier that uniquely identifies the POP display associated with the selected retail campaign, and (iii) and an activation date for the selected retail campaign;
a wireless beacon that includes a processor and a memory and pre-flashed code stored in the memory, wherein the pre-flashed code includes instructions that when executed by the processor configures the wireless beacon to implement functions, including functions to:

in response to being attached by surface mount to a location for proper attachment of the wireless beacon to the at least one printable circuit, obtain an identity from the at least one printable circuit by receiving the plurality of parameters for the selected retail campaign; and assign the wireless beacon the obtained identity from the at least one printable circuit of: (i) the campaign identification number, (ii) the POP display identifier, and (iii) the activation date.

2. The apparatus of claim 1, wherein the at least one printable circuit comprises conductive ink.

3. The apparatus of claim 1, wherein the at least one printable circuit comprises one or more organic field effect transistors.

4. The apparatus of claim 1, wherein the assigned POP display identifier for the wireless beacon differentiates the wireless beacon from other wireless beacons used in the selected retail campaign.

5. The apparatus of claim 1, further comprising at least one printed battery attached to the POP display, wherein the printed battery is configured to provide power to the wireless beacon in response to the wireless beacon being attached by surface mount to the location for proper attachment to the at least one printable circuit.

6. The apparatus of claim 1, further comprising an illuminated indicator configured to illuminate in response to the wireless beacon being attached by surface mount to the location for proper attachment to the at least one printable circuit in such a manner that the wireless beacon is able to receive the plurality of parameters from the at least one printable circuit.

7. The apparatus of claim 6, wherein the illuminated indicator is a component of the at least one printable circuit.

8. The apparatus of claim 1, wherein:
the pre-flashed code includes instructions that when executed by the processor configures the wireless beacon to implement functions, including functions to:
in response to being assigned the obtained identity from the at least one printable circuit of: (i) the campaign identification number, (ii) the POP display identifier, and (iii) the activation date, enter a low power mode until the activation date for the selected retail campaign begins.

9. The apparatus of claim 1, wherein:
the POP display is formed of a corrugated cardboard display, paper, paperboard, Bristol board, foam cored board, or a combination thereof; and
the at least one printable circuit is printed directly on the POP display.

10. The apparatus of claim 1, wherein:
the POP display is formed of a corrugated cardboard display, paper, paperboard, Bristol board, foam cored board, or a combination thereof; and
the at least one printable circuit is printed on a paper substrate material and then mounted on the POP display.

11. A system, comprising:
a point of purchase (POP) display comprising a consumer product display, the POP display being configured to be deployed at a retail location,
at least one printable circuit attached to the POP display, the at least one printable circuit encoding a plurality of parameters for a selected retail campaign associated with the POP display, wherein the plurality of parameters include: (i) a campaign identification number that identifies the selected retail campaign or (ii) a POP display identifier that uniquely identifies the POP display associated with the selected retail campaign, and (iii) and an activation date for the selected retail campaign; and
a wireless beacon configured to be attached to the at least one printable circuit on the POP display, wherein the wireless beacon comprises an integrated circuit device comprising a processor and a memory, the memory including instructions that when executed by the processor configures the wireless beacon to implement functions, including functions to:
in response to being attached by surface mount to a location for proper attachment of the wireless beacon to the at least one printable circuit, obtain an identity from the at least one printable circuit by receiving the plurality of parameters for the selected retail campaign; and
assign the wireless beacon the obtained identity from the at least one printable circuit of: (i) the campaign identification number or (ii) the POP display identifier, and (iii) the activation date.

12. The system of claim 11, wherein the wireless beacon, in response to being attached by surface mount to the at least one printable circuit, is configured to broadcast a wireless signal, the wireless signal including a data packet, and wherein the data packet comprises the assigned campaign identification number or the POP display identifier.

13. The system of claim 11, further comprising at least one printed battery attached to the POP display, wherein the printed battery is configured to provide power to the wireless beacon in response to the wireless beacon being attached by surface mount to the location for proper attachment to the at least one printable circuit.

14. The system of claim 11, wherein the wireless beacon is in an unpowered state before being attached to the at least one printable circuit, and wherein the wireless beacon is powered on in response to the wireless beacon being attached by surface mount to the at least one printable circuit.

15. The system of claim 11, further comprising an illuminated indicator configured to illuminate in response to the wireless beacon being attached by surface mount to the location for proper attachment to the at least one printable circuit in such a manner that the wireless beacon is able to receive the plurality of parameters from the at least one printable circuit.

16. The system of claim 11, wherein the campaign identification number or the POP display identifier is associated with the selected retail campaign at a remote server, the remote server being configured to receive the campaign identification number or the POP display identifier from the wireless beacon.

17. A method, comprising:
placing a plurality of wireless beacons into one or more trays associated with a tape and reel system, wherein each wireless beacon comprises an integrated circuit device having a processor and a memory, the memory including instructions for receiving a plurality of parameters on at least one printable circuit;
attaching printable circuits to a plurality of point of purchase (POP) displays, the POP displays comprising consumer product displays configured to be deployed at a retail location, wherein the printable circuits encode the plurality of parameters for a selected retail campaign associated with the POP displays, and wherein the plurality of parameters include: (i) a campaign identification number that identifies the selected retail campaign or (ii) a POP display identifier that uniquely identifies the POP display associated with the selected retail campaign, and (iii) and an activation date for the selected retail campaign;

placing the trays with the plurality of wireless beacons in a machine configured to attach the wireless beacons to the plurality of POP displays; and attaching, by surface mounting, at least one wireless beacon to a printable circuit on each of the POP displays;

in response to being attached by surface mount to a location for proper attachment of the at least one wireless beacon to the printable circuit, obtaining at the at least one wireless beacon, an identity from the printable circuit by receiving the plurality of parameters for the selected retail campaign; and assigning the at least one wireless beacon the obtained identity from the printable circuit of: (i) the campaign identification number or (ii) the POP display identifier, and (iii) the activation date.

18. The method of claim 17, further comprising broadcasting a wireless signal from the at least one wireless beacon in response to being attached by surface mount to the at least one printable circuit, the wireless signal including a data packet with the assigned campaign identification number or the POP display identifier.

19. The method of claim 17 wherein the printable circuits comprise at least one printed battery, the method further comprising providing power to the at least one wireless beacon from the at least one printed battery in response to the wireless beacon being attached by surface mount to the at least one printable circuit.

20. The method of claim 17, wherein the at least one wireless beacon is attached to the at least one printable circuit in an unpowered state, and wherein the wireless beacon is powered on in response to the wireless beacon being attached by surface mount to the at least one printable circuit.

* * * * *